United States Patent
Kim et al.

(10) Patent No.: US 12,051,350 B2
(45) Date of Patent: Jul. 30, 2024

(54) ELECTRONIC DEVICE INCLUDING DISPLAY HAVING PLURALITY OF STATES AND METHOD FOR CONTROLLING SAME

(71) Applicant: Samsung Electronics Co., Ltd., Suwon-si (KR)

(72) Inventors: Moonsun Kim, Suwon-si (KR); Hyoungtak Cho, Suwon-si (KR); Dahee Kim, Suwon-si (KR); Sukdong Kim, Suwon-si (KR); Soohyun Seo, Suwon-si (KR); Wonkyu Sung, Suwon-si (KR); Yeonggyu Yoon, Suwon-si (KR); Changhan Lee, Suwon-si (KR); Hyunju Hong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/988,391

(22) Filed: Nov. 16, 2022

(65) Prior Publication Data
US 2023/0075430 A1 Mar. 9, 2023

Related U.S. Application Data

(63) Continuation of application No. PCT/KR2021/006376, filed on May 21, 2021.

(30) Foreign Application Priority Data

Jun. 12, 2020 (KR) .................. 10-2020-0071699
May 12, 2021 (KR) .................. 10-2021-0061536
(Continued)

(51) Int. Cl.
*G09G 3/00* (2006.01)
*G06F 1/16* (2006.01)

(52) U.S. Cl.
CPC .......... *G09G 3/035* (2020.08); *G06F 1/1624* (2013.01); *G06F 1/1652* (2013.01);
(Continued)

(58) Field of Classification Search
CPC .......... G09G 3/035; G09G 2310/0267; G09G 2310/0275; G09G 2340/0442;
(Continued)

(56) References Cited

U.S. PATENT DOCUMENTS 6,859,219 B1 * 2/2005 Sall .................. G06F 1/1683
345/905
7,330,163 B2 2/2008 Nakai et al.
(Continued)

FOREIGN PATENT DOCUMENTS

JP 07230250 A 8/1995
KR 10-2010-0027502 A 3/2010
(Continued)

*Primary Examiner* — Rodney Amadiz
(74) *Attorney, Agent, or Firm* — Jefferson IP Law, LLP

(57) ABSTRACT

An electronic device is provided. The electronic device includes a display including a main area, a first sub area extending in a first direction, and a second sub area extending in a second direction perpendicular to the first direction, a display driver integrated circuit (IC) for scanning a scan signal and a data voltage to the display, and a processor operatively connected to the display and the display driver IC, wherein the processor is configured to control the display driver IC to supply the scan signal to at least some areas among the main area, the first sub area, and the second sub area of the display, to control the display driver IC to partially scan a data voltage to an area in which a screen is to be displayed among the main area, the first sub area, and the second sub area.

17 Claims, 50 Drawing Sheets

(30) Foreign Application Priority Data

May 12, 2021 (KR) .................. 10-2021-0061537
May 12, 2021 (KR) .................. 10-2021-0061538

(52) U.S. Cl.
CPC .............. *G09G 2310/0267* (2013.01); *G09G 2310/0275* (2013.01); *G09G 2340/0442* (2013.01)

(58) Field of Classification Search
CPC . G09G 2354/00; G06F 1/1624; G06F 1/1652; G06F 2203/04803; G06F 1/1647; G06F 1/1677; G06F 3/04886; G06F 2200/1614; G06F 1/1694; G06F 3/0346; G06F 3/041; G06F 18/00; G09F 9/30

See application file for complete search history.

(56) References Cited

U.S. PATENT DOCUMENTS

| | | |
|---|---|---|
| 7,843,400 B2 | 11/2010 | Nakai et al. |
| 8,379,377 B2 | 2/2013 | Walters et al. |
| 8,787,008 B2 | 7/2014 | Walters et al. |
| 9,098,241 B1 | 8/2015 | Cho et al. |
| 9,746,884 B2 | 8/2017 | Lee et al. |
| 9,772,657 B2 | 9/2017 | Takayanagi et al. |
| 9,804,699 B2 | 10/2017 | Hyun et al. |
| 10,111,346 B2 | 10/2018 | Seo et al. |
| 10,136,524 B2 | 11/2018 | Choi et al. |
| 10,162,387 B2 | 12/2018 | Takayanagi et al. |
| 10,194,543 B2 | 1/2019 | Seo et al. |
| 10,553,135 B2 | 2/2020 | Lee et al. |
| 10,613,655 B2 | 4/2020 | Yoon et al. |
| 11,056,025 B2 | 7/2021 | Lee et al. |
| 11,238,832 B2 | 2/2022 | An et al. |
| 2002/0021258 A1* | 2/2002 | Koenig .................. G06F 1/1641 345/1.1 |
| 2004/0169618 A1 | 9/2004 | Nakai et al. |
| 2011/0176260 A1* | 7/2011 | Walters .............. H04M 1/0268 361/679.01 |
| 2015/0012850 A1* | 1/2015 | Wang .................. G06F 3/0488 715/761 |
| 2015/0170607 A1* | 6/2015 | Shin ...................... G09G 3/3406 345/690 |
| 2016/0139629 A1* | 5/2016 | Yeo ...................... G06F 1/1666 361/679.3 |
| 2016/0239051 A1 | 8/2016 | Lee et al. |
| 2019/0012008 A1 | 1/2019 | Yoon et al. |
| 2019/0146558 A1 | 5/2019 | Ohata et al. |
| 2019/0261519 A1 | 8/2019 | Park et al. |
| 2020/0044003 A1* | 2/2020 | Cho ......................... G09F 9/30 |
| 2021/0280097 A1 | 9/2021 | Lee et al. |

FOREIGN PATENT DOCUMENTS

| | | |
|---|---|---|
| KR | 10-2016-0013289 A | 2/2016 |
| KR | 10-2016-0053358 A | 5/2016 |
| KR | 10-2016-0100000 A | 8/2016 |
| KR | 10-2016-0129669 A | 11/2016 |
| KR | 10-1784880 B1 | 10/2017 |
| KR | 10-2018-0018941 A | 2/2018 |
| KR | 10-2018-0030301 A | 3/2018 |
| KR | 10-2018-0038605 A | 4/2018 |
| KR | 10-2018-0040181 A | 4/2018 |
| KR | 10-2019-0101184 A | 8/2019 |
| KR | 10-2019-0110318 A | 9/2019 |
| KR | 10-2020-0037727 A | 4/2020 |
| WO | 2017/099276 A | 6/2017 |

\* cited by examiner

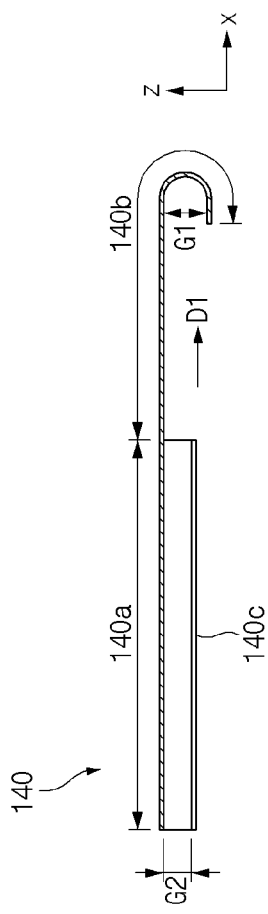
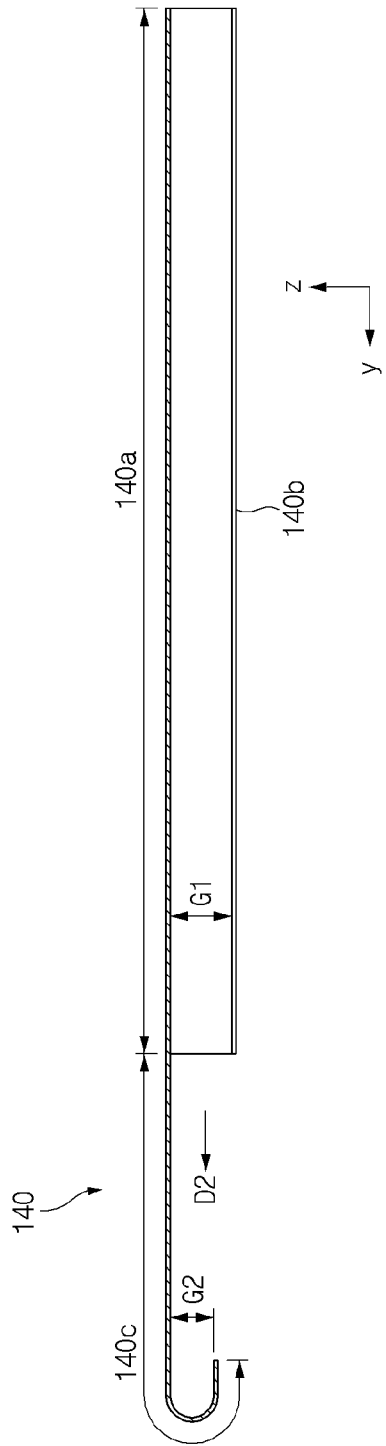
FIG. 11A
FIG. 11B

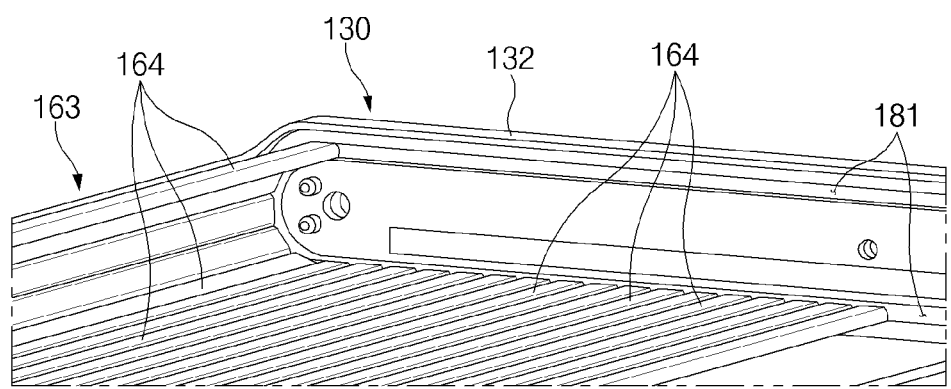
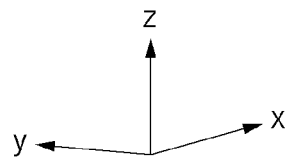
FIG.14

ELECTRONIC DEVICE INCLUDING DISPLAY HAVING PLURALITY OF STATES AND METHOD FOR CONTROLLING SAME

CROSS-REFERENCE TO RELATED APPLICATION(S)

This application is a continuation application, claiming priority under § 365(c), of an International application No. PCT/KR2021/006376, filed on May 21, 2021, which is based on and claims the benefit of a Korean patent application number 10-2020-0071699, filed on Jun. 12, 2020, of a Korean patent application number 10-2021-0061536, filed on May 12, 2021, in the Korean Intellectual Property Office, of a Korean patent application number 10-2021-0061537, filed on May 12, 2021, in the Korean Intellectual Property Office, and of a Korean patent application number 10-2021-0061538, filed on May 12, 2021, in the Korean Intellectual Property Office, the disclosure of each of which is incorporated by reference herein in its entirety.

BACKGROUND

1. Field

The disclosure relates to a technology for implementing an electronic device including a display having a plurality of states and a control method thereof.

2. Description of Related Art

An electronic device may display an image through a display exposed outside the housing. The electronic device may turn on pixels disposed in the display by supplying a scan signal to the display. The electronic device may display the image by applying a data voltage to the display.

Meanwhile, electronic devices having various types of amorphous form-factors make an appearance. When a form-factor of an electronic device changes, the form of a display and the form of a screen displayed on the display may also change.

The above information is presented as background information only to assist with an understanding of the disclosure. No determination has been made, and no assertion is made, as to whether any of the above might be applicable as prior art with regard to the disclosure.

SUMMARY

When a display of an electronic device having an amorphous form-factor displays a screen in the same manner as when a display having an existing form displays a screen, a data voltage may be inefficiently applied. When a scan signal and the data voltage are inefficiently applied, power consumption for driving the display may increase. When the data voltage is inefficiently applied, it may not be easy to drive the display at a high frequency.

Furthermore, when the display of the electronic device having the amorphous form-factor displays a screen in the same manner as when the display having the existing form displays a screen, the electronic device may fail to exhibit the advantages of the form that the amorphous form-factor has. When the display of the electronic device having the amorphous form-factor displays a screen in the same manner as when the display having the existing form displays a screen, the arrangement of contents constituting the screen may be distorted.

Aspects of the disclosure are to address at least the above-mentioned problems and/or disadvantages and to provide at least the advantages described below. Accordingly, an aspect of the disclosure is to provide a method for efficiently applying a data voltage in an electronic device including a display having a plurality of states, and an electronic device to which the method is applied.

Additional aspect of the disclosure is to provide a method for arranging contents of a screen in an electronic device including a display having a plurality of states, and an electronic device to which the method is applied.

Additional aspects will be set forth in part in the description which follows and, in part, will be apparent from the description, or may be learned by practice of the presented embodiments.

In accordance with an aspect of the disclosure, an electronic device is provided. The electronic device includes a display including a main region, a first sub-region that extends in a first direction, and a second sub-region that extends in a second direction perpendicular to the first direction, a display driver integrated circuit (IC) that applies a scan signal and a data voltage to the display, and a processor operationally coupled with the display and the display driver IC. The processor is configured to control the display driver IC to supply the scan signal to at least a partial region among the main region, the first sub-region, and the second sub-region of the display and is configured to control the display driver IC to partially apply the data voltage to a region on which a screen is to be displayed, among the main region, the first sub-region, and the second sub-region.

In accordance with another aspect of the disclosure, a control method is provided. The control method includes detecting movement of a sliding member, determining whether an externally exposed region of a display is changed, updating the externally exposed region of the display in a processor, turning-on a gate driver of the externally exposed region of the display, determining whether at least one of a first sub-region or a second sub-region of the display is exposed to the outside, and applying a data voltage to at least a partial region among a main region, the first sub-region, and the second sub-region of the display, based on whether at least one of the first sub-region or the second sub-region is exposed to the outside.

According to the embodiments of the disclosure, the power consumption for driving the display may be reduced by performing control to partially turn on or off the main region, the first sub-region, and the second sub-region of the display.

Furthermore, according to the embodiments of the disclosure, the scan rate and the driving performance of the display may be improved by selectively applying the data voltage to the main region, the first sub-region, and the second sub-region of the display.

Moreover, according to the embodiments of the disclosure, a screen in which contents constituting the screen are arranged according to the shape of a form-factor may be displayed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 11A and 11B illustrate a display of an electronic device according to various embodiments of the disclosure;

FIG. 14 illustrates the guide rail structure of an electronic device according to an embodiment of the disclosure;

Throughout the drawings, it should be noted that like reference numbers are used to depict the same or similar elements features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
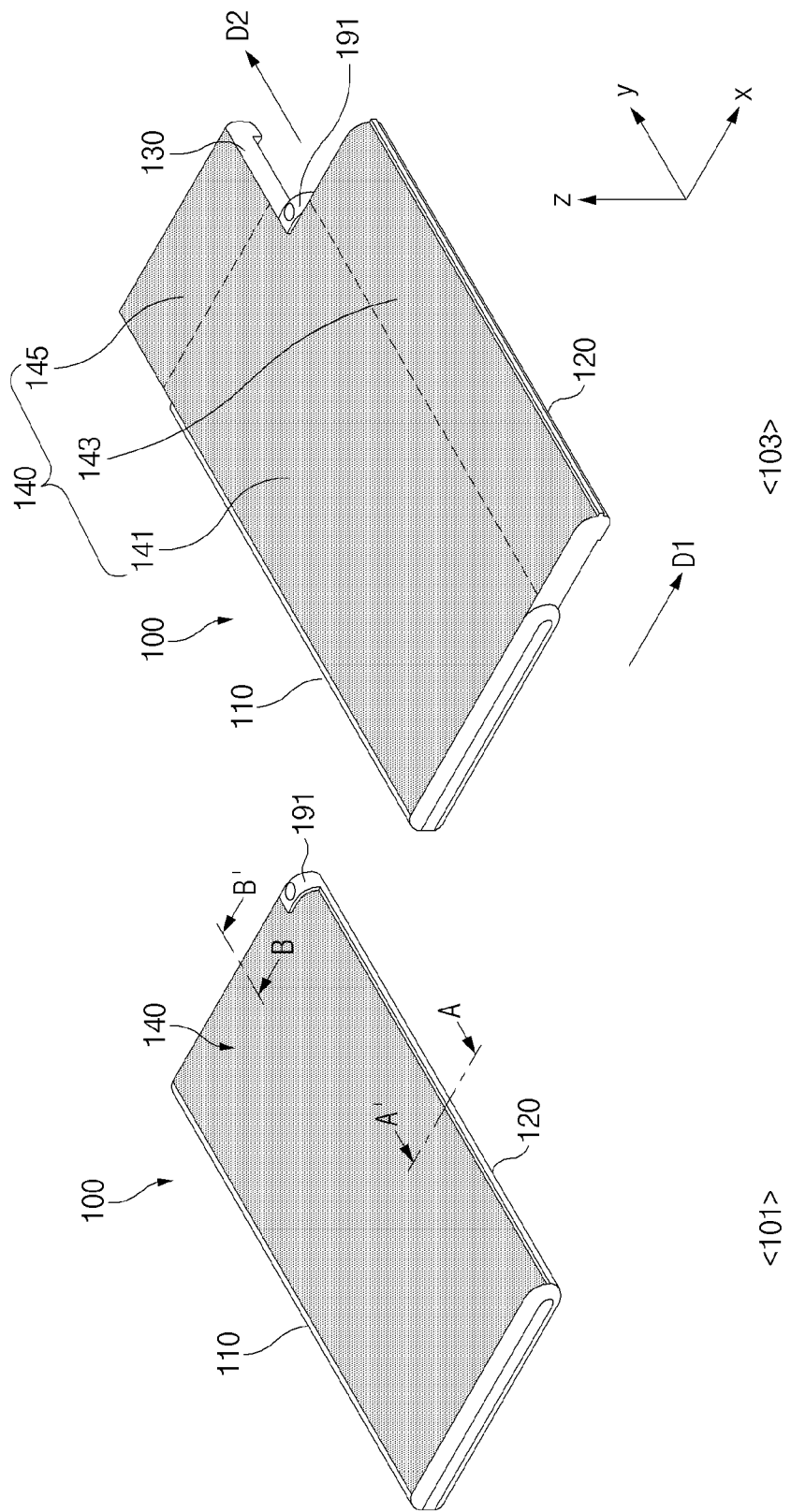
FIG. 1 is a perspective view illustrating a default state and a first extended state of an electronic device according to an embodiment of the disclosure.

FIG. 1 is a perspective view illustrating a default state and a first extended state of an electronic device according to an embodiment of the disclosure.

Referring to FIG. 1, an electronic device 100 according to an embodiment may include a fixed structure 110, a first sliding structure 120, a second sliding structure 130, a display 140, and a camera module 191.

According to an embodiment, the electronic device 100 may be a slidable or rollable electronic device and may include the default state 101 and extended states (e.g., the first extended state 103). For example, a state of the electronic device 100 (e.g., the default state and the extended states) may be determined depending on the positions of the sliding structures 120 and 130 relative to at least one of the fixed structure 110 or the area of the display 140 that forms an outer surface (e.g., a front surface) of the electronic device 100. In various embodiments, the electronic device 100 may be changed (or, switched) between the default state and the extended states by a user operation or a mechanical operation (e.g., a motor).

In various embodiments, the default state 101 of the electronic device 100 may be understood as a closed mode, a normal mode, a reduced mode, or a slide-in mode. The extended states of the electronic device 100 may be understood as an open mode, a deformed mode, an extended mode, or a slide-out mode.

Figure 7:
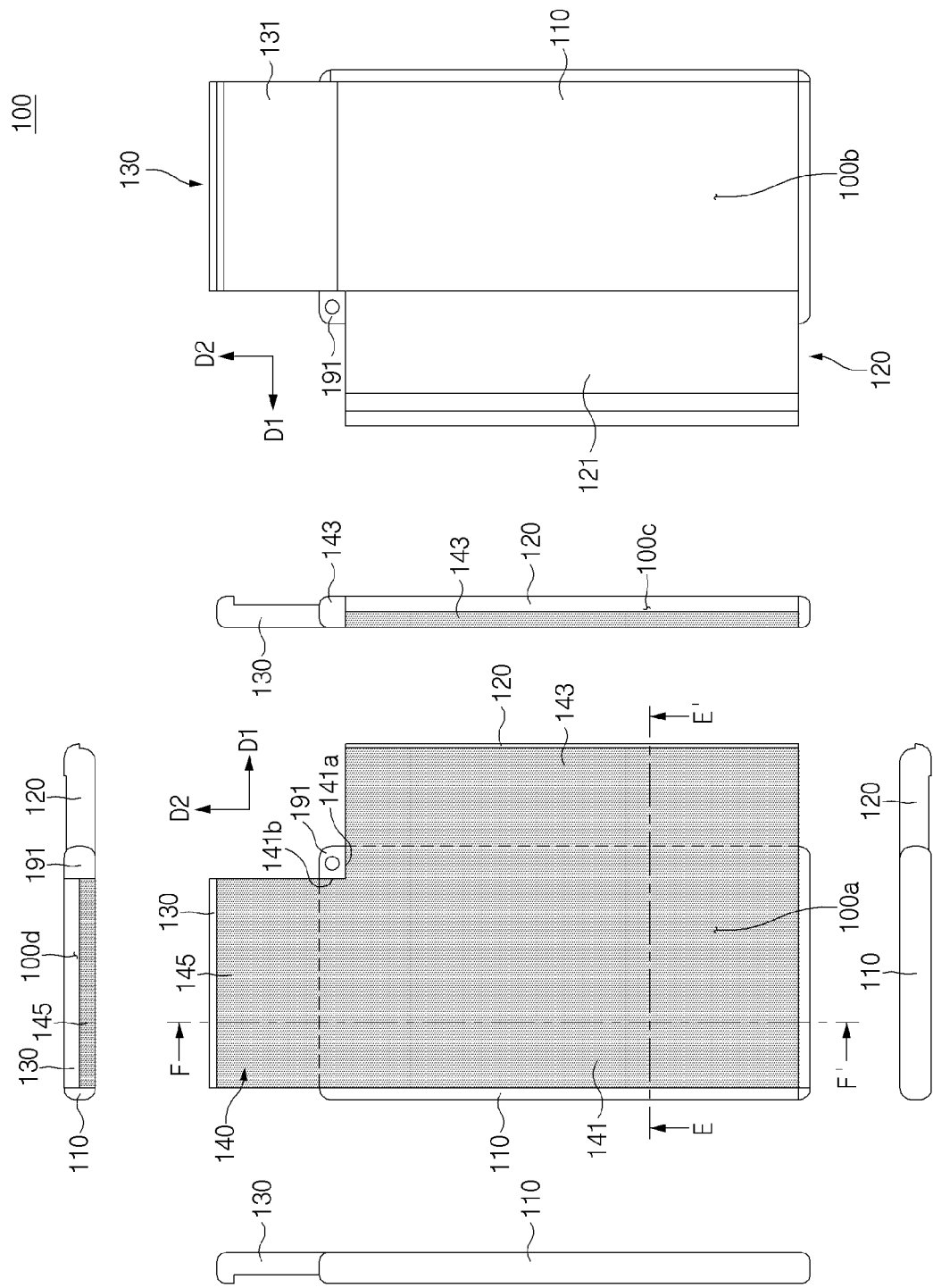
FIG. 7 illustrates a first extended state of an electronic device according to an embodiment of the disclosure.
Figure 8A:
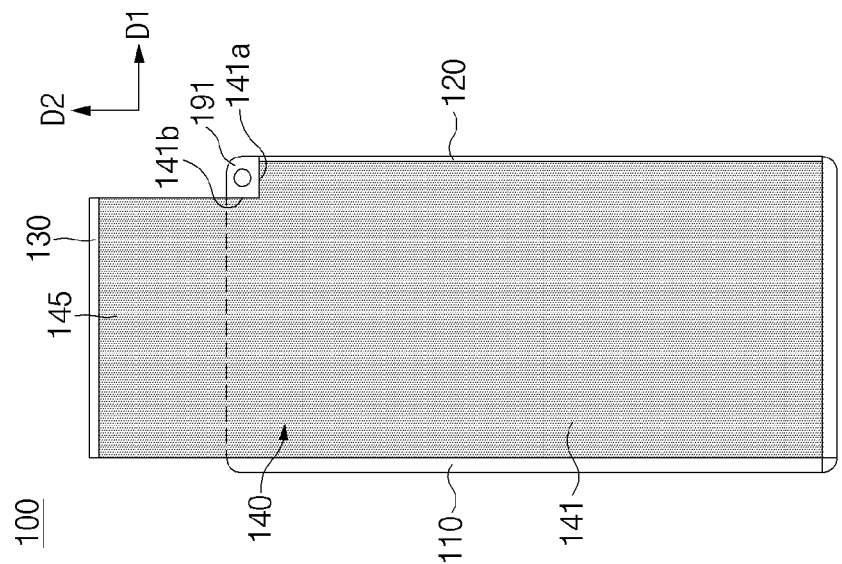
FIGS. 8A and 8B illustrate a second extended state and a third extended state of an electronic device according to various embodiments of the disclosure.
Figure 8B:
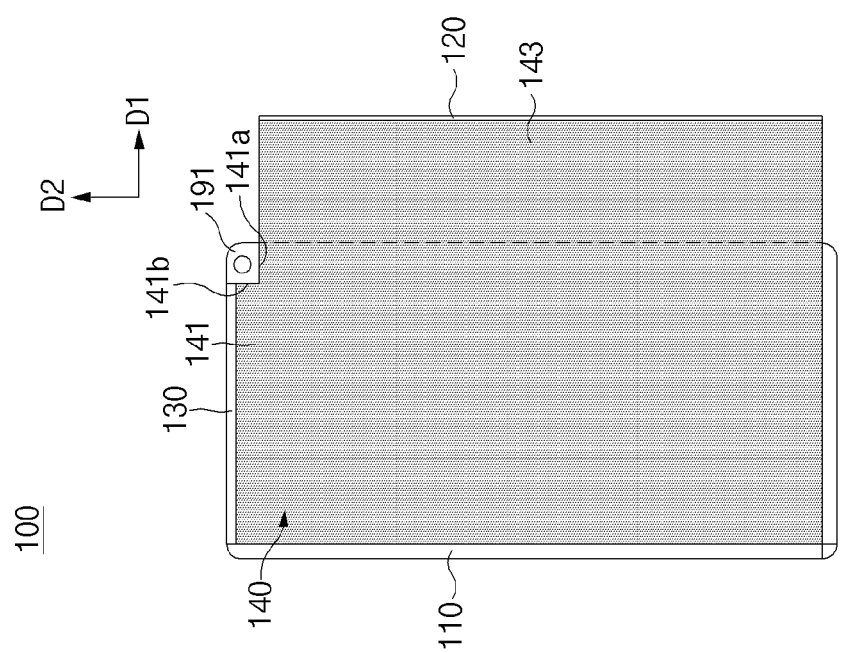

In an embodiment, the extended states of the electronic device 100 may include the first extended state 103, a second extended state (e.g., refer to FIG. 8A), and a third extended state (e.g., refer to FIG. 8B). For example, the electronic device 100 may be changed from the default state 101 to the first extended state 103, the second extend state, or the third extended state depending on whether at least one of the first sliding structure 120 or the second sliding structure 130 slides. FIG. 1 illustrates the first extended state 103 among the extended states of the electronic device 100. The first extended state 103 may be a deformed state in which the first sliding structure 120 and the second sliding structure 130 are slid in a first direction D1 and a second direction D2, respectively, in the default state 101. Although not illustrated in FIG. 1, the second extended state may be a deformed state in which only the first sliding structure 120 is slid in the first direction D1 in the default state 101, and the third extended state may be a deformed state in which only the second sliding structure 130 is slid in the second direction D2 in the default state 101. The default state 101 and the extended states (e.g., the first extended state, the second extended state, and the third extended state) of the electronic device 100 will be described below in more detail with reference to FIGS. 6, 7, 8A, and 8B.

In an embodiment, the fixed structure 110 may be provided such that the first sliding structure 120 and the second sliding structure 130 are slidably coupled to the fixed structure 110 in different lateral directions (e.g., the x-axis direction and the y-axis direction), respectively. For example, the fixed structure 110 may be a structure on which sliding motions of the sliding structures 120 and 130 are based. In various embodiments, the fixed structure 110 may be referred to as a first housing, a fixed member, a fixed housing, or a fixed case.

In an embodiment, the first sliding structure 120 and the second sliding structure 130 may slide in different directions relative to the fixed structure 110. The sliding direction of the first sliding structure 120 (e.g., the x-axis direction) and the sliding direction of the second sliding structure 130 (e.g., the y-axis direction) may be substantially perpendicular to each other.

In an embodiment, the first sliding structure 120 may be slidably coupled to the fixed structure 110. The first sliding structure 120 may be coupled to the fixed structure 110 to slide relative to the fixed structure 110 in opposite directions (e.g., the +x/−x-axis directions). For example, the first sliding structure 120 may move relative to the fixed structure 110 in the first direction D1 or the direction opposite to the first direction D1. Based on FIG. 1, the first direction D1 may mean the +x-axis direction, and the direction opposite to the first direction D1 may mean the −x-axis direction. In various embodiments, the first sliding structure 120 may be referred to as a second housing, a first sliding member (slider), a first sliding housing, or a first sliding case.

In an embodiment, at least a portion of the first sliding structure 120 may be located inside the fixed structure 110. For example, the first sliding structure 120 may partially overlap the fixed structure 110. In an embodiment, the first sliding structure 120 may be configured such that as the first sliding structure 120 moves relative to the fixed structure 110 in the first direction D1 or the direction opposite to the first direction D1, at least a portion of the first sliding structure 120 is located inside the fixed structure 110 or moves out of the fixed structure 110.

In an embodiment, the second sliding structure 130 may be slidably coupled to the fixed structure 110. The second sliding structure 130 may be coupled to the fixed structure 110 to slide relative to the fixed structure 110 in opposite directions (e.g., the +y/−y-axis directions). For example, the second sliding structure 130 may move relative to the fixed structure 110 in the second direction D2 or the direction opposite to the second direction D2. Based on FIG. 1, the second direction D2 may mean the +y-axis direction, and the direction opposite to the second direction D2 may mean the −y-axis direction. In various embodiments, the second sliding structure 130 may be referred to as a third housing, a second sliding member (slider), a second sliding housing, or a second sliding case.

In an embodiment, the second sliding structure 130 may slide in a direction substantially perpendicular to the sliding direction of the first sliding structure 120. For example, the second direction D2 may be substantially perpendicular to the first direction D1.

In an embodiment, at least a portion of the second sliding structure 130 may be located inside the fixed structure 110. For example, the second sliding structure 130 may partially overlap the fixed structure 110. In an embodiment, the second sliding structure 130 may be configured such that as the second sliding structure 130 moves relative to the fixed structure 110 in the second direction D2 or the direction opposite to the second direction D2, at least a portion of the second sliding structure 130 is located inside the fixed structure 110 or moves out of the fixed structure 110.

In an embodiment, in response to the sliding motions of at least one of the first sliding structure 120 or the second sliding structure 130, the display 140 may be exposed outside the electronic device 100, or the size or area of a region of the display 140 that forms the outer surface (e.g., the front surface) of the electronic device 100 may be changed. For example, the display 140 may be supported by other components disposed in the fixed structure 110 (e.g., a bracket 150 and a display support member 160 of FIG. 2) and may be provided such that at least a portion (e.g., a first sub-region 143 and a second sub-region 145) is drawn out of the sliding structures 120 and 130 (e.g., slide-out) or drawn into the sliding structures 120 and 130 (e.g., slide-in) as the first sliding structure 120 or the second sliding structure 130 slides.

According to an embodiment, the area of the display 140 exposed outside the electronic device 100 may be decreased as at least a portion of the display 140 is drawn into the sliding structures 120 and 130, and the area of the display 140 exposed outside the electronic device 100 may be increased as at least a portion of the display 140 is drawn out of the sliding structures 120 and 130.

In an embodiment, the display 140 may at least partially include a flexible portion. For example, a portion of the display 140 may be formed of a rigid material, and the remaining portion of the display 140 may be formed of a flexible material. In another example, the entire display 140 may be formed of a flexible material.

In an embodiment, the display 140 may include a main region 141, and the first sub-region 143 and the second sub-region 145 extending from the main region 141. For example, the first sub-region 143 and the second sub-region 145 may extend from the main region 141 in different directions.

In an embodiment, the main region 141 may form the outer surface (the front surface or a side surface) of the electronic device 100. For example, the main region 141 may remain visually exposed outside the electronic device 100 irrespective of a state of the electronic device 100. As illustrated in FIG. 1, the main region 141 may mean a region that remains exposed outside the electronic device 100 in the default state 101 and the first extended state 103. In various embodiments, the main region 141 may be referred to as a first region, a basic region, or a fixed region.

In an embodiment, the first sub-region 143 may extend from the main region 141 in the first direction D1 (e.g., the +x-axis direction). For example, the first sub-region 143 may extend in the first direction D1 from an end portion of the main region 141 that faces in the first direction D1 and may be partially accommodated in the first sliding structure 120. According to an embodiment, as the first sliding structure 120 slides relative to the fixed structure 110 in the first direction D1 or the direction opposite to the first direction D1, the first sub-region 143 may be drawn out of the first sliding structure 120 (e.g., a slide-out motion) or may be drawn into the first sliding structure 120 (e.g., a slide-in motion).

In an embodiment, the first sub-region 143, together with the main region 141, may form the outer surface of the electronic device 100 in the first extended state 103 (or, the second extended state (e.g., refer to FIG. 8A)). As illustrated in FIG. 1, the first sub-region 143 may mean a region, the exposure and exposed area of which are determined in response to a sliding motion of the first sliding structure 120. For example, the first sub-region 143 may be located inside the first sliding structure 120 in the default state 101, and as the first sliding structure 120 moves in the first direction D1, at least a portion of the first sub-region 143 may move out of the first sliding structure 120 and may be exposed outside the electronic device 100. In various embodiments, the first sub-region 143 may be referred to as a second region, a first extended region, or a first variable region.

In an embodiment, the second sub-region 145 may extend from the main region 141 in the second direction D2 (e.g., the +y-axis direction). For example, the second sub-region 145 may extend in the second direction D2 from an end portion of the main region 141 that faces in the second direction D2 and may be partially accommodated in the second sliding structure 130. According to an embodiment, as the second sliding structure 130 slides relative to the fixed structure 110 in the second direction D2 or the direction opposite to the second direction D2, the second sub-region 145 may be drawn out of the second sliding structure 130 (e.g., a slide-out motion) or may be drawn into the second sliding structure 130 (e.g., a slide-in motion).

In an embodiment, the second sub-region 145, together with the main region 141, may form the outer surface of the electronic device 100 in the first extended state 103 (or, the third extended state (e.g., refer to FIG. 8B)). As illustrated in FIG. 1, the second sub-region 145 may mean a region, the exposure and exposed area of which are determined in response to a sliding motion of the second sliding structure 130. For example, the second sub-region 145 may be located inside the second sliding structure 130 in the default state 101, and as the second sliding structure 130 moves in the second direction D2, at least a portion of the second sub-region 145 may move out of the second sliding structure 130 and may be exposed outside the electronic device 100. In various embodiments, the second sub-region 145 may be referred to as a third region, a second extended region, or a second variable region.

In an embodiment, the display 140 may form a screen display area that is visually exposed on the outer surface of the electronic device 100 and on which predetermined visual information (or, a screen) is displayed. In the default state 101, the screen display area may be formed by the main region 141. In the extended states, the screen display area may be formed by at least one of the first sub-region 143 or the second sub-region 145 together with the main region 141. For example, in the first extended state 103, the screen display area may be formed by a portion of the first sub-region 143, a portion of the second sub-region 145, and the main region 141. The arrangement of the regions of the display 140 depending on a state of the electronic device 100 will be described below in more detail with reference to FIGS. 6, 7, 8A, and 8B.

In an embodiment, the camera module 191 may be located at a corner of the electronic device 100. The camera module 191 may be fixedly disposed on the fixed structure 110 or another component on the fixed structure 110 (e.g., the bracket 150 of FIG. 2) so as to be separated from sliding motions of the first sliding structure 120 and the second sliding structure 130. However, the position of the camera module 191 is not limited to the illustrated embodiment, and according to various embodiments, the position of the camera module 191 may be changed, or the camera module 191 may be omitted.

Figure 2:
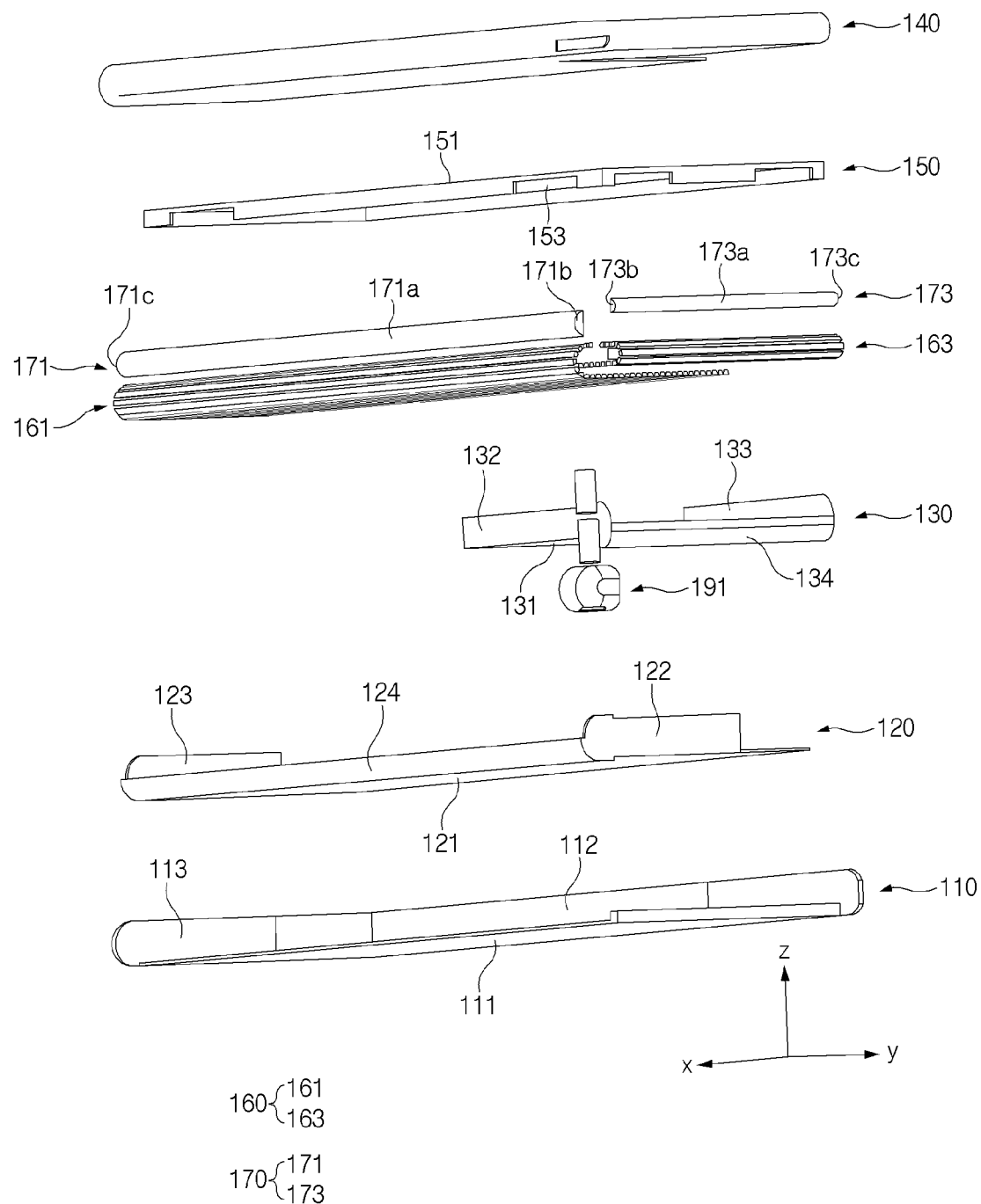
FIG. 2 is an exploded perspective view of the electronic device according to an embodiment of the disclosure.

FIG. 2 is an exploded perspective view of an electronic device according to an embodiment of the disclosure.

Figure 3:
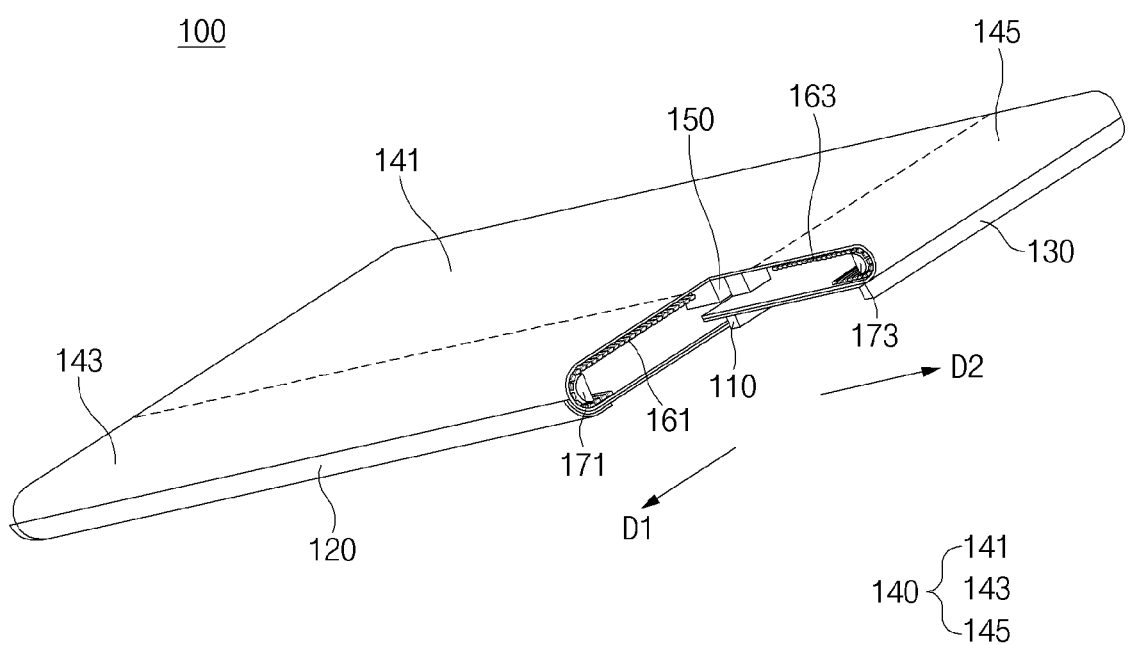
FIG. 3 is a perspective view of the electronic device according to an embodiment of the disclosure.

FIG. 3 is a perspective view of an electronic device according to an embodiment of the disclosure.

Referring to FIGS. 2 and 3, the electronic device 100 according to an embodiment may include the fixed structure 110 (e.g., the first housing), the first sliding structure 120 (e.g., the second housing), the second sliding structure 130 (e.g., the third housing), the display 140, the bracket 150, the display support member 160, roll bars 170, and the camera module 191.

The components of the electronic device 100 illustrated in FIGS. 2 and 3 may be identical or similar to some of the components of the electronic device 100 illustrated in FIG. 1, and repetitive descriptions will hereinafter be omitted.

FIG. 3 may be a view in which at least some of the sidewalls of the first sliding structure 120 and the second sliding structure 130 are omitted to represent the arrangement of the display support member 160 and the roll bars 170. For example, the electronic device 100 illustrated in FIG. 3 may be in the default state (e.g., the default state 101 of FIG. 1).

In an embodiment, the fixed structure 110 may include a first plate 111, a first sidewall 112, and a second sidewall 113. For example, the fixed structure 110 may be provided such that the first plate 111, the first sidewall 112, and the second sidewall 113 are integrally formed, but is not limited thereto.

In an embodiment, the first plate 111 may be formed to be substantially flat and may form a rear surface of the electronic device 100. The first plate 111 may partially overlap at least a portion of the first sliding structure 120 (e.g., a second plate 121) and at least a portion of the second sliding structure 130 (e.g., a third plate 131). For example, the second plate 121 of the first sliding structure 120 and the third plate 131 of the second sliding structure 130 may be located above the first plate 111 (e.g., in the +z-axis direction), and as the second plate 121 and the third plate 131 slide on the first plate 111, the sizes of regions of the second plate 121 and the third plate 131 that overlap the first plate 111 may be changed.

In an embodiment, the first sidewall 112 and the second sidewall 113 may extend from the first plate 111. The first sidewall 112 and the second sidewall 113 may be disposed perpendicular to each other. For example, one end portion of the first sidewall 112 and one end portion of the second sidewall 113 may be connected to each other. In an embodiment, the first sidewall 112 may be disposed at a long edge of the first plate 111, and the second sidewall 113 may be disposed at a short edge of the first plate 111 while being perpendicular to the first sidewall 112. For example, the first sidewall 112 may substantially vertically extend from an edge of the first plate 111 that faces in the −x-axis direction, and the second sidewall 113 may substantially vertically extend from an edge of the first plate 111 that faces in the −y-axis direction.

In an embodiment, the first sidewall 112 may form at least a portion of a side surface of the electronic device 100 that faces in the −x-axis direction, and the second sidewall 113 may form at least a portion of a side surface of the electronic device 100 that faces in the −y-axis direction. In an embodiment, the fixed structure 110 may be formed in a form in which regions facing the first sidewall 112 and the second sidewall 113 are open such that the first sliding structure 120 and the second sliding structure 130 are disposed to be movable in directions perpendicular to each other. For example, the first sliding structure 120 may be located such that at least a portion faces the first sidewall 112 and may slide in a direction toward the first sidewall 112 (e.g., the −x-axis direction) or a direction away from the first sidewall 112 (e.g., the +x-axis direction). For example, the second sliding structure 130 may be located such that at least a portion faces the second sidewall 113 and may slide in a direction toward the second sidewall 113 (e.g., the −y-axis direction) or a direction away from the second sidewall 113 (e.g., the +y-axis direction).

In an embodiment, the first sliding structure 120 may include the second plate 121, a third sidewall 122, a fourth sidewall 123, and a fifth sidewall 124. For example, the first sliding structure 120 may be provided such that the second plate 121, the third sidewall 122, the fourth sidewall 123, and the fifth sidewall 124 are integrally formed, but is not limited thereto.

In an embodiment, the second plate 121 may be formed to be substantially flat and may be disposed to partially overlap the first plate 111 of the fixed structure 110. The second plate 121 may be substantially parallel to the first plate 111 and may move in the x-axis direction on the first plate 111.

In an embodiment, the third sidewall 122, the fourth sidewall 123, and the fifth sidewall 124 may extend from the second plate 121. The third sidewall 122 and the fourth sidewall 123 may be disposed to face each other, and the fifth sidewall 124 may extend substantially perpendicular to the third sidewall 122 and the fourth sidewall 123. In an embodiment, the third sidewall 122 and the fourth sidewall 123 may be disposed at opposite short edges of the second plate 121 to face each other, and the fifth sidewall 124 may be disposed at a long edge of the second plate 121 while being perpendicular to the third sidewall 122 and the fourth sidewall 123. For example, the third sidewall 122 may substantially vertically extend from an edge of the second plate 121 that faces in the +y-axis direction, and the fourth sidewall 123 may substantially vertically extend from an edge of the second plate 121 that faces in the −y-axis direction. For example, the fifth sidewall 124 may extend from an edge of the second plate 121 that faces in the +x-axis direction and may connect the third sidewall 122 and the fourth sidewall 123. According to the illustrated embodiment, the fifth sidewall 124 may extend from the second plate 121 while forming a curved surface, but is not limited thereto.

In an embodiment, the third sidewall 122 and the fourth sidewall 123 may extend substantially parallel to the second sidewall 113 of the fixed structure 110. For example, an outside surface (e.g., a surface facing in the −y-axis direction) of the fourth sidewall 123 may face an inside surface (e.g., a surface facing in the +y-axis direction) of the second sidewall 113. In an embodiment, the fifth sidewall 124 may extend substantially parallel to the first sidewall 112 of the fixed structure 110. For example, the fifth sidewall 124 may face the first sidewall 112. The fifth sidewall 124 may move toward or away from the first sidewall 112 as the first sliding structure 120 moves in the x-axis direction.

In an embodiment, a first roll bar 171 may be disposed between the third sidewall 122 and the fourth sidewall 123. For example, the first roll bar 171 may extend in a direction substantially perpendicular to the third sidewall 122 and the fourth sidewall 123, one end portion 171*b* of the first roll bar 171 may be coupled to an inside surface (e.g., a surface facing in the −y-axis direction) of the third sidewall 122, and an opposite end portion 171*c* of the first roll bar 171 may be coupled to an inside surface (e.g., a surface facing in the +y-axis direction) of the fourth sidewall 123. In an embodiment, the fifth sidewall 124 may extend parallel to the first roll bar 171 and may surround at least a portion of the first roll bar 171.

In an embodiment, the second sliding structure 130 may include the third plate 131, a sixth sidewall 132, a seventh sidewall 133, and an eighth sidewall 134. For example, the first sliding structure 120 may be provided such that the third plate 131, the sixth sidewall 132, the seventh sidewall 133, and the eighth sidewall 134 are integrally formed, but is not limited thereto.

In an embodiment, the third plate 131 may be formed to be substantially flat and may be disposed to partially overlap the first plate 111 of the fixed structure 110 and the second plate 121 of the first sliding structure 120. The third plate 131 may be substantially parallel to the first plate 111 or the second plate 121 and may move in the y-axis direction on the first plate 111 or the second plate 121.

In an embodiment, the third plate 131 may move in the y-axis direction while partially overlapping the first plate 111 and the second plate 121. The second plate 121 and the first plate 111 may be located below the third plate 131 (e.g., in the −z-axis direction). Referring to FIG. 3, the first sliding structure 120 may be disposed such that the second plate 121 moves in the x-axis direction above the first plate 111 (e.g., in the +z-axis direction), and the second sliding structure 130 may be disposed such that the third plate 131 moves in the y-axis direction above the second plate 121. For example, the second plate 121 may move in the x-axis direction between the first plate 111 and the third plate 131. However, without being necessarily limited to the illustrated embodiment, the third plate 131 may be disposed above the first plate 111, and the second plate 121 may be disposed above the third plate 131. For example, the second sliding structure 130 may be disposed such that the third plate 131 moves in the y-axis direction above the first plate 111, and the first sliding structure 120 may be disposed such that the second plate 121 moves in the x-axis direction above the third plate 131.

In an embodiment, the sixth sidewall 132, the seventh sidewall 133, and the eighth sidewall 134 may extend from the third plate 131. The sixth sidewall 132 and the seventh sidewall 133 may be disposed to face each other, and the eighth sidewall 134 may extend substantially perpendicular to the sixth sidewall 132 and the seventh sidewall 133. For example, the sixth sidewall 132 may substantially vertically extend from an edge of the third plate 131 that faces in the +x-axis direction, and the seventh sidewall 133 may substantially vertically extend from an edge of the third plate 131 that faces in the −x-axis direction. For example, the eighth sidewall 134 may extend from an edge of the third plate 131 that faces in the +y-axis direction and may connect the sixth sidewall 132 and the seventh sidewall 133. According to the illustrated embodiment, the eighth sidewall 134 may extend from the third plate 131 while forming a curved surface, but is not limited thereto.

In an embodiment, the sixth sidewall 132 and the seventh sidewall 133 may extend substantially parallel to the first sidewall 112 of the fixed structure 110. For example, an outside surface (e.g., a surface facing in the −x-axis direction) of the seventh sidewall 133 may face an inside surface (e.g., a surface facing in the +x-axis direction) of the first sidewall 112. In an embodiment, the eighth sidewall 134 may extend substantially parallel to the second sidewall 113 of the fixed structure 110. For example, the eighth sidewall 134 may face the second sidewall 113. The eighth sidewall 134 may move toward or away from the first sidewall 112 as the second sliding structure 130 moves in the y-axis direction.

In an embodiment, a second roll bar 173 may be disposed between the sixth sidewall 132 and the seventh sidewall 133. For example, the second roll bar 173 may extend in a direction substantially perpendicular to the sixth sidewall 132 and the seventh sidewall 133, one end portion 173*b* of the second roll bar 173 may be coupled to an inside surface (e.g., a surface facing in the −x-axis direction) of the sixth sidewall 132, and an opposite end portion 173c of the second roll bar 173 may be coupled to an inside surface (e.g., a surface facing in the +x-axis direction) of the seventh sidewall 133. In an embodiment, the eighth sidewall 134 may extend parallel to the second roll bar 173 and may surround at least a portion of the second roll bar 173.

In an embodiment, the first sliding structure 120 and the second sliding structure 130 may be formed in a form in which interference or collision does not occur when the first sliding structure 120 and the second sliding structure 130 slide relative to the fixed structure 110 in directions perpendicular to each other. For example, the third sidewall 122 of the first sliding structure 120 may have a small length (e.g., height) in the z-axis direction so as not to interfere with the sixth sidewall 132 of the second sliding structure and thus may move below the third plate 131 and the sixth sidewall 132 during a sliding motion. In another example, by removing one of the third sidewall 122 of the first sliding structure 120 and the sixth sidewall 132 of the second sliding structure 130, the electronic device 100 may be provided such that interference between the first sliding structure 120 and the second sliding structure 130 does not occur.

In an embodiment, the display 140 may be supported by the bracket 150 and the display support member 160. For example, a partial region of the display 140 may be supported by the bracket 150 and thus may be fixedly disposed in the fixed structure 110, and other regions of the display 140 may move while performing at least one of a rotary motion or a linear motion in response to sliding of the sliding structures 120 and 130 in the state of being supported by the display support member 160.

In an embodiment, the display 140 may include the main region 141, and the first sub-region 143 and the second sub-region 145 extending from the main region 141. Referring to FIG. 3, a portion of the main region 141 may be disposed on one surface of the bracket 150 (e.g., a first surface 151 of FIG. 2). For example, a rear surface of a portion of the main region 141 may be attached to the one surface of the bracket 150. Referring to FIG. 3, the sub-regions 143 and 145 of the display 140 may be supported by the display support member 160. For example, the display support member 160 may be attached to rear surfaces of the sub-regions 143 and 145. However, a region of the display 140 supported by the bracket 150 and the display support member 160 is not limited to the above-described example, and at least a portion of the main region 141 may be supported by the display support member 160 (e.g., refer to FIG. 5).

In an embodiment, the sub-regions 143 and 145 of the display 140 may move together with the display support member 160 in the state of being supported by the display support member 160. For example, when the sliding structures 120 and 130 slide, the sub-regions 143 and 145, together with the display support member 160, may move along outer circumferential surfaces of the roll bars 170 to move into the sliding structures 120 and 130 or move out of the sliding structures 120 and 130.

In an embodiment, the bracket 150 may be fixedly disposed in the fixed structure 110. For example, the bracket 150 may be coupled to the fixed structure 110. The bracket 150 may be separated from movement of the sliding structures 120 and 130 by being coupled to the fixed structure 110. In an embodiment, the bracket 150 may support other components (e.g., a circuit board (not illustrated), a battery (not illustrated), or the display 140) of the electronic device 100. Although not illustrated, the bracket 150 may support the circuit board (not illustrated) or the battery (not illustrated) such that the circuit board (not illustrated) or the battery (not illustrated) is located between the first plate 111 (or, the second plate 121 and the third plate 131) and the bracket 150. In addition, the bracket 150 may support a partial region of the display 140 (e.g., a portion of the main region 141). In various embodiments, the bracket 150 may be formed in a plate shape and may be formed of a material having a specified stiffness.

In an embodiment, the bracket 150 may include the first surface 151 facing toward the front surface of the electronic device 100 (e.g., in the +z-axis direction) and a second surface 153 facing away from the first surface 151. For example, the first surface 151 may be a surface facing toward the display 140, and the second surface 153 may be a surface facing toward the first plate 111, the second plate 121, or the third plate 131.

In an embodiment, the first surface 151 of the bracket 150 may support a portion of the display 140. The first surface 151 may be formed to be a flat surface so as to support the display 140 flat. For example, a portion of the main region 141 of the display 140 may be disposed on the first surface 151. Although not illustrated, the circuit board (not illustrated) or the battery (not illustrated) may be disposed on the second surface 153 of the bracket 150. For example, the circuit board and the battery may be seated on the second surface 153 of the bracket 150.

In an embodiment, the second surface 153 of the bracket 150 may be spaced apart from the first plate 111 by a predetermined gap such that the second plate 121, the third plate 131, and the sub-regions 143 and 145 of the display 140 are movable between the first plate 111 and the second surface 153. For example, a portion of the first sub-region 143 and the second plate 121 may move in the x-axis direction between the first plate 111 and the second surface 153, and a portion of the second sub-region 145 and the third plate 131 may move in the y-axis direction between the first plate 111 and the second surface 153.

In an embodiment, the display support member 160 may be disposed on a rear surface of a partial region of the display 140 to support the partial region of the display 140. For example, the display support member 160 may be disposed on rear surfaces of the remaining regions other than the region supported by the bracket 150 among the entire regions of the display 140.

According to the embodiment illustrated in FIG. 2, the display support member 160 may be provided in a multi-bar form having a structure in which a plurality of bars are connected. For example, the display support member 160 in the multi-bar form may support of at least one of movement or bending of the display 140 while the plurality of bars partially rotate relative to each other. However, at least one of the form or structure of the display support member 160 is not limited to the illustrated embodiment, and the display support member 160 may be provided in various forms capable of supporting movement and bending of the display 140. For example, the display support member 160 may be implemented with a plate having a lattice pattern formed thereon or a plate formed of a flexible material.

In an embodiment, the display support member 160 may include a first display support member 161 corresponding to the first sub-region 143 and a second display support member 163 corresponding to the second sub-region 145. For example, the first display support member 161 and the second display support member 163 may differ from each other in terms of position and size, but may have substantially the same structure.

In an embodiment, the first display support member 161 may be disposed on the rear surface of the first sub-region 143 of the display 140. For example, the first display support member 161 may be attached to the rear surface of the first sub-region 143 through an adhesive member (e.g., a double-sided tape). In various embodiments, the first display support member 161 may extend to a portion of the main region 141 (e.g., refer to FIGS. 5A and 5B).

In an embodiment, the first display support member 161 may include a plurality of bars extending in a direction (e.g., the y-axis direction) substantially perpendicular to the sliding direction of the first sliding structure 120 (e.g., the x-axis direction). For example, the first display support member 161 may be formed in a form in which a plurality of bars extending in a direction substantially parallel to the first roll bar 171 (e.g., the y-axis direction) are arranged along the sliding direction of the first sliding structure 120. Each of the plurality of bars of the first display support member 161 may be coupled so as to be rotatable relative to an adjacent bar in a specified angle range. For example, the first display support member 161 may be bent while portions having a relatively small thickness between the plurality of bars move toward each other. In various embodiments, the first display support member 161 may be referred to as a first rollable module, a first multi-joint module (or, multi-joint rail), a first flexible plate (or, flexible track), or a first hinge rail. In an embodiment, the first display support member 161 may be bent with respect to the first roll bar 171. For example, the first display support member 161 may be bent while surrounding at least a portion of the first roll bar 171 to extend into the space between the fifth sidewall 124 of the first sliding structure 120 and the first roll bar 171. For example, the first display support member 161 may partially move along an outer surface (e.g., a curved surface 171a) of the first roll bar 171 as the first roll bar 171 moves in the x-axis direction together with the first sliding structure 120.

In an embodiment, the second display support member 163 may be disposed on the rear surface of the second sub-region 145 of the display 140. For example, the second display support member 163 may be attached to the rear surface of the second sub-region 145 through an adhesive member (e.g., a double-sided tape). In various embodiments, the second display support member 163 may extend to a portion of the main region 141 (e.g., refer to FIGS. 5A and 5B).

In an embodiment, the second display support member 163 may include a plurality of bars extending in a direction (e.g., the x-axis direction) substantially perpendicular to the sliding direction of the second sliding structure 130 (e.g., the y-axis direction). For example, the second display support member 163 may be formed in a form in which a plurality of bars extending in a direction substantially parallel to the second roll bar 173 (e.g., the x-axis direction) are arranged along the sliding direction of the second sliding structure 130. Each of the plurality of bars of the second display support member 163 may be coupled so as to be rotatable relative to an adjacent bar in a specified angle range. For example, the second display support member 163 may be bent while portions having a relatively small thickness between the plurality of bars move toward each other. In various embodiments, the second display support member 163 may be referred to as a second rollable module, a second multi-joint module (or, multi-joint rail), a second flexible plate (or, flexible track), or a second hinge rail.

In an embodiment, the second display support member 163 may be bent with respect to the second roll bar 173. For example, the second display support member 163 may be bent while surrounding at least a portion of the second roll bar 173 to extend into the space between the eighth sidewall 134 of the second sliding structure 130 and the second roll bar 173. For example, the second display support member 163 may partially move along an outer surface (e.g., a curved surface 173a) of the second roll bar 173 as the second roll bar 173 moves in the y-axis direction together with the second sliding structure 130.

In an embodiment, the roll bars 170 may guide movement of the display support member 160 and the display 140. For example, portions of the roll bars 170 may be formed of curved surfaces such that the display support member 160 and the display 140 move along the roll bars 170 when the sliding structures 120 and 130 slide.

In an embodiment, the roll bars 170 may include the first roll bar 171 disposed in the first sliding structure 120 and the second roll bar 173 disposed in the second sliding structure 130. For example, the first roll bar 171 may be coupled to the first sliding structure 120 to move together with the first sliding structure 120. For example, the second roll bar 173 may be coupled to the second sliding structure 130 to move together with the second sliding structure 130.

In an embodiment, the first roll bar 171 may extend in a direction perpendicular to the sliding direction of the first sliding structure 120 (e.g., the x-axis direction). The opposite end portions 171b and 171c of the first roll bar 171 may be coupled to the third sidewall 122 and the fourth sidewall 123 of the first sliding structure 120. For example, the first roll bar 171, together with the first sliding structure 120, may move in the x-axis direction relative to the fixed structure 110. In an embodiment, at least a portion of the first roll bar 171 may be surrounded by the first display support member 161.

In an embodiment, at least a portion of the first roll bar 171 may be formed of the curved surface 171a. For example, a portion of the first roll bar 171 that makes contact with the first display support member 161 may be formed of the curved surface 171a such that a portion of the first display support member 161 is movable along the first roll bar 171. The first roll bar 171 may be disposed such that the curved surface 171a faces toward the fifth sidewall 124 of the first sliding structure 120.

According to various embodiments, the first roll bar 171 may be implemented with a cylindrical roller coupled to the first sliding structure 120 so as to be rotatable. For example, when the first roll bar 171 is formed of a roller, the first roll bar 171 may rotate about a rotational axis perpendicular to the sliding direction of the first sliding structure 120 (e.g., the x-axis direction).

In an embodiment, the second roll bar 173 may extend in a direction perpendicular to the sliding direction of the second sliding structure 130 (e.g., the y-axis direction). The opposite end portions 173b and 173c of the second roll bar 173 may be coupled to the sixth sidewall 132 and the seventh sidewall 133 of the second sliding structure 130. For example, the second roll bar 173, together with the second sliding structure 130, may move in the y-axis direction relative to the fixed structure 110. In an embodiment, at least a portion of the second roll bar 173 may be surrounded by the second display support member 163.

In an embodiment, at least a portion of the second roll bar 173 may be formed of the curved surface 173a. For example, a portion of the second roll bar 173 that makes contact with the second display support member 163 may be formed of the curved surface 173a such that a portion of the second display support member 163 is movable along the second roll bar 173. The second roll bar 173 may be disposed such that the curved surface 173a faces toward the eighth sidewall 134 of the second sliding structure 130.

According to various embodiments, the second roll bar 173 may be implemented with a cylindrical roller coupled to the second sliding structure 130 so as to be rotatable. For example, when the second roll bar 173 is formed of a roller, the second roll bar 173 may rotate about a rotational axis perpendicular to the sliding direction of the second sliding structure 130 (e.g., the y-axis direction).

In an embodiment, the radii of curvature of the curved surfaces 171a and 173a of the first roll bar 171 and the second roll bar 173 may differ from each other such that interference does not occur between the first display support member 161 and the second display support member 163 or between the first sub-region 143 and the second sub-region 145 of the display 140. The difference in radius of curvature between the curved surface 171a of the first roll bar 171 and the curved surface 173a of the second roll bar 173 will be described below in more detail with reference to FIGS. 4, 5A, and 5B.

Although not illustrated in FIG. 2, the electronic device 100 according to an embodiment may further include the circuit board (not illustrated) and the battery (not illustrated).

In an embodiment, the circuit board (not illustrated) may be fixedly disposed on the fixed structure 110 or the bracket 150. For example, the circuit board may remain fixed to the fixed structure 110 without moving together with the sliding structures 120 and 130 when the first sliding structure 120 or the second sliding structure 130 slides.

In an embodiment, the circuit board (not illustrated) may include a printed circuit board (PCB), a flexible PCB (FPCB), or a rigid-flexible PCB (RFPCB). Various electronic parts included in the electronic device 100 may be electrically connected to the circuit board. A processor (e.g., a processor 1520 of FIG. 15), a memory (e.g., a memory 1530 of FIG. 15), and/or an interface (e.g., an interface 1577 of FIG. 15) may be disposed on the circuit board.

For example, the processor may include at least one of a main processor or an auxiliary processor, and the at least one of the main processor or the auxiliary processor may include one or more of a central processing unit, an application processor, a graphic processing unit, an image signal processor, a sensor hub processor, or a communication processor. For example, the memory may include a volatile memory or a nonvolatile memory. For example, the interface may include at least one of a high definition multimedia interface (HDMI), a universal serial bus (USB) interface, a secure digital (SD) card interface, or an audio interface. Furthermore, the interface may electrically or physically connect the electronic device 100 with an external electronic device and may include a USB connector, an SD card/multimedia card (MMC) connector, or an audio connector.

In an embodiment, the battery (not illustrated) may supply power to at least one component of the electronic device 100. The battery may be integrally disposed inside the electronic device 100, or may be disposed so as to be detachable from the electronic device 100. For example, the battery may be fixedly disposed on the fixed structure 110 or the bracket 150. The battery may remain fixed to the fixed structure 110 without moving together with the sliding structures 120 and 130 when the first sliding structure 120 or the second sliding structure 130 slides.

The electronic device 100 illustrated in FIGS. 2 and 3 may be an embodiment of a slidable (or, rollable) electronic device, and the structure of the electronic device 100 according to various embodiments of the disclosure is not limited to the illustrated embodiment. For example, the electronic device 100 according to various embodiments of the disclosure may be provided in various slidable (or, rollable) types that include a fixed structure and two sliding structures movable relative to the fixed structure and in which the size of a display exposed outside the electronic device 100 is expanded or reduced as a flexible display moves together with the movable structures.

Figure 4:
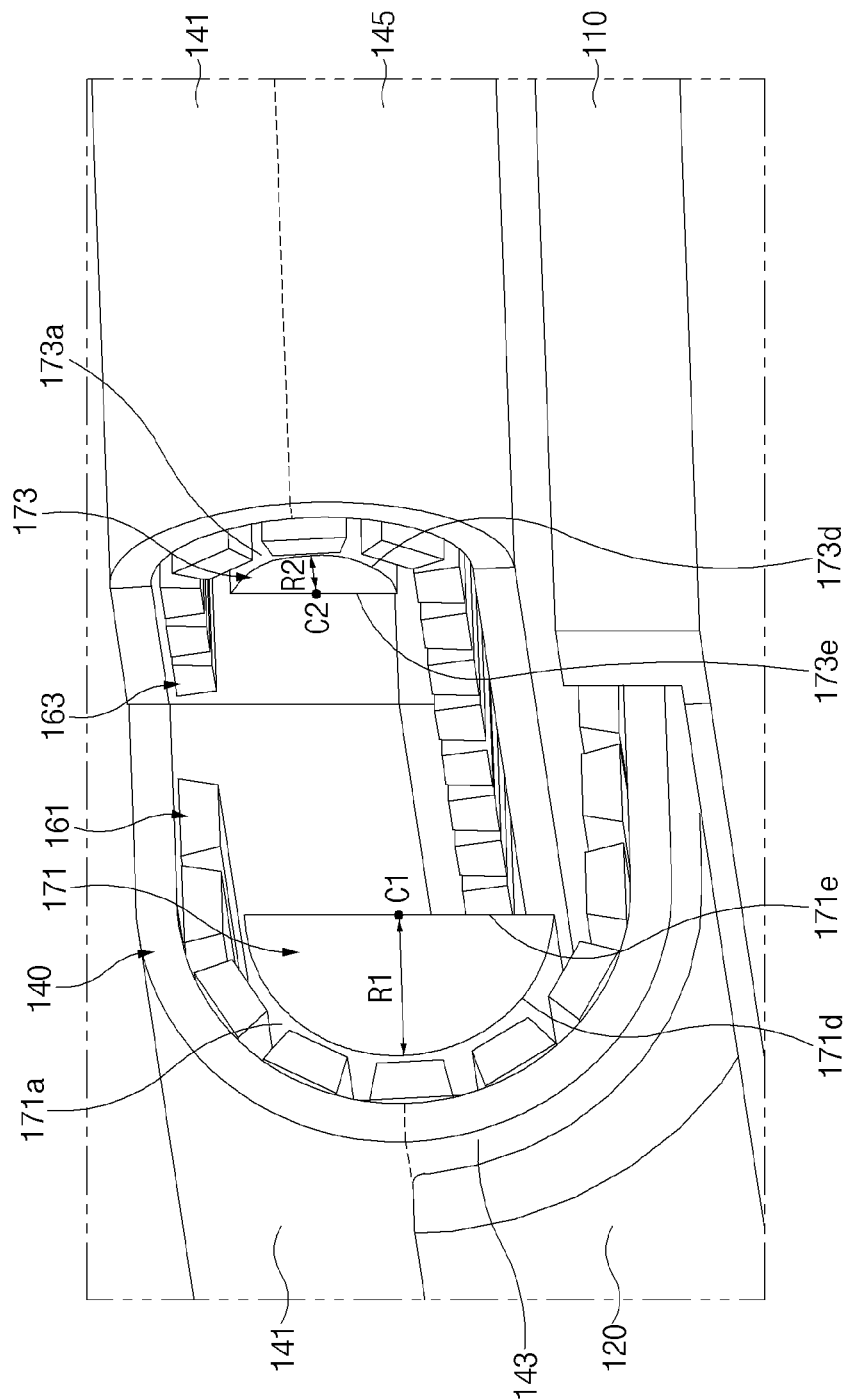
FIG. 4 illustrates a display, a display support member, and roll bars of an electronic device according to an embodiment of the disclosure.

FIG. 4 illustrates a display, a display support member, and a roll bars of an electronic device according to an embodiment of the disclosure.

Figure 5A:
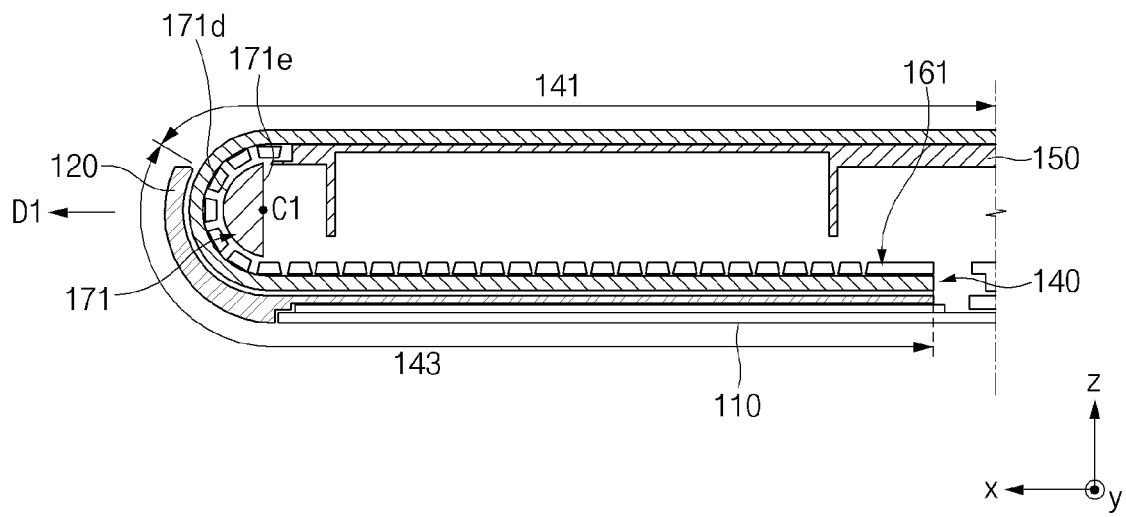
FIGS. 5A and 5B illustrate sections of portions of an electronic device according to various embodiments of the disclosure.
Figure 5B:
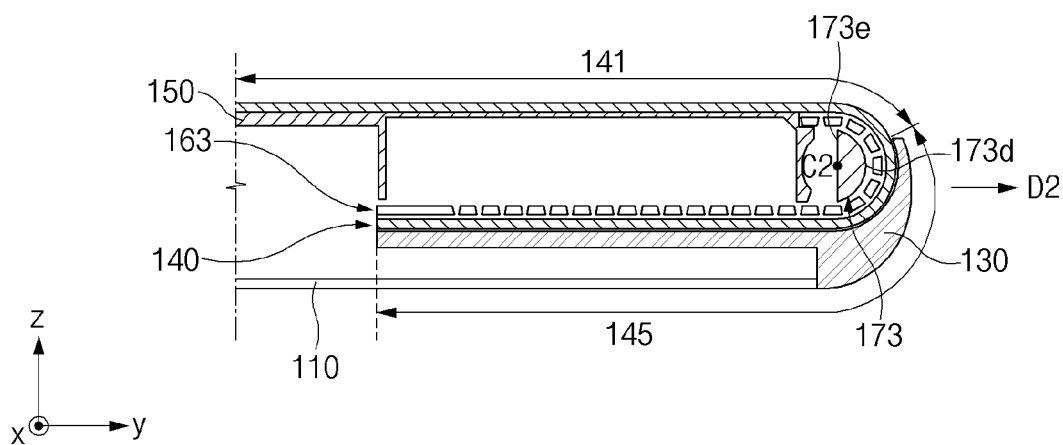

FIGS. 5A and 5B illustrate sections of portions of an electronic device according to various embodiments of the disclosure.

FIGS. 5A and 5B illustrate sectional views of different portions of the electronic device 100 when the electronic device 100 is in the default state (e.g., the default state 101 of FIG. 1). For example, FIG. 5A illustrates a section of the electronic device 100 taken along line A-A' in the default state 101 illustrated in FIG. 1, and FIG. 5B illustrates a section of the electronic device 100 taken along line B-B' in the default state 101 illustrated in FIG. 1.

Referring to FIGS. 4, 5A, and 5B, the electronic device 100 according to an embodiment may include the fixed structure 110, the first sliding structure 120, the second sliding structure 130, the display 140, the bracket 150, the first display support member 161, the second display support member 163, the first roll bar 171, and the second roll bar 173.

The components of the electronic device 100 illustrated in FIGS. 4, 5A, and 5B may be identical or similar to some of the components of the electronic device 100 illustrated in FIGS. 1 to 3, and repetitive descriptions will hereinafter be omitted.

In the electronic device 100 according to an embodiment, the first sub-region 143 and the second sub-region 145 of the display 140 may move into or out of the first sliding structure 120 and the second sliding structure 130 as the first sliding structure 120 and the second sliding structure 130 slide relative to the fixed structure 110 in directions perpendicular to each other. For example, the first sub-region 143 and the second sub-region 145 may extend from the main region 141 in the directions perpendicular to each other, and the first sub-region 143 and the second sub-region 145 may be moved into or out of the space under the main region 141 by the sliding motions of the first sliding structure 120 and the second sliding structure 130.

The electronic device 100 according to an embodiment may be configured such that a curved surface formed in a portion of the first sub-region 143 and a curved surface formed in a portion of the second sub-region 145 have different radii of curvature to avoid interference between the first sub-region 143 and the second sub-region 145 when the first sub-region 143 and the second sub-region 145 move. For example, the first sub-region 143 and the second sub-region 145 may be partially bent while moving along the curved surfaces 171a and 173a of the first roll bar 171 and the second roll bar 173, respectively, and the curved surfaces 171a and 173a of the first roll bar 171 and the second roll bar 173 may have different radii of curvature. Accordingly, interference between the first sub-region 143 and the second sub-region 145 may be prevented.

In an embodiment, the first roll bar 171 may be coupled to the first sliding structure 120 to move together with the first sliding structure 120 in the first direction D1 (e.g., the +x-axis direction) or the direction opposite to the first direction D1 (e.g., the −x-axis direction).

In an embodiment, the first roll bar 171 may include the first curved surface 171a surrounded by the first display support member 161. The first curved surface 171a of the first roll bar 171 may face the first display support member 161. For example, the first curved surface 171a of the first roll bar 171 may make contact with the first display support member 161, and the first display support member 161 and the first sub-region 143 may move along the first curved surface 171a by a sliding motion of the first sliding structure 120.

In an embodiment, the first curved surface 171a of the first roll bar 171 may have a specified first radius of curvature R1. For example, when viewed in the lengthwise direction (e.g., the y-axis direction) in which the first roll bar 171 extends, the first roll bar 171 may include a first circular arc 171d formed by the first curved surface 171a. The first radius of curvature R1 may be understood as the radius of a virtual circle extending from the first circular arc 171d. In an embodiment, the first radius of curvature R1 may be larger than a second radius of curvature R2 of the second roll bar 173 by a specified size.

In an embodiment, a cross-section of the first roll bar 171 taken in a direction perpendicular to the lengthwise direction (e.g., the x-axis direction) may have a substantially semicircular shape. For example, when the cross-section of the first roll bar 171 is viewed, the first roll bar 171 may include a first straight line 171e connecting opposite ends of the first circular arc 171d, and the first straight line 171e may overlap the center C1 of the first circular arc 171d. For example, the length of the first straight line 171e may be two times the first radius of curvature R1. That is, the first straight line 171e may mean the diameter of the virtual circle extending from the first circular arc 171d. In an embodiment, the first straight line 171e may be longer than a second straight line 173e of the second roll bar 173 (e.g., the diameter of the second roll bar 173). The shape of the first roll bar 171 illustrated in FIGS. 4, 5A, and 5B is illustrative, and the disclosure is not limited thereto.

In an embodiment, the second roll bar 173 may be coupled to the second sliding structure 130 to move together with the second sliding structure 130 in the second direction D2 (e.g., the +y-axis direction) or the direction opposite to the second direction D2 (e.g., the −y-axis direction).

In an embodiment, the second roll bar 173 may include the second curved surface 173a surrounded by the second display support member 163. The second curved surface 173a of the second roll bar 173 may face the second display support member 163. For example, the second curved surface 173a of the second roll bar 173 may make contact with the second display support member 163, and the second display support member 163 and the second sub-region 145 may move along the second curved surface 173a by a sliding motion of the second sliding structure 130.

In an embodiment, the second curved surface 173a of the second roll bar 173 may have the specified second radius of curvature R2. For example, when viewed in the lengthwise direction (e.g., the x-axis direction) in which the second roll bar 173 extends, the second roll bar 173 may include a second circular arc 173d formed by the second curved surface 173a. The second radius of curvature R2 may be understood as the radius of a virtual circle extending from the second circular arc 173d. In an embodiment, the second radius of curvature R2 may be smaller than the first radius of curvature R1 of the first roll bar 171 by a specified size.

In an embodiment, a cross-section of the second roll bar 173 taken in a direction perpendicular to the lengthwise direction (e.g., the y-axis direction) may have a substantially semicircular shape. For example, when the cross-section of the second roll bar 173 is viewed, the second roll bar 173 may include the second straight line 173e connecting opposite ends of the second circular arc 173d, and the second straight line 173e may overlap the center C2 of the second circular arc 173d. For example, the length of the second straight line 173e may be two times the second radius of curvature R2. That is, the second straight line 173e may mean the diameter of the virtual circle extending from the second circular arc 173d. In an embodiment, the second straight line 173e may be longer than the first straight line 171e of the first roll bar 171 (e.g., the diameter of the first roll bar 171). The shape of the second roll bar 173 illustrated in FIGS. 4, 5A, and 5B is illustrative, and the disclosure is not limited thereto.

In an embodiment, the first roll bar 171 and the second roll bar 173 may be disposed perpendicular to each other. For example, the first curved surface 171a (or, the first circular arc 171d) of the first roll bar 171 and the second curved surface 173a (or, the second circular arc 173d) of the second roll bar 173 may face in directions perpendicular to each other. The first curved surface 171a (or, the first circular arc 171d) of the first roll bar 171 may face in the first direction D1, and the second curved surface 173a (or, the second circular arc 173d) of the second roll bar 173 may face in the second direction D2.

In an embodiment, as the first radius of curvature R1 of the first curved surface 171a is greater than the second radius of curvature R2 of the second curved surface 173a, the first roll bar 171 and the second roll bar 173 may prevent interference between the first sub-region 143 and the second sub-region 145 and/or interference between the first display support member 161 and the second display support member 163. For example, the first radius of curvature R1 of the first roll bar 171 may be about 3 mm, and the second radius of curvature R2 of the second roll bar 173 may be about 1.6 mm. When the first roll bar 171 and the second roll bar 173 have a semicircular shape as illustrated in FIGS. 4, 5A, and 5B, the length of the first straight line 171e of the first roll bar 171 may be about 6 mm, and the length of the second straight line 173e of the second roll bar 173 may be about 3.2 mm. However, the numerical values for the radii of curvature of the first roll bar 171 and the second roll bar 173 are illustrative, and the disclosure is not limited thereto.

In an embodiment, the display 140 may include the main region 141, the first sub-region 143 extending from the main region 141 in the first direction D1 (e.g., the +x-axis direction), and the second sub-region 145 extending from the main region 141 in the second direction D2 (e.g., the +y-axis direction) perpendicular to the first direction D1.

In an embodiment, the main region 141, the first sub-region 143, and the second sub-region 145 of the display 140 may be regions divided from one another based on whether the regions are exposed outside the electronic device 100 in the default state of the electronic device 100. In FIGS. 4, 5A, and 5B, the boundary between the main region 141 and the first sub-region 143 and the boundary between the main region 141 and the second sub-region 145 are not boundaries that physically divide the display 140 and are not limited to specific positions. In various embodiments, the main region 141, the first sub-region 143, and the second sub-region 145 may be changed depending on the structure of the electronic device 100. For example, when the sidewall of the first sliding structure 120 surrounding the first sub-region 143 is formed to be higher or lower than that in the illustrated embodiment, the positions of the main region 141 and the first sub-region 143 may be changed correspondingly. Furthermore, when the sidewall of the second sliding structure 130 surrounding the second sub-region 145 is formed to be higher or lower than that in the illustrated embodiment, the positions of the main region 141 and the second sub-region 145 may be changed correspondingly.

In an embodiment, the display 140 may be configured such that at least a portion of the main region 141 is fixedly disposed on the bracket 150 and as the sliding structures 120 and 130 slide, the sub-regions 143 and 145 move into or out of the electronic device 100. For example, as illustrated in FIG. 5A, the first sub-region 143 may be located inside the first sliding structure 120 in the default state, and as the first sliding structure 120 moves in the first direction D1, at least a portion of the first sub-region 143 may move out of the first sliding structure 120 and may form the same plane as the main region 141. For example, as illustrated in FIG. 5B, the second sub-region 145 may be located inside the second sliding structure 130 in the default state, and as the second sliding structure 130 moves in the second direction D2, at least a portion of the second sub-region 145 may move out of the second sliding structure 130 and may form the same plane as the main region 141.

In an embodiment, the first sub-region 143, together with the first display support member 161, may be bent along the first curved surface 171a of the first roll bar 171. For example, the first display support member 161 may be attached to the rear surface of the first sub-region 143, and the first display support member 161 may surround the first curved surface 171a of the first roll bar 171 and may be bent while making contact with the first curved surface 171a. For example, the first sub-region 143 may be bent together with the first display support member 161 and may extend from the main region 141 while forming a curved surface having a radius of curvature greater than the first radius of curvature R1.

In an embodiment, the first sub-region 143 and the first display support member 161 may extend so as to be located below the second sub-region 145. For example, at least a portion of the first sub-region 143 and at least a portion of the first display support member 161 may be located between the fixed structure 110 (e.g., the first plate 111) and the second sub-region 145.

In an embodiment, the second sub-region 145, together with the first display support member 161, may be bent along the second curved surface 173a of the second roll bar 173. For example, the second display support member 163 may be attached to the rear surface of the second sub-region 145, and the second display support member 163 may surround the second curved surface 173a of the second roll bar 173 and may be bent while making contact with the second curved surface 173a. For example, the second sub-region 145 may be bent together with the second display support member 163 and may extend from the main region 141 while forming a curved surface having a radius of curvature greater than the second radius of curvature R2.

In an embodiment, the second sub-region 145 and the second display support member 161 may extend so as to be located above the first sub-region 143 and the first display support member 161. For example, at least a portion of the first sub-region 143 and at least a portion of the first display support member 161 may be located between the bracket 150 (e.g., the second surface 153 of FIG. 2) and the first display support member 161.

According to the embodiment illustrated in FIGS. 4, 5A, and 5B, as the first radius of curvature R1 of the first roll bar 171 is greater than the second radius of curvature R2 of the second roll bar 173, the first sub-region 143 may move into the space between the second sub-region 145 and the fixed structure 110 in the electronic device 100. However, the electronic device 100 is not limited to the illustrated structure. According to various embodiments, the electronic device 100 may be configured such that the first radius of curvature R1 is smaller than the second radius of curvature R2 and the first sub-region 143 moves into the space between the bracket 150 and the second sub-region 145.

In an embodiment, a portion of the display 140 supported by the bracket 150 may be a portion that remains substantially flat irrespective of sliding of the sliding structures 120 and 130. Furthermore, a portion of the display 140 supported by the display support member 160 may be a portion that is deformed to be curved or flat in response to movement of the sliding structures 120 and 130. For example, one portion of the display 140 supported by the bracket 150 may be a rigid portion, and another portion of the display 140 supported by the display support member 160 may be a flexible portion. According to the embodiment illustrated in FIGS. 4, 5A, and 5B, the main region 141 may include the rigid portion and part of the flexible portion, and the first sub-region 143 and the second sub-region 145 may include the remaining part of the flexible portion. However, without being limited to the above-described example, the entire display 140 may be formed of a flexible material.

In an embodiment, the first display support member 161 may be implemented in a structure in which when unbent flat, one surface on which the display 140 is disposed forms a substantially flat surface and raised portions and recessed portions are regularly arranged on an opposite surface facing away from the one surface in the sliding direction of the first sliding structure 120 (e.g., the x-axis direction). For example, as the one surface forms a flat surface, the first display support member 161 may support the display 140 such that the display 140 remains in a flat state. For example, the first display support member 161 may be partially bendable due to the bumpy structure on the opposite surface.

In an embodiment, a portion of the first display support member 161 may be attached to the rear surface of the first sub-region 143. The remaining portion of the first display support member 161 may be attached to a rear surface of a partial area of the main region 141 that is not attached to the bracket 150. However, the position to which the first display support member 161 is attached is not limited to the above-described example.

In an embodiment, the second display support member 163 may be implemented in a structure in which when unbent flat, one surface on which the display 140 is disposed forms a substantially flat surface and raised portions and recessed portions are regularly arranged on an opposite surface facing away from the one surface in the sliding direction of the second sliding structure 130 (e.g., the y-axis direction). For example, as the one surface forms a flat surface, the second display support member 163 may support the display 140 such that the display 140 remains in a flat state. For example, the second display support member 163 may be partially bendable due to the bumpy structure on the opposite surface.

In an embodiment, a portion of the second display support member 163 may be attached to the rear surface of the second sub-region 145. The remaining portion of the second display support member 163 may be attached to a rear surface of a partial area of the main region 141 that is not attached to the bracket 150. However, the position to which the second display support member 163 is attached is not limited to the above-described example.

Figure 6:
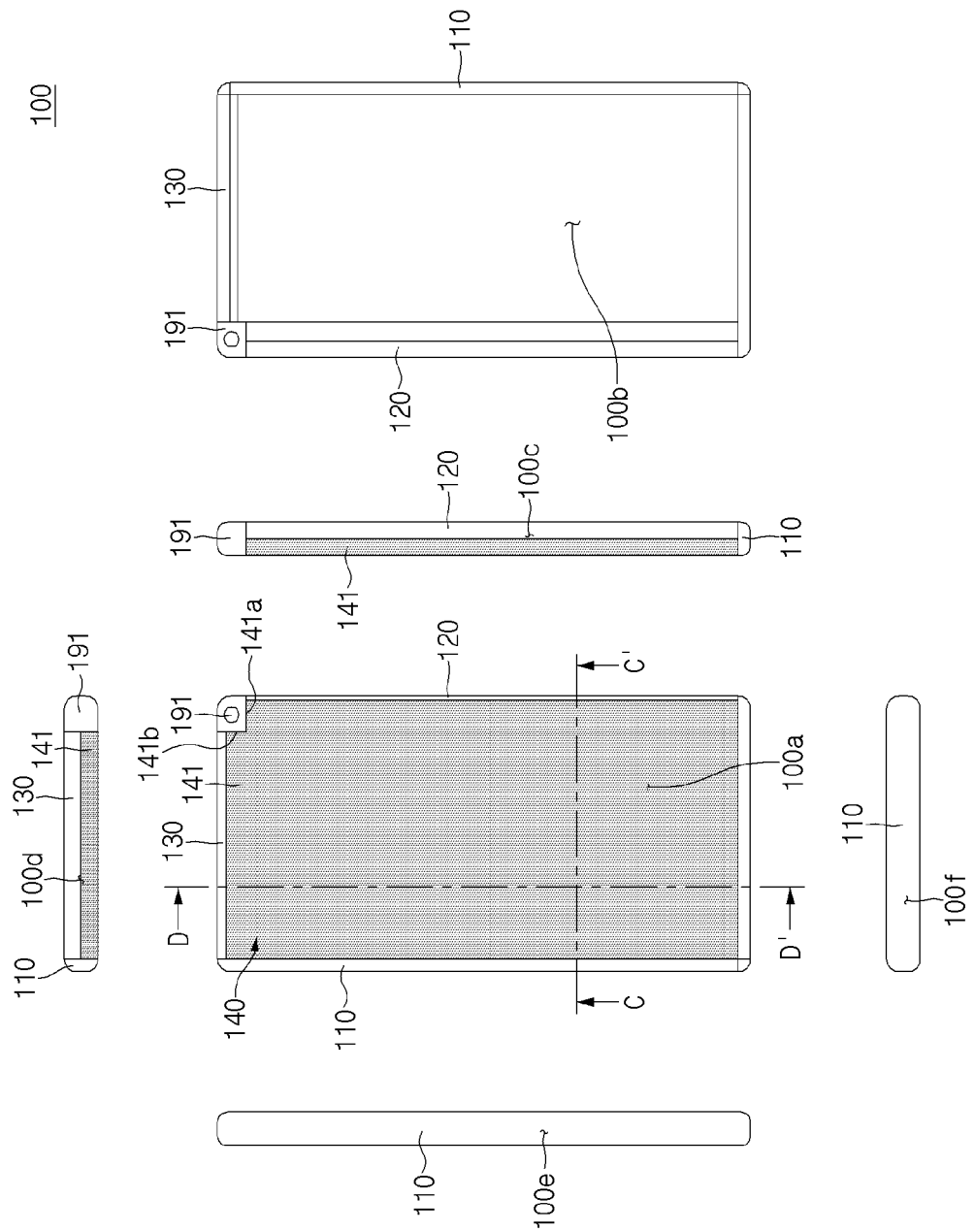
FIG. 6 illustrates a default state of an electronic device according to an embodiment of the disclosure.

FIG. 6 illustrates the default state of an electronic device according to an embodiment of the disclosure.

FIG. 7 illustrates the first extended state of an electronic device according to an embodiment of the disclosure.

FIGS. 8A and 8B illustrate a second extended state and a third extended state of an electronic device according to various embodiments of the disclosure.

FIG. 6 illustrates six orthogonal views (e.g., a front view, a rear view, a left side view, a right side view, a top view, and a bottom view) of the electronic device 100 when the electronic device 100 is in the default state (e.g., the default state 101 of FIG. 1).

FIG. 7 illustrates six orthogonal views (e.g., a front view, a rear view, a left side view, a right side view, a top view, and a bottom view) of the electronic device 100 when the electronic device 100 is in the first extended state (e.g., the first extended state 103 of FIG. 1).

FIGS. 8A and 8B illustrate front views of the electronic device 100 when the electronic device 100 is in the second extended state and the third extended state. For example, FIG. 8A illustrates the second extended state of the electronic device 100, and FIG. 8B illustrates the third extended state of the electronic device 100.

Referring to FIGS. 6, 7, 8A, and 8B, the electronic device 100 according to an embodiment may include the fixed structure 110, the first sliding structure 120, the second sliding structure 130, the display 140, and the camera module 191.

The components of the electronic device 100 illustrated in FIGS. 6, 7, 8A, and 8B may be identical or similar to some of the components of the electronic device 100 illustrated in FIGS. 1, 2, 3, 4, 5A, and 5B, and repetitive descriptions will hereinafter be omitted.

In an embodiment, the camera module 191 may be disposed at a corner portion of the electronic device 100. For example, based on FIGS. 6 and 7, the camera module 191 may be located adjacent to a corner portion of the main region 141 connected with the first sub-region 143 and the second sub-region 145 when the display 140 is viewed from above. The main region 141 of the display 140 may be formed in a shape in which a first edge 141a of a region from which the first sub-region 143 extends and a second edge 141b of a region from which the second sub-region 145 extends are perpendicular to each other. The camera module 191 may be located at a corner portion where the first edge 141a and the second edge 142b meet while being perpendicular to each other. In various embodiments, the camera module 191 may be fixedly disposed on the fixed structure 110 or the bracket (e.g., the bracket 150 of FIG. 2) so as to be separated from sliding of the first sliding structure 120 and the second sliding structure 130.

Hereinafter, at least one of movement or arrangement of the sliding structures 120 and 130 and the display 140 depending on each state of the electronic device 100 will be described with reference to FIGS. 6, 7, 8A, and 8B.

The electronic device 100 according to an embodiment may be deformed or changed between the default state, the first extended state, the second extended state, and the third extended state. For example, the display 140 that forms a front surface 100a of the electronic device 100 may have the smallest size in the default state and may have the largest size in the first extended state. The size of the display 140 that forms the front surface 100a of the electronic device 100 in the second extended state and the third extended state may be larger than that in the default state and may be smaller than that in the first extended state.

Referring to FIG. 6, the default state of the electronic device 100 according to an embodiment may mean a state in which the main region 141 of the display 140 forms the outer surface of the electronic device 100 and the sub-regions 143 and 145 are located inside the electronic device 100 (or, inside the sliding structures 120 and 130). For example, the default state may be a state in which only the main region 141 is exposed outside the electronic device 100 and the first sub-region 143 and the second sub-region 145 are not exposed outside the electronic device 100.

According to an embodiment, in the default state, the main region 141 of the display 140 may be exposed to the outside. For example, the main region 141 may form a portion of the front surface 100a of the electronic device 100 and a portion of a side surface of the electronic device 100. In the default state, the main region 141 may form a portion of a first side surface 100c together with the first sliding structure 120 and may form a portion of a second side surface 100d together with the second sliding structure 130.

According to an embodiment, in the default state, the fixed structure 110 may form a portion of a rear surface 100b of the electronic device 100 and a portion of a side surface of the electronic device 100. For example, in the default state, the fixed structure 110 may form a portion of the rear surface 100b together with the first sliding structure 120 and the second sliding structure 130. In the default state, the fixed structure 110 may form a third side surface 100e and a fourth side surface 100f. For example, the third side surface 100e may be a surface facing away from the first side surface 100c, and the fourth side surface 100f may be a surface facing away from the second side surface 100d.

Referring to FIG. 7, the first extended state of the electronic device 100 according to an embodiment may mean a state in which at least portions of the sub-regions 143 and 145 of the display 140 form the outer surface of the electronic device 100 together with the main region 141 of the display 140. For example, the first extended state may be a state in which the main region 141, the first sub-region 143, and the second sub-region 145 are exposed outside the electronic device 100. The first extended state may be a state in which the first sub-region 143 and the second sub-region 145 are exposed outside the electronic device 100 to the maximum.

According to an embodiment, the electronic device 100 may be changed from the default stat to the first extended state as the first sliding structure 120 slides in the first direction D1 and the second sliding structure 130 slides in the second direction D2. For example, as the first sliding structure 120 slides in the first direction D1, at least a portion of the first sub-region 143 may move out of the first sliding structure 120 and may be exposed to the outside. For example, as the second sliding structure 130 slides in the second direction D2, at least a portion of the second sub-region 145 may move out of the second sliding structure 130 and may be exposed to the outside.

According to an embodiment, in the first extended state, the main region 141, the first sub-region 143, and the second sub-region 145 of the display 140 may be exposed to the outside. For example, the main region 141, the first sub-region 143, and the second sub-region 145 may form a portion of the front surface of the electronic device 100 and a portion of a side surface of the electronic device 100. In the first extended state, the first sub-region 143 may form a portion of the first side surface 100c together with the first sliding structure 120, and the second sub-region 145 may form a portion of the second side surface 100d together with the second sliding structure 130.

According to an embodiment, in the first extended state, the second plate 121 of the first sliding structure 120 and the third plate 131 of the second sliding structure 130 may be exposed outside the fixed structure 110. For example, a portion of the second plate 121 and a portion of the third plate 131 may not be exposed by being hidden by the fixed structure 110 in the default state and may be exposed by moving in the first direction D1 and the second direction D2 from the fixed structure 110 in the first extended state. At least a portion of the second plate 121 and at least a portion of the third plate 131 may form the rear surface 100b of the electronic device 100 together with the fixed structure 110 in the first extended state.

Referring to FIG. 8A, the second extended state of the electronic device 100 according to an embodiment may mean a state in which at least a portion of the first sub-region 143 of the display 140 forms the outer surface of the electronic device 100 together with the main region 141 of the display 140 and the second sub-region 145 is located inside the electronic device 100 (or, inside the second sliding structure 130). For example, the second extended state may be a state in which only the main region 141 and the first sub-region 143 are exposed outside the electronic device 100 and the second sub-region 145 is not exposed outside the electronic device 100.

According to an embodiment, the electronic device 100 may be changed from the default state to the first extended state as the first sliding structure 120 slides in the first direction D1. For example, as the first sliding structure 120 slides in the first direction D1, at least a portion of the first sub-region 143 may move out of the first sliding structure 120 and may be exposed to the outside. In another example, when the electronic device 100 is in the first extended state, the electronic device 100 may be changed to the second extended state as the second sliding structure 130 slides in the direction opposite to the second direction D2.

Referring to FIG. 8B, the third extended state of the electronic device 100 according to an embodiment may mean a state in which at least a portion of the second sub-region 145 of the display 140 forms the outer surface of the electronic device 100 together with the main region 141 of the display 140 and the first sub-region 143 is located inside the electronic device 100 (or, inside the first sliding structure 120). For example, the third extended state may be a state in which only the main region 141 and the second sub-region 145 are exposed outside the electronic device 100 and the first sub-region 143 is not exposed outside the electronic device 100.

According to an embodiment, the electronic device 100 may be changed from the default state to the third extended state as the second sliding structure 130 slides in the second direction D2. For example, as the second sliding structure 130 slides in the second direction D2, at least a portion of the second sub-region 145 may move out of the second sliding structure 130 and may be exposed to the outside. In another example, when the electronic device 100 is in the first extended state, the electronic device 100 may be changed to the third extended state as the first sliding structure 120 slides in the direction opposite to the first direction D1.

The electronic device 100 according to an embodiment may be directly changed from one of a plurality of states (e.g., the default state, the first extended state, the second extended state, and the third extended state) to another state. For example, the electronic device 100 may be directly changed from the default state to one of the first extended state, the second extended state, and the third extended state. For example, the electronic device 100 may be directly changed from the first extended state to one of the default state, the second extended state, and the third extended state. For example, the electronic device 100 may be changed from the second extended state to one of the default state, the first extended state, and the third extended state, or from the third extended state to one of the default state, the first extended state, and the second extended state.

In the electronic device 100 according to an embodiment, a sliding motion of the first sliding structure 120 and a sliding motion of the second sliding structure 130 may be performed independently of each other. For example, the first sliding structure 120 and the second sliding structure 130 may simultaneously or sequentially slide.

In various embodiments, the display 140 may be deformed into a plurality of forms or states depending on each state of the electronic device 100. For example, a state/form of the display 140 in which only the main region 141 of the display 140 is exposed to the outside in the default state of the electronic device 100 may be defined as a first state. A state/form of the display 140 in which the main region 141 and the first sub-region 143 of the display 140 are exposed to the outside in the second extended state of the electronic device 100 may be defined as a second state. A state/form of the display 140 in which the main region 141 and the second sub-region 145 of the display 140 are exposed to the outside in the third extended state of the electronic device 100 may be defined as a third state. A state/form of the display 140 in which the main region 141, the first sub-region 143, and the second sub-region 145 of the display 140 are exposed to the outside in the first extended state of the electronic device 100 may be defined as a fourth state.

Figure 9A:
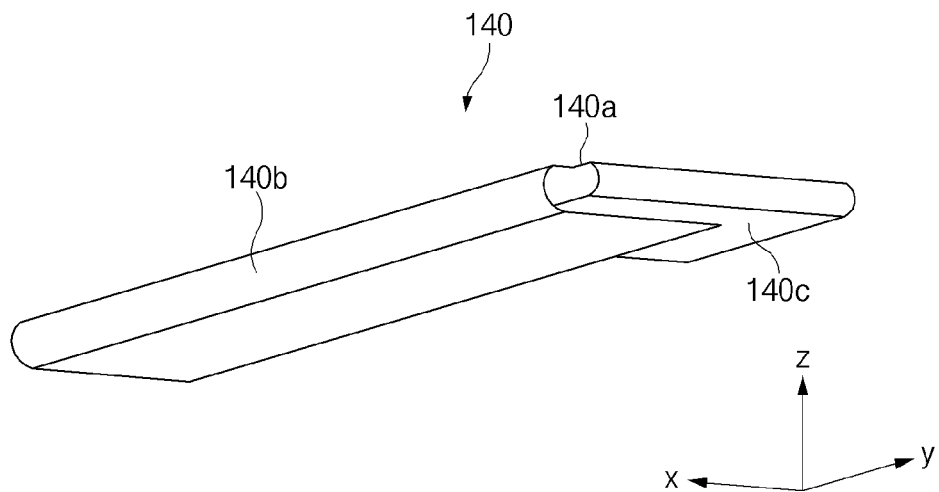
FIGS. 9A and 9B illustrate a display of an electronic device according to various embodiments of the disclosure.
Figure 9B:
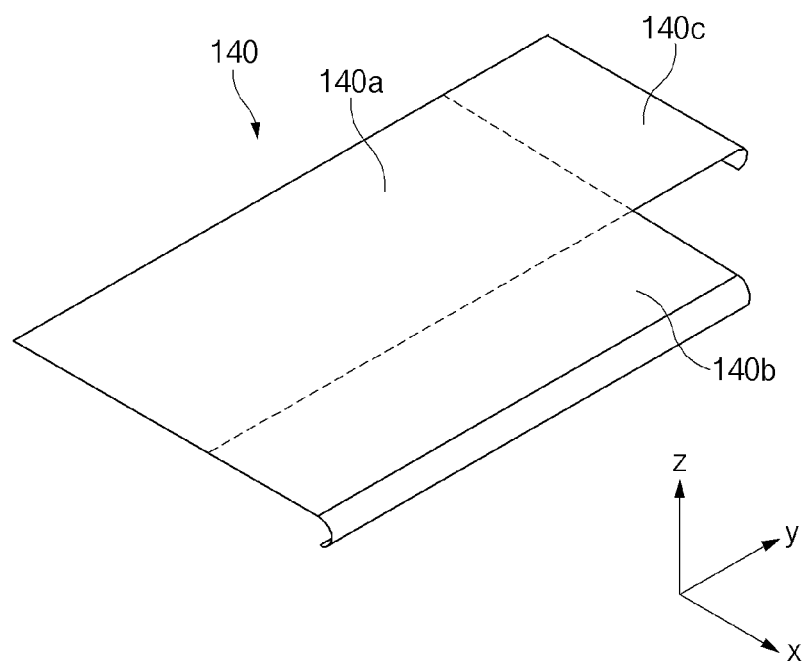

FIGS. 9A and 9B illustrate a display of an electronic device according to various embodiments of the disclosure.

Figure 10A:
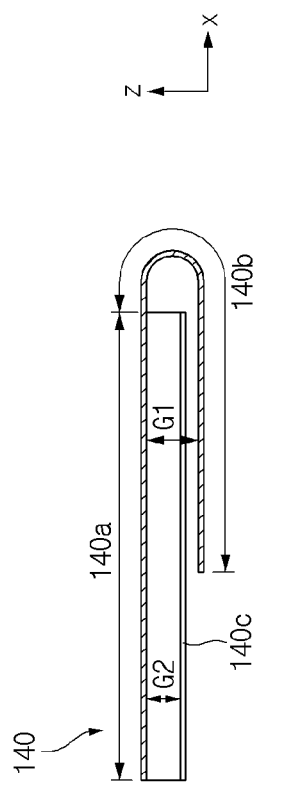
FIGS. 10A and 10B illustrate a display of an electronic device according to various embodiments of the disclosure.
Figure 10B:
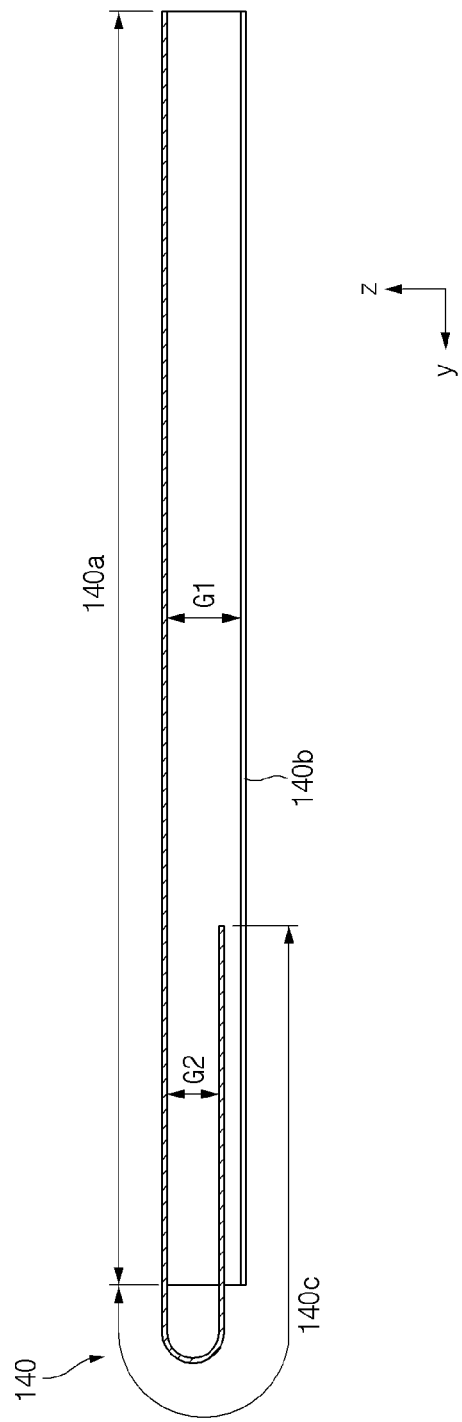

FIGS. 10A and 10B illustrate a display of an electronic device according to various embodiments of the disclosure.

FIGS. 11A and 11B illustrate a display of an electronic device according to various embodiments of the disclosure.

FIG. 9A illustrates the shape of the display 140 in the default state of the electronic device 100 (e.g., the default state 101 of FIG. 1 of the state of FIG. 6), and FIG. 9B illustrates the shape of the display 140 in the first extended state of the electronic device 100 (e.g., the first extended state 103 of FIG. 1 or the state of FIG. 7).

FIGS. 10A and 10B are sectional views illustrating a section of the display 140 in the default state of the electronic device 100 according to various embodiments of the disclosure.

For example, FIG. 10A illustrates a section of the display 140 taken along line C-C' illustrated in FIG. 6, and FIG. 10B illustrates a section of the display 140 taken along line D-D' illustrated in FIG. 6.

FIGS. 11A and 11B are sectional views illustrating a section of the display 140 in the first extended state of the electronic device 100 according to various embodiments of the disclosure.

For example, FIG. 11A illustrates a section of the display 140 taken along line E-E' illustrated in FIG. 7, and FIG. 11B illustrates a section of the display 140 taken along line F-F' illustrated in FIG. 7.

Referring to FIGS. 9A, 9B, 10A, 10B, 11A, and 11B, the display 140 of the electronic device 100 according to an embodiment may be an amorphous display 140, and at least one of the shape or form of the display 140 may be deformed in response to a state of the electronic device 100.

In an embodiment, the display 140 may include a first portion 140a, a second portion 140b extending from an end portion of the first portion 140a that faces in the first direction D1, and a third portion 140c extending from an end portion of the first portion 140a that faces in the second direction D2. For example, the first portion 140a may be formed in a substantially quadrangular (e.g., rectangular) shape. As illustrated in FIGS. 9A and 9B, the second portion 140b may extend with a width equal to the length of a side of a rectangle that faces in the first direction D1, and the third portion 140c may extend with a width equal to the length of a side of the rectangle that faces in the second direction D2. The second portion 140b and the third portion 140c may be perpendicular to each other.

In an embodiment, the first portion 140a may form the main region of the display 140 (e.g., the main region 141 of FIGS. 6, 7, 8A, and 8B) together with part of the second portion 140b and part of the third portion. The remaining part of the second portion 140b may form the first sub-region of the display 140 (e.g., the first sub-region 143 of FIGS. 7, 8A, and 8B). The remaining part of the third portion 140c may form the second sub-region of the display 140 (e.g., the second sub-region 145 of FIGS. 7, 8A, and 8B).

For example, referring to the display illustrated in FIGS. 6 and 7 (e.g., the display 140 of FIGS. 6 and 7) together, in the default state, part of the second portion 140b may be exposed outside the electronic device 100 together with the first portion 140a, and the remaining part of the second portion 140b may not be exposed outside the electronic device 100. The remaining part of the second portion 140b may be exposed outside the electronic device 100 in the first extended state or the second extended state. For example, in the default state, part of the third portion 140c may be exposed outside the electronic device 100 together with the first portion 140a, and the remaining part of the third portion 140c may not be exposed outside the electronic device 100. The remaining part of the third portion 140c may be exposed outside the electronic device 100 in the first extended state or the third extended state. However, the positions of the first portion 140a, the second portion 140b, and the third portion 140c of the display 140 depending on each state of the electronic device 100 are not limited to the above-described example. In various embodiments, the display 140 may be configured such that the first portion 140a substantially forms the main region 141, the second portion 140b substantially forms the first sub-region 143, and the third portion 140c substantially forms the second sub-region 145. For example, the first portion 140a, the second portion 140b, and the third portion 140c may be substantially the same portions or regions as the main region 141, the first sub-region 143, and the second sub-region 145, respectively.

In an embodiment, the display 140 may be configured such that at least part of the second portion 140b and at least part of the third portion 140c are located to face a rear surface of the first portion 140a without interference between the second portion 140b and the third portion 140c, or the second portion 140b and the third portion 140c form the same plane as a front surface of the first portion 140a. For example, as illustrated in FIG. 9A, in the default state, part of the second portion 140b and part of the third portion 140c may be located on the rear surface of the first portion 140a while crossing and overlapping each other.

In an embodiment, when the electronic device 100 is in the default state, the second portion 140b and the third portion 140c may partially face each other, and portions facing each other may be spaced apart from each other by a specified gap. As illustrated in FIGS. 10A and 10B, the second portion 140b may extend while being bent from the first portion 140a, and at least part of the second portion 140b may be located to face the rear surface of the first portion 140a. The third portion 140c may extend while being bent from the first portion 140a, and at least part of the third portion 140c may be located to face the rear surface of the first portion 140a. For example, based on FIGS. 10A and 10B, in the default state, the display 140 may form a shape in which part of the third portion 140c is located below the first portion 140a and part of the second portion 140b is located below the third portion 140c.

In an embodiment, in the default state, the display 140 may be provided in a form in which a bent portion of the second portion 140b is bent while forming a radius of curvature greater than that of a bent portion of the third portion 104c such that at least part of the second portion 140b and at least part of the third portion 140c are spaced apart from each other by a predetermined gap and located below the first portion 140a. As illustrated in FIGS. 10A and 10B, the second portion 140b may extend from the first portion 140a, and part of the second portion 140b may be bent to face the first portion 140a while forming a first gap G1. The third portion 140c may extend from the first portion 140a, and part of the third portion 140c may be bent to face the first portion 140a while forming a second gap G2 smaller than the first gap G1. For example, the gap between the second portion 140b and the third portion 140c may substantially correspond to the difference between the first gap G1 and the second gap G2. In various embodiments, the degrees to which part of the second portion 140b and part of the third portion 140c are bent (e.g., the gaps or the radii of curvature) may be determined based on the radii of curvature R1 and R2 of the curved surfaces (e.g., the curved surfaces 171a and 173a of FIGS. 4, 5A, and 5B) of the roll bars (e.g., the roll bars 171 and 173 of FIGS. 4, 5A, and 5B) surrounded by the second portion 140b (or, the first display support member 161) and the third portion 140c (or, the second display support member 163).

In an embodiment, when the electronic device 100 is changed from the default state to the first extended state, an end portion of the second portion 140b may move in the first direction D1, and part of the second portion that faces the first portion 140a in the default state may move to form the same plane as the first portion 140a. For example, the end portion of the second portion 140b may be spaced apart from the part of the second portion 140b by the first gap G1.

In an embodiment, when the electronic device 100 is changed from the default state to the first extended state, an end portion of the third portion 140c may move in the second direction D2, and part of the third portion 140c that faces the first portion 140a in the default state may move to form the same plane as the first portion 140a. For example, the end portion of the third portion 140c may be spaced apart from the part of the third portion 140c by the second gap G2.

According to the embodiment illustrated in FIGS. 9A, 9B, 10A, 10B, 11A, and 11B, the display 140 may be configured such that the radius of curvature of the second portion 140b is larger than the radius of curvature of the third portion 140c and thus the third portion 140c moves between the first portion 140a and the second portion 140b. However, the shape of the display 140 may be deformed to correspond to the structure of the electronic device 100. According to various embodiments, the display 140 may be changed such that the radius of curvature of the third portion 140c is larger than the radius of curvature of the second portion 140b and thus the second portion 140b moves between the first portion 140a and the third portion 140c.

Figure 12:
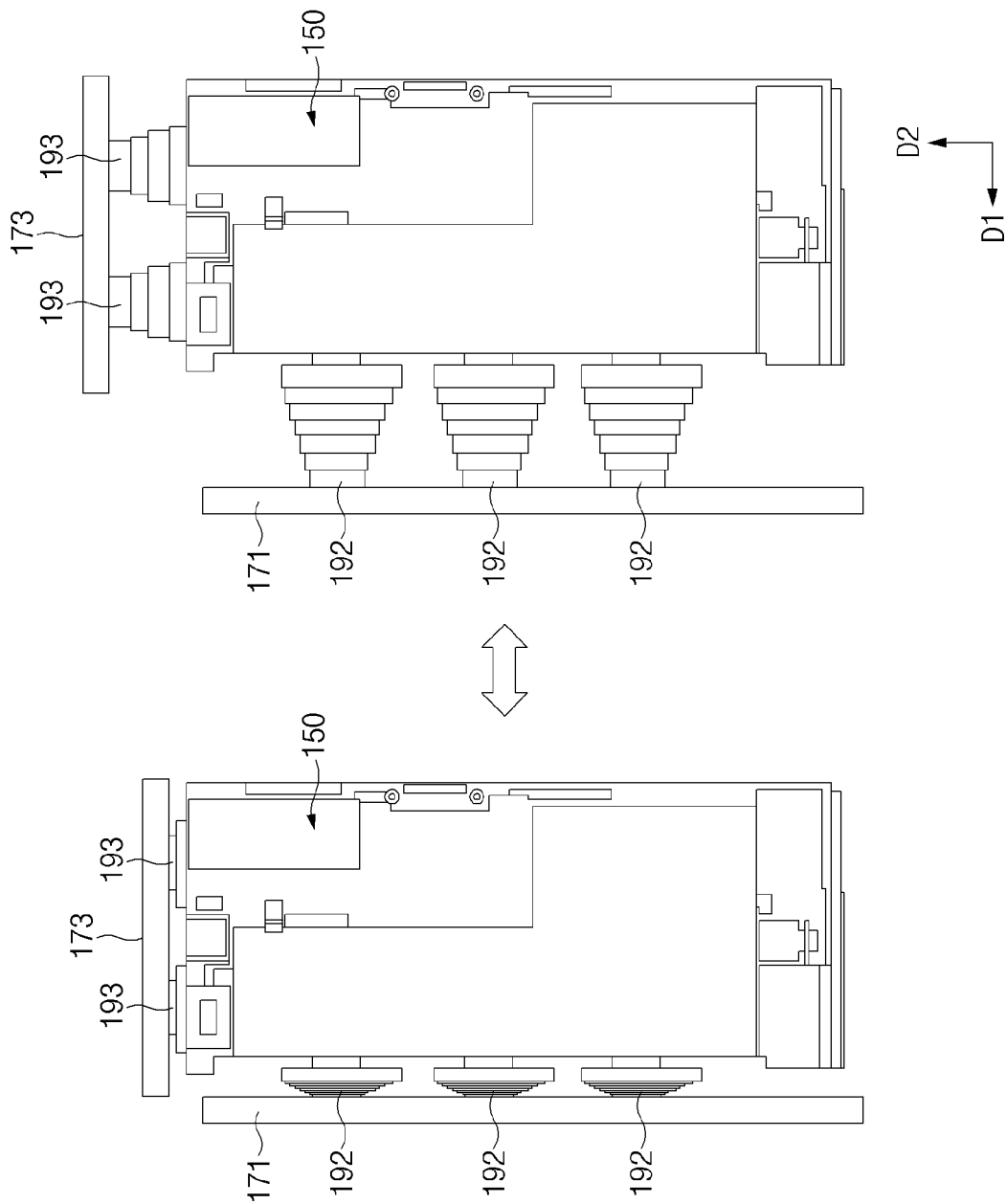
FIG. 12 illustrates a bracket, roll bars, and drive members of an electronic device according to an embodiment of the disclosure.

FIG. 12 illustrates a bracket, roll bars, and drive members of an electronic device according to an embodiment of the disclosure.

Referring to FIG. 12, the electronic device 100 according to an embodiment may include the bracket 150, the first roll bar 171, the second roll bar 173, a first drive member 192, and a second drive member 193.

In an embodiment, the first drive member 192 may provide a physical force (a driving force) for moving the first roll bar 171 in the first direction D1 or the direction opposite to the first direction D1. The first drive member 192 may be disposed between the first roll bar 171 and the bracket 150. For example, the first drive member 192 may be coupled to the first roll bar 171 and an edge of the bracket 150 that faces in the first direction D1.

In an embodiment, the first drive member 192 may move the first roll bar 171 in the first direction D1 or the direction opposite to the first direction D1. For example, the first drive member 192 may be formed in a structure that can be compressed or stretched. The first roll bar 171 may move in the first direction D1 as the first drive member 192 is stretched. The first roll bar 171 may move in the direction opposite to the first direction D1 as the first drive member 192 is compressed. In various embodiments, the first roll bar 171 may move together with the first sliding structure (e.g., the first sliding structure 120 of FIGS. 1, 2, 3, 4, 5A, 5B, 6, 7, 8A, and 8B), and a sliding motion of the first sliding structure 120 may be performed by the movement of the first roll bar 171.

In an embodiment, the first drive member 192 may be configured to support the first display support member (e.g., the first display support member 161 of FIGS. 2, 3, 4, 5A, and 5B) that surrounds the first roll bar 171. For example, when the electronic device 100 is in the first extended state (e.g., the state of FIG. 7) or the second extended state (e.g., the state of FIG. 8A), the first drive member 192 may be located on the rear surface of the first display support member 161 and may support the first display support member 161 such that the first display support member 161 does not sag or stretch into the space between the first roll bar 171 and the bracket 150. Accordingly, the electronic device 100 may be configured such that in the first extended state or the second extended state, the first sub-region 143 of the display 140 is exposed outside the electronic device 100 while remaining in a flat state.

In an embodiment, the second drive member 193 may provide a driving force for moving the second roll bar 173 in the second direction D2 or the direction opposite to the second direction D2. The second drive member 193 may be disposed between the second roll bar 173 and the bracket 150. For example, the second drive member 193 may be coupled to the second roll bar 173 and an edge of the bracket 150 that faces in the second direction D2.

In an embodiment, the second drive member 193 may move the second roll bar 173 in the second direction D2 or the direction opposite to the second direction D2. For example, the second drive member 193 may be formed in a structure that can be compressed or stretched. The second roll bar 173 may move in the second direction D2 as the second drive member 193 is stretched. The second roll bar 173 may move in the direction opposite to the second direction D2 as the second drive member 193 is compressed. In various embodiments, the second roll bar 173 may move together with the second sliding structure (e.g., the second sliding structure 130 of FIGS. 1, 2, 3, 4, 5A, 5B, 6, 7, 8A, and 8B), and a sliding motion of the second sliding structure 130 may be performed by the movement of the second roll bar 173.

In an embodiment, the second drive member 193 may be configured to support the second display support member (e.g., the second display support member 163 of FIGS. 2, 3, 4, 5A, and 5B) that surrounds the second roll bar 173. For example, when the electronic device 100 is in the first extended state (e.g., the state of FIG. 7) or the third extended state (e.g., the state of FIG. 8B), the second drive member 193 may be located on the rear surface of the second display support member 163 and may support the second display support member 163 such that the second display support member 163 does not sag or stretch into the space between the second roll bar 173 and the bracket 150. Accordingly, the electronic device 100 may be configured such that in the first extended state or the third extended state, the second sub-region 145 of the display 140 is exposed outside the electronic device 100 while remaining in a flat state.

In an embodiment, the drive members (e.g., the first drive member 192 and the second drive member 193) may be formed in a pipe (or, socket) structure of a telescopic type that can be compressed or stretched. For example, the drive members 192 and 193 may be formed in a structure in which a plurality of pipes (or, sockets) having different sizes are stacked and the entire length is increased or decreased as one pipe moves into or out of another pipe. However, at least one of the shapes or structures of the drive members 192 and 193 are not limited to the illustrated embodiment.

In an embodiment, the drive members (e.g., the first drive member 192 and the second drive member 193) may be configured to be compressed or stretched by a power device (not illustrated) (e.g., a motor) disposed inside the electronic device 100. For example, the processor of the electronic device 100 (e.g., the processor 1520 of FIGS. 5A and 5B) may control the power device based on a user input, thereby compressing or stretching at least one of the first drive member 192 or the second drive member 193. In various embodiments, when the electronic device 100 is in the default state, the processor 1520 may detect a user input for changing the electronic device 100 to the first extended state and may operate the power device such that the first drive member 192 and the second drive member 193 are stretched. However, an operating method of the drive members 192 and 193 is not limited to the above-described example.

In various embodiments, the drive members (e.g., the first drive member 192 or the second drive member 193) may be configured to be compressed or stretched by using an elastic force. For example, the drive members 192 and 193 may include elastic members (not illustrated) (e.g., springs), and the elastic members may be compressed or stretched between the roll bars 170 and the bracket 150. The roll bars 170 may move toward the bracket 150, or may move away from the bracket 150, in response to compression or tension of the elastic members. In the embodiment, the electronic device 100 may further include a stopping structure (not illustrated) for limiting movement of the roll bars 170 such that the elastic members of the drive members 192 and 193 remain compressed. For example, the stopping structure may limit movement of the sliding structures 120 and 130 or the roll bars 170 in a stopped state to allow the elastic members to remain compressed, and when the stopped state is released, the elastic members may move at least one of the sliding structures 120 and 130 or the roll bars 170 while being stretched.

Figure 13:
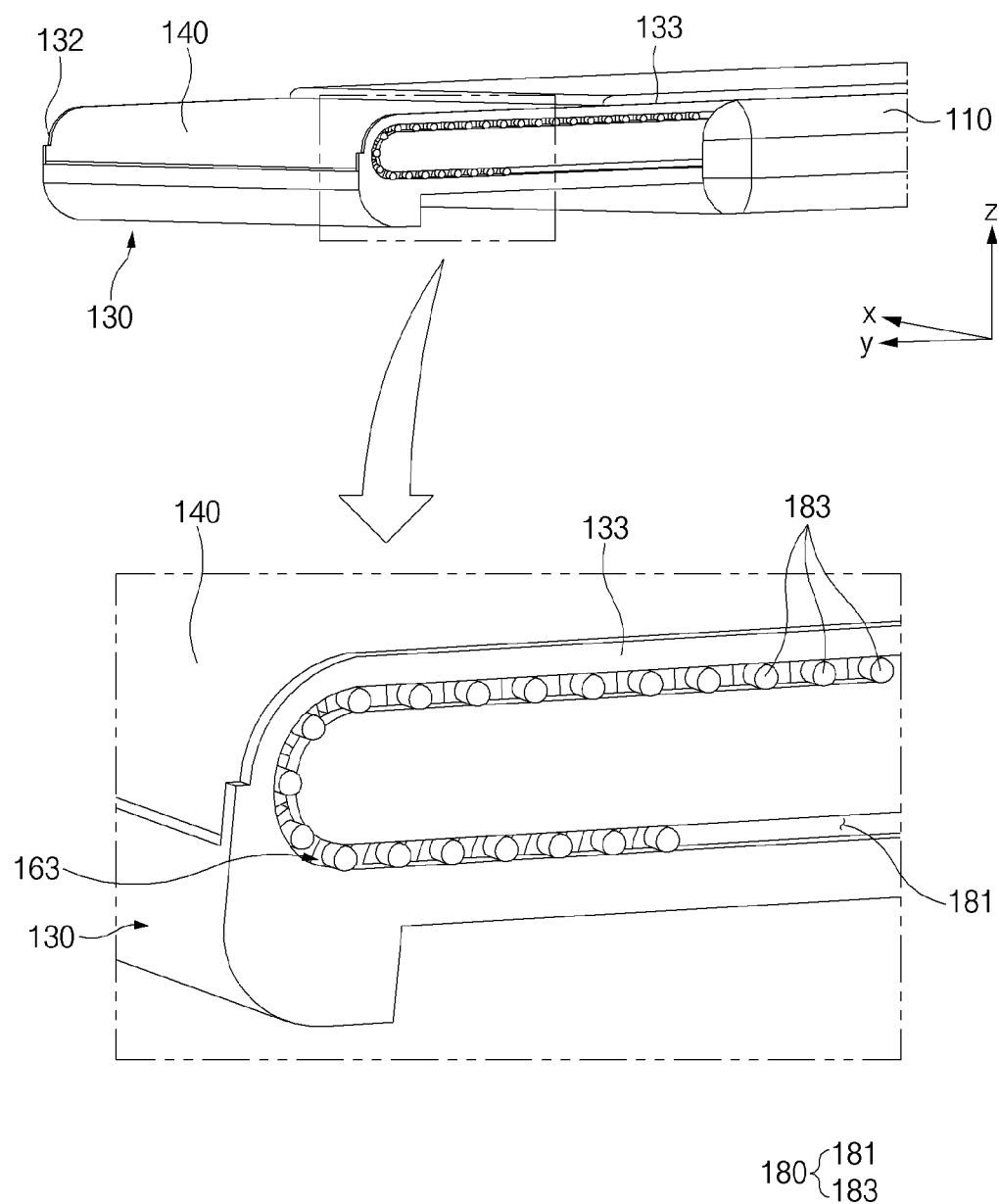
FIG. 13 illustrates a guide rail structure of an electronic device according to an embodiment of the disclosure.

FIG. 13 illustrates a guide rail structure of an electronic device according to an embodiment of the disclosure.

FIG. 14 illustrates a guide rail structure of an electronic device according to an embodiment of the disclosure.

Referring to FIGS. 13 and 14, the electronic device 100 according to an embodiment may include the guide rail structure 180 that guides movement of the display support member 160 (or, the display 140).

FIGS. 13 and 14 illustrate the guide rail structure 180 for the second sliding structure 130 and the second display support member 163. Although not illustrated, the guide rail structure 180 of FIGS. 13 and 14 may be identically applied to the first sliding structure (e.g., the first sliding structure 120 of FIGS. 1, 2, 3, 4, 5A, 5B, 6, 7, 8A, and 8B) and the first display support member (e.g., the first display support member 161 of FIGS. 2, 3, 4, 5A, and 5B). Hereinafter, the guide rail structure 180 of FIGS. 13 and 14 will be described based on the second sliding structure 130 and the second display support member 163.

In an embodiment, the guide rail structure 180 may include guide grooves 181 that are formed on the second sliding structure 130 and in which portions of the second display support member 163 are accommodated.

In an embodiment, the guide grooves 181 may be formed on sidewalls of the second sliding structure 130. The guide grooves 181 may be formed on sidewalls that face in directions perpendicular to the sliding direction of the second sliding structure 130 (e.g., the y-axis direction) among the sidewalls of the second sliding structure 130. For example, the guide grooves 181 may be formed on the sixth sidewall 132 and the seventh sidewall 133 such that at least parts of opposite end portions of the second display support member 163 in the lengthwise direction (e.g., the x-axis direction) are accommodated therein. For example, the lengthwise direction of the second display support member 163 may mean the direction in which a plurality of bars 164 included in the second display support member 163 extend or a direction perpendicular to the direction of movement of the second sliding structure 130 (e.g., the y-axis direction).

Referring to FIG. 13, the guide groove 181 may be formed through the seventh sidewall 133 (or, the sixth sidewall 132), but is not limited thereto. For example, the guide groove 181 may be recessed to a predetermined depth from the inside surface toward the outside surface of the sidewall 132 or 133 so as not to penetrate the sidewall 132 or 133.

In an embodiment, the guide grooves 181 may guide the second display support member 163 such that the second display support member 163 moves along a predetermined path provided or formed by the guide grooves 181. The second display support member 163 may be accommodated in the guide grooves 181 such that the second display support member 163 moves along the guide grooves 181. For example, the opposite end portions of the second display support member 163 in the lengthwise direction (e.g., the x-axis direction) may be slidably accommodated in (or, inserted into) the guide grooves 181.

In an embodiment, the second display support member 163 may move along the guide grooves 181 in response to movement of the second sliding structure 130 relative to the fixed structure 110 in the state in which the opposite end portions (e.g., guide protrusions 183) of the second display support member 163 are accommodated in the guide grooves 181. In an embodiment, while moving along the path of the guide grooves 181, the second display support member 163 may perform a sliding motion along the second curved surface (e.g., the second curved surface 173a of FIGS. 2 and 4) of the second roll bar (e.g., the second roll bar 173 of FIGS. 2 and 4) that moves together with the second sliding structure 130. For example, a partial region (e.g., the second sub-region 145) of the display 140 may move together with the second display support member 163 and may be located inside the electronic device 100 or may be exposed to the outside.

In an embodiment, the opposite end portions of the second display support member 163 may be accommodated in the guide grooves 181, and thus the second display support member 163 may be supported by the guide grooves 181. At least a portion of the second display support member 163 may be maintained in a flat state by the guide grooves 181, and thus at least a partial region of the display 140 supported by the second display support member 163 may remain flat.

In an embodiment, the guide rail structure 180 may further include the guide protrusions 183 accommodated in the guide grooves 181. The guide protrusions 183 may be formed on the opposite end portions of the second display support member 163 in the lengthwise direction. For example, the guide protrusions 183 may protrude from opposite end portions of the plurality of bars 164 included in the second display support member 163 in the lengthwise direction. The guide protrusions 183 may be accommodated in the guide grooves 181 and may perform a sliding motion along the guide grooves 181.

Although not illustrated, the guide rail structure 180 may further include guide grooves (not illustrated) that are formed on the first sliding structure (e.g., the first sliding structure 120 of FIGS. 1, 2, 3, 4, 5A, 5B, 6, 7, 8A, and 8B). For example, the first display support member 161 may be accommodated in the guide grooves of the first sliding structure 120. In an embodiment, the guide grooves 181 of the first sliding structure 120 may be formed on sidewalls facing in a direction substantially perpendicular to the sliding direction of the first sliding structure 120 (e.g., the x-axis direction) among the sidewalls of the first sliding structure 120. For example, the guide grooves 181 of the first sliding structure 120 may be formed on the third sidewall (e.g., the third sidewall 122 of FIG. 2) and the fourth sidewall (e.g., the fourth sidewall 123 of FIG. 2) of the first sliding structure 120.

Figure 15:
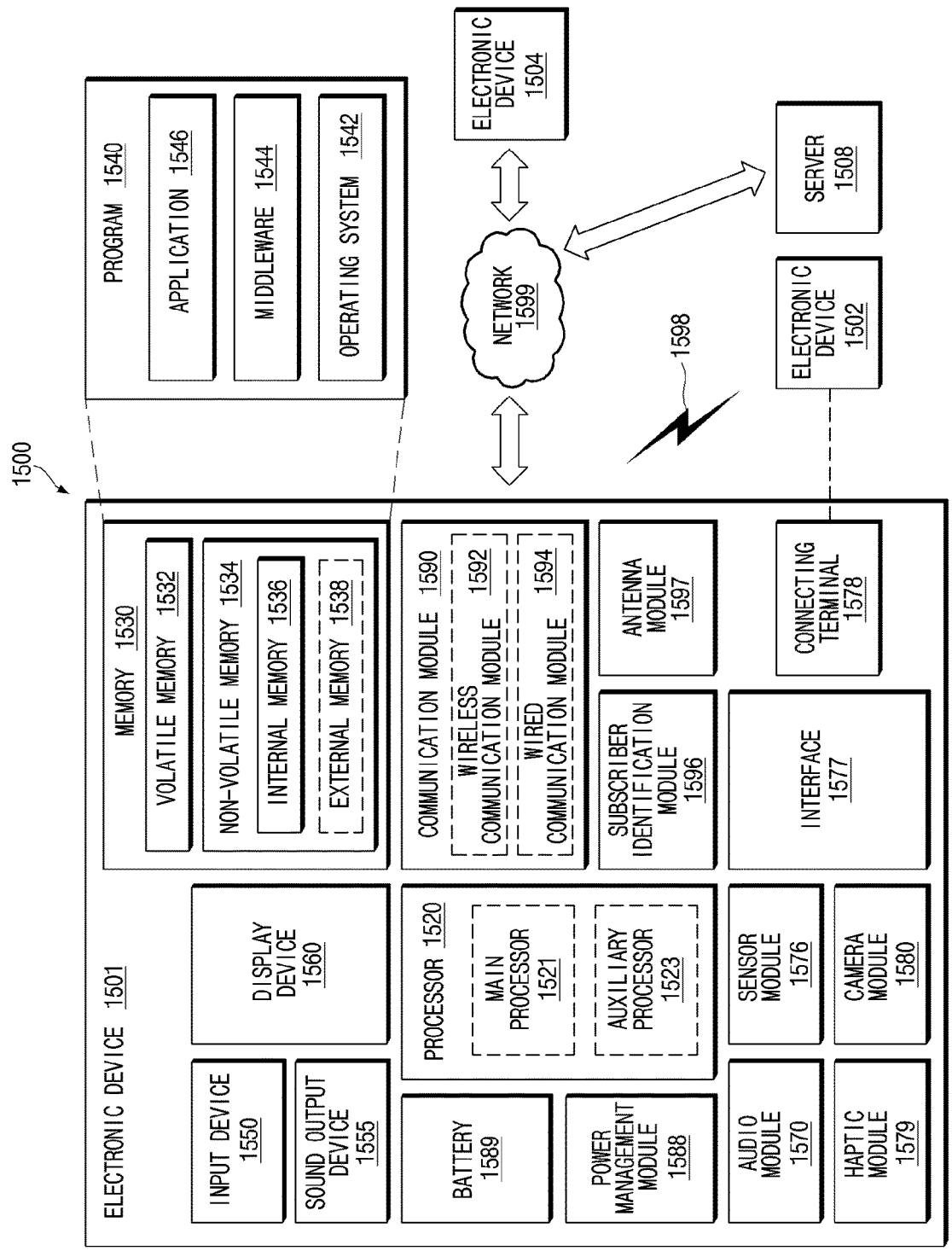
FIG. 15 is a block diagram illustrating an electronic device in a network environment according to an embodiment of the disclosure.

FIG. 15 is a block diagram illustrating an electronic device in a network environment according to an embodiment of the disclosure.

Referring to FIG. 15, an electronic device 1501 in a network environment 1500 may communicate with an external electronic device 1502 via a first network 1598 (e.g., a short-range wireless communication network), or at least one of an external electronic device 1504 or a server 1508 via a second network 1599 (e.g., a long-range wireless communication network). According to an embodiment, the electronic device 1501 may communicate with the external electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the connecting terminal 1578) may be omitted from the electronic device 1501, or one or more other components may be added in the electronic device 1501. In some embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the external electronic device 1502, the external electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the millimeter wave (mmWave) band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the external electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the external electronic devices 1502 or 1504 may be a device of a same type as, or a different type, from the electronic device 1501. According to an embodiment, all or some of operations to be executed at the electronic device 1501 may be executed at one or more of the external electronic devices 1502 or 1504, or the server 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In another embodiment, the external electronic device 1504 may include an internet-of-things (IOT) device. The server 1508 may be an intelligent server using at least one of machine learning or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

Figure 16:
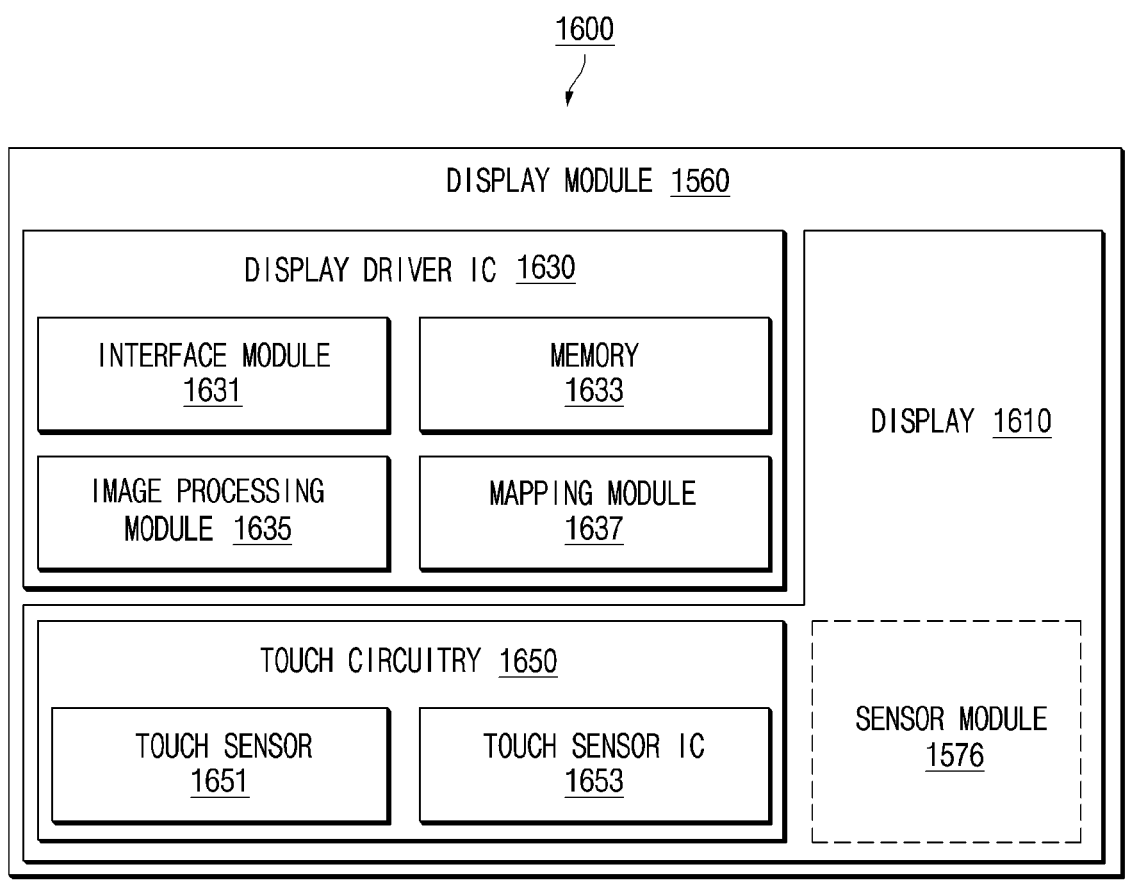
FIG. 16 is a block diagram illustrating a display module according to an embodiment of the disclosure.

FIG. 16 is a block diagram illustrating a display module according to an embodiment of the disclosure.

Referring to FIG. 16, in a block diagram 1600, the display module 1560 may include a display 1610 and a display driver integrated circuit (DDI) 1630 to control the display 1610. The DDI 1630 may include an interface module 1631, memory 1633 (e.g., buffer memory), an image processing module 1635, or a mapping module 1637. The DDI 1630 may receive image information that contains image data or an image control signal corresponding to a command to control the image data from another component of the electronic device 1501 via the interface module 1631. For example, according to an embodiment, the image information may be received from the processor 1520 (e.g., the main processor 1521 (e.g., an application processor)) or the auxiliary processor 1523 (e.g., a graphics processing unit) operated independently from the function of the main processor 1521. The DDI 1630 may communicate, for example, with touch circuitry 1650 or the sensor module 1576 via the interface module 1631. The DDI 1630 may also store at least part of the received image information in the memory 1633, for example, on a frame by frame basis. The image processing module 1635 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1610. The mapping module 1637 may generate a voltage value or a current value corresponding to the image data pre-processed or post-processed by the image processing module 1635. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1610 may be driven, for example, based at least in part on the voltage value or the current value such that visual information (e.g., a text, an image, or an icon) corresponding to the image data may be displayed via the display 1610.

According to an embodiment, the display module 1560 may further include the touch circuitry 1650. The touch circuitry 1650 may include a touch sensor 1651 and a touch sensor IC 1653 to control the touch sensor 1651. The touch sensor IC 1653 may control the touch sensor 1651 to sense a touch input or a hovering input with respect to a certain position on the display 1610. To achieve this, for example, the touch sensor 1651 may detect (e.g., measure) a change in a signal (e.g., a voltage, a quantity of light, a resistance, or a quantity of one or more electric charges) corresponding to the certain position on the display 1610. The touch circuitry 1650 may provide input information (e.g., a position, an area, a pressure, or a time) indicative of the touch input or the hovering input detected via the touch sensor 1651 to the processor 1520. According to an embodiment, at least part (e.g., the touch sensor IC 1653) of the touch circuitry 1650 may be formed as part of the display 1610 or the DDI 1630, or as part of another component (e.g., the auxiliary processor 1523) disposed outside the display module 1560.

According to an embodiment, the display module 1560 may further include at least one sensor (e.g., a fingerprint sensor, an iris sensor, a pressure sensor, or an illuminance sensor) of the sensor module 1576 or a control circuit for the at least one sensor. In such a case, the at least one sensor or the control circuit for the at least one sensor may be embedded in one portion of a component (e.g., the display 1610, the DDI 1630, or the touch circuitry 1650)) of the display module 1560. For example, when the sensor module 1576 embedded in the display module 1560 includes a biometric sensor (e.g., a fingerprint sensor), the biometric sensor may obtain biometric information (e.g., a fingerprint image) corresponding to a touch input received via a portion of the display 1610. As another example, when the sensor module 1576 embedded in the display module 1560 includes a pressure sensor, the pressure sensor may obtain pressure information corresponding to a touch input received via a partial or whole area of the display 1610. According to an embodiment, the touch sensor 1651 or the sensor module 1576 may be disposed between pixels in a pixel layer of the display 1610, or over or under the pixel layer.

Figure 17:
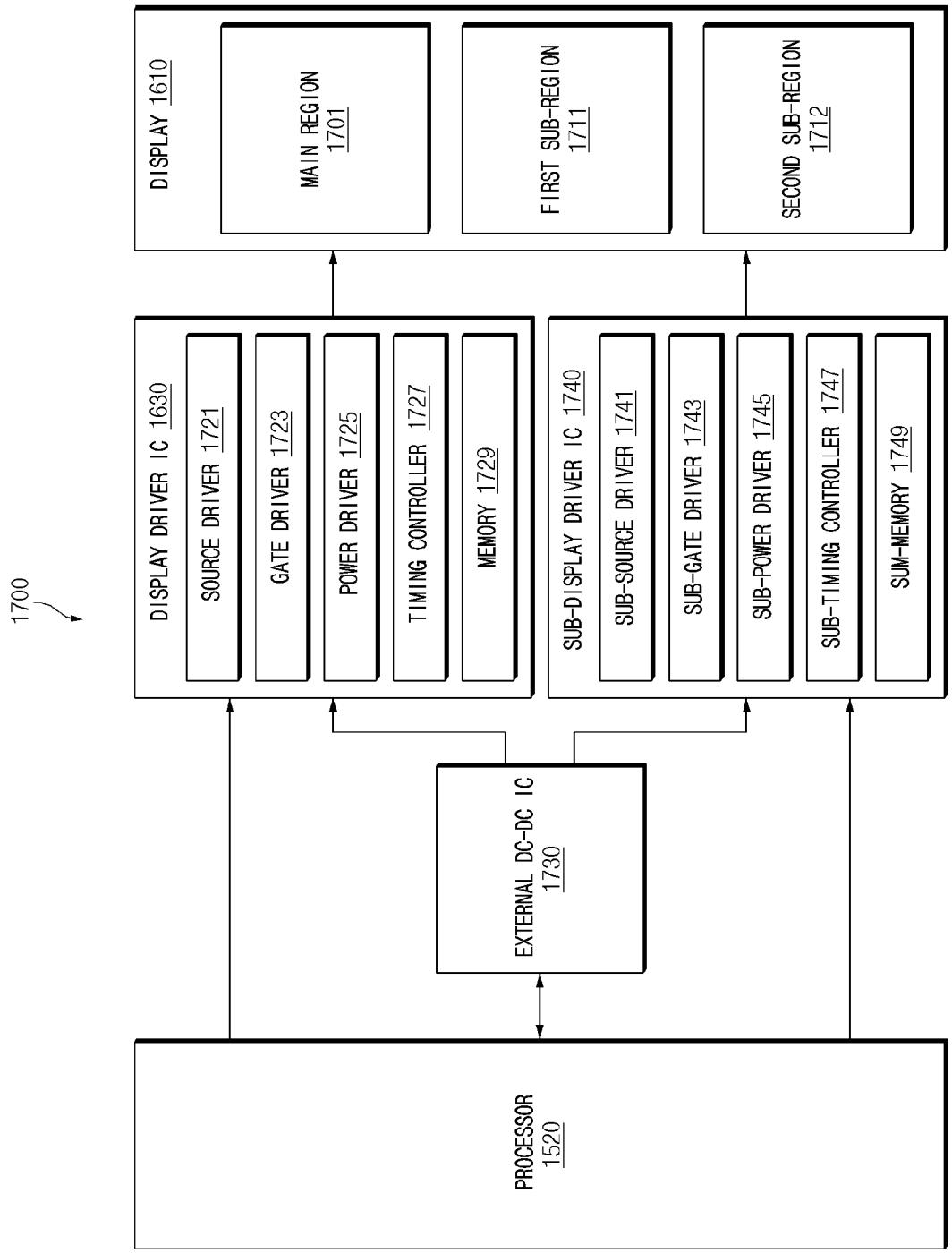
FIG. 17 is a block diagram illustrating a processor, a display, and a display driver IC (DDI) of an electronic device according to an embodiment of the disclosure.

FIG. 17 is a block diagram illustrating a processor, a display (e.g., the display 140 of FIG. 1), and a display driver IC (DDI) of an electronic device (e.g., the electronic device 100 of FIG. 1 and/or the electronic device 1501 of FIG. 15) according to an embodiment of the disclosure.

Referring to FIG. 17, in a block diagram 1700, the processor 1520 may control the display driver IC 1630. The processor 1520 may transfer image data for displaying a screen to the display driver IC 1630. The processor 1520 may control the screen displayed by the display driver IC 1630.

In an embodiment, the display driver IC 1630 may include a source driver 1721, a gate driver 1723, a power driver 1725, a timing controller (T-con) 1727, and a memory 1729.

In an embodiment, the source driver 1721 may set a data voltage based on the image data transferred from the processor 1520. The source driver 1721 may apply the data voltage to source electrodes of pixels disposed in the display 1610.

In an embodiment, the gate driver 1723 may generate a scan signal for scanning the pixels such the source driver 1721 applies the data voltage. The gate driver 1723 may supply the scan signal to gate electrodes of the pixels disposed in the display 1610.

In an embodiment, the power driver 1725 may generate power for driving the pixels. The power driver 1725 may supply the power to the pixels.

In an embodiment, the timing controller 1727 may generate a timing signal for controlling operation timing of the source driver 1721 and the gate driver 1723. The timing controller 1727 may supply the timing signal to the source driver 1721 and the gate driver 1723.

In an embodiment, the memory 1729 may store the image data transferred from the processor 1520. The memory 1729 may transfer the stored image data to the source driver 1721.

In an embodiment, the display 1610 may include a main region 1701, a first sub-region 1711, and a second sub-region 1712. The main region 1701 may be a region exposed outside the housing irrespective of a state of the display 1610. The first sub-region 1711 may be a region exposed outside the housing when the display 1610 moves or extends in a first direction (e.g., a first direction D1 of FIG. 18). The second sub-region 1712 may be a region exposed outside the housing when the display 1610 moves or extends in a second direction (e.g., a second direction D2 of FIG. 18).

In an embodiment, the pixels may be disposed in the display 1610. The display 1610 may display a screen depending on the data voltage applied to the pixels by the display driver IC 1630. The display 1610 may display a screen depending on the image data generated by the processor 1520. The display 1610 may display a screen on at least a partial area of a region exposed outside the housing. For example, when only the main region 1701 of the display 1610 is exposed outside the housing, the display 1610 may display a screen on the main region 1701. For example, when the main region 1701 and the first sub-region 1711 of the display 1610 are exposed outside the housing, the display 1610 may display a screen on at least one of the main region 1701 or the first sub-region 1711. For example, when the main region 1701 and the second sub-region 1712 of the display 1610 are exposed outside the housing, the display 1610 may display a screen on at least one of the main region 1701 or the second sub-region 1712. For example, when the main region 1701, the first sub-region 1711, and the second sub-region 1712 of the display 1610 are exposed outside the housing, the display 1610 may display a screen on at least one of the main region 1701, the first sub-region 1711, or the second sub-region 1712.

In an embodiment, the electronic device 1501 may further include an external DC-DC IC 1730. The external DC-DC IC 1730 may receive driving power from the processor 1520. The external DC-DC IC 1730 may supply power to the power driver 1725 of the display driver IC 1630.

In an embodiment, the electronic device 1501 may further include a sub-display driver IC 1740. The sub-display driver IC 1740 may include a sub-source driver 1741, a sub-gate driver 1743, a sub-power driver 1745, a sub-timing controller 1747, and a sub-memory 1749. The sub-source driver 1741, the sub-gate driver 1743, the sub-power driver 1745, the sub-timing controller 1747, and the sub-memory 1749 may perform substantially the same functions as the source driver 1721, the gate driver 1723, the power driver 1725, the timing controller 1727, and the memory 1729. The sub-display driver IC 1740 may receive image data from the processor 1520. The sub-display driver IC 1740 may operate together with or separately from the display driver IC 1630. The sub-display driver IC 1740 may display a screen on a partial region of the display 1610.

Figure 18:
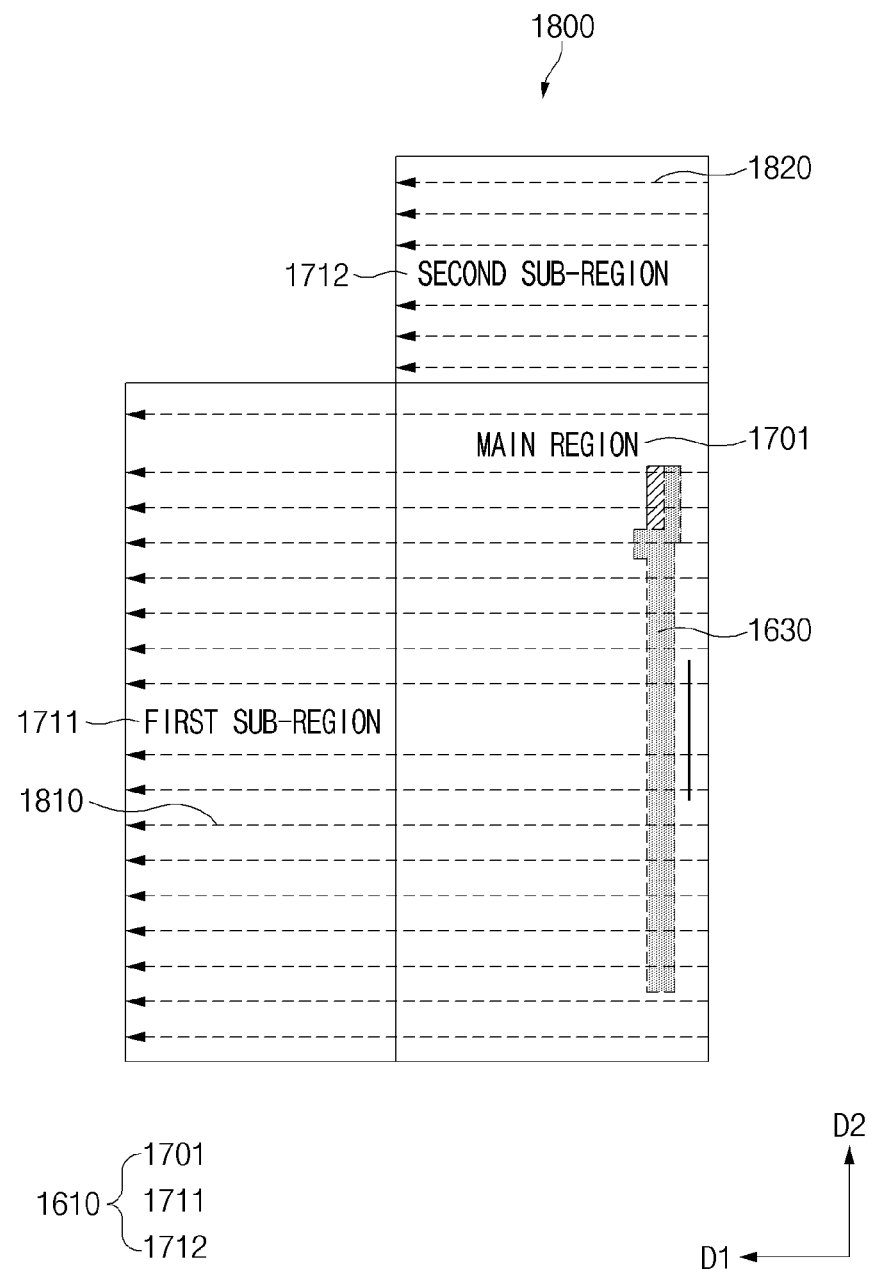
FIG. 18 is a view illustrating a main region, a first sub-region, and a second sub-region of the display and the display driver IC according to an embodiment of the disclosure.

FIG. 18 is a view illustrating a main region (e.g., the main region 141 of FIG. 1), a first sub-region (e.g., the first sub-region 143 of FIG. 1), and a second sub-region (e.g., the second sub-region 145 of FIG. 1) of the display 1610 and the display driver IC 1630 according to an embodiment of the disclosure.

Referring to FIG. 18, in a view 1800, the display driver IC 1630 may be disposed on one side of the main region 1701 of the display 1610. The display driver IC 1630 may apply a data voltage to at least a part of the main region 1701, the first sub-region 1711, and the second sub-region 1712 of the display 1610. The display driver IC 1630 may perform a first scan 1810 on the main region 1701 and the first sub-region 1711. The display driver IC 1630 may perform a second scan 1820 on the second sub-region 1712.

In an embodiment, the display driver IC 1630 may supply a scan signal to at least a part of the main region 1701, the first sub-region 1711, and the second sub-region 1712 of the display 1610. The processor (e.g., the processor 1520 of FIG. 17) may select, from the main region 1701, the first sub-region 1711, and the second sub-region 1712, a region to which the display driver IC 1630 is to supply the scan signal.

In an embodiment, the processor 1520 may partially turn on or off the main region 1701, the first sub-region 1711, and the second sub-region 1712 of the display 1610. The display driver IC 1630 may selectively display a screen on the main region 1701, the first sub-region 1711, and the second sub-region 1712. The display driver IC 1630 may be located on a rear surface of the display 1610. For example, in a case in which a panel of the display 1610 is bent, the display driver IC 1630 may be disposed on the bent panel of the display 1610. In another example, the display driver IC 1630 may be disposed on a film or a flexible circuit board connected with the bent panel of the display 1610. The processor 1520 may control the display driver IC 1630 to partially apply the data voltage to a region on which a screen is to be displayed, among the main region 1701, the first sub-region 1711, and the second sub-region 1712, thereby improving the response speed and the scan rate performance of the display 1610.

In more detail, in a case of uniformly turning on or off gate electrodes of pixels disposed in the main region 1701, the first sub-region 1711, and the second sub-region 1712, a method of applying the data voltage to the entire region of the display 1610 and expressing a region not displaying a screen as a black screen may be used even when a screen is partially displayed on a part of the main region 1701, the first sub-region 1711, and the second sub-region 1712. Since the display driver IC 1630 controls currents flowing through the gate electrodes and source electrodes of the pixels even when expressing a region not displaying a screen as a black screen, current consumption of the display driver IC 1630 may increase.

In particular, in the case of the amorphous display 1610 including the main region 1701, the first sub-region 1711, and the second sub-region 1712, a virtual region connecting the first sub-region 1711 and the second sub-region 1712 may be set to apply the data voltage to the entire region of the display 1610. The display driver IC 1630 may recognize the virtual region as a region included in the display 1610 in software and may apply the data voltage to the display 1610 including the main region 1701, the first sub-region 1711, the second sub-region 1712, and the virtual region. Accordingly, in the case of the amorphous display 1610, current consumption of the display driver IC 1630 may further increase.

In an embodiment, the processor 1520 may control the display driver IC 1630 to selectively supply the scan signal to the gate electrodes of the pixels disposed in the main region 1701, the first sub-region 1711, and the second sub-region 1712. The processor 1520 may control the display driver IC 1630 to selectively turn on or off the gate electrodes. The processor 1520 may supply the scan signal to a region on which a screen is to be displayed, among the main region 1701, the first sub-region 1711, and the second sub-region 1712. For example, the processor 1520 may supply the scan signal to a region exposed outside the housing among the main region 1701, the first sub-region 1711, and the second sub-region 1712.

In an embodiment, the processor 1520 may perform control to partially turn on or off the gate electrodes of the pixels disposed in the main region 1701, the first sub-region 1711, and the second sub-region 1712, thereby reducing current consumption of the display 1610. The processor 1520 may allow the display driver IC 1630 to control currents flowing through gate electrodes and source electrodes of pixels of a region on which a screen is to be displayed, thereby reducing current consumption of the display driver IC 1630. In the case of the amorphous display 1610, the processor 1520 may not unnecessarily set the virtual region when applying the data voltage, thereby further reducing current consumption of the display driver IC 1630. The processor 1520 may not process image data that has been unnecessarily processed to display the black screen, thereby increasing a screen response speed. The processor 1520 may reduce image data being processed, thereby improving at least one of the performance of the high-resolution display 1610 or the display 1610 having a high scan rate of about 120 Hz or more.

In an embodiment, in the fourth state, the processor 1520 may control the display driver IC 1630 to perform the first scan 1810 and the second scan 1820 to apply the data voltage to the main region 1701, the first sub-region 1711, and the second sub-region 1712. The fourth state may be a state in which the main region 1701, at least a portion of the first sub-region 1711, and at least a portion of the second sub-region 1712 of the display 1610 are exposed to the outside.

Figure 19:
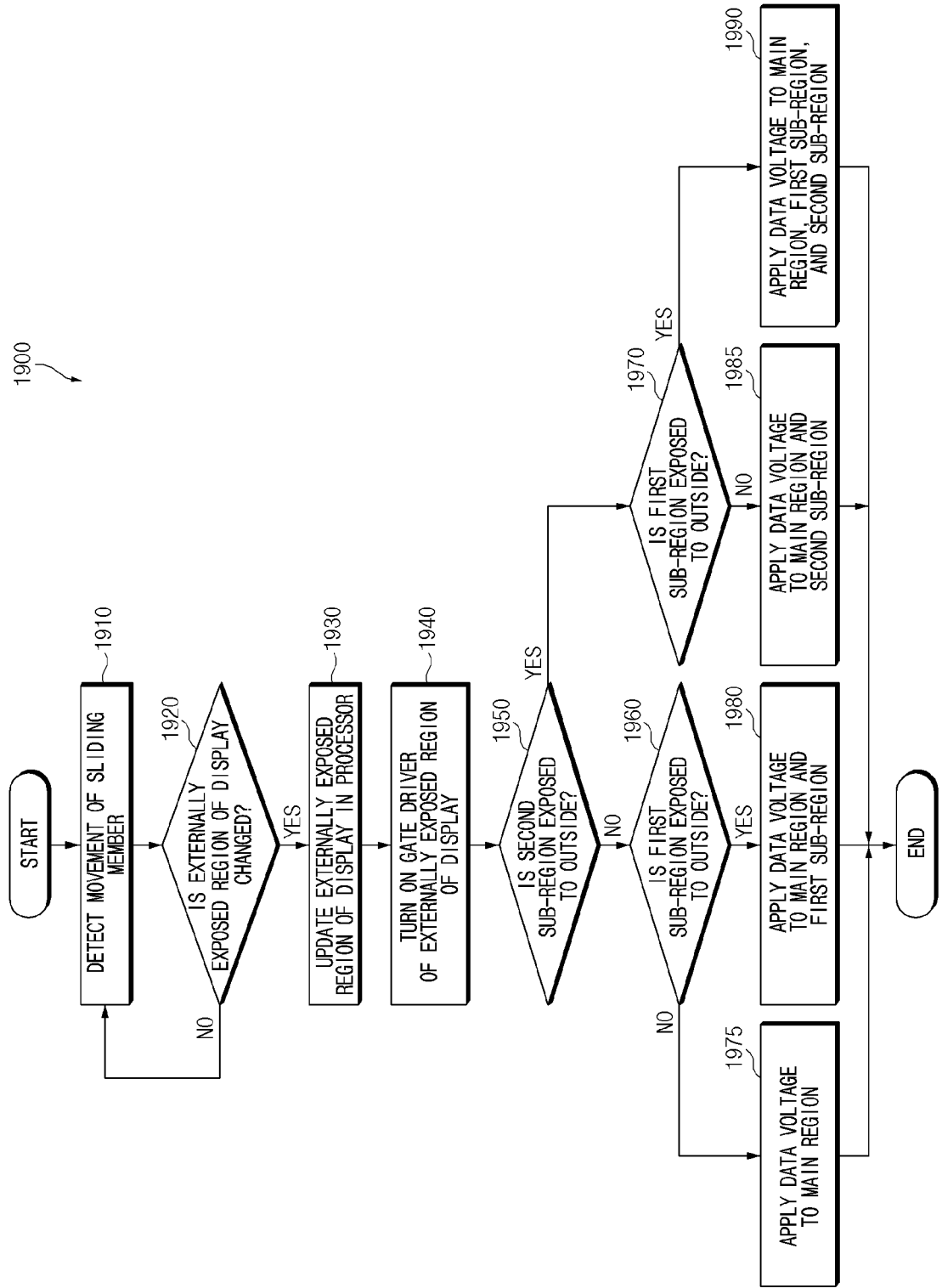
FIG. 19 is a flowchart illustrating an operation in which a processor controls a region to which a data voltage is applied, depending on a state of a display according to an embodiment of the disclosure.

FIG. 19 is a flowchart illustrating an operation in which a processor (e.g., the processor 1520 of FIG. 17) controls a region to which a data voltage is applied, depending on a state of a display (e.g., the display 1610 of FIG. 17) according to an embodiment of the disclosure.

Referring to FIG. 19, in a method 1900, in operation 1910, the processor 1520 according to an embodiment may detect movement of a sliding member. The processor 1520 may detect whether the display 1610 is moved while the sliding member moves. For example, the processor 1520 may detect whether a magnetic force sensed by a Hall IC disposed on the sliding member is changed while the sliding member moves. In another example, the processor 1520 may detect whether electrical resistance characteristics of the display 1610 are changed due to movement of the display 1610 while the sliding member moves.

In operation 1920, the processor 1520 according to an embodiment may determine whether an externally exposed region of the display 1610 is changed. The processor 1520 may determine whether the externally exposed region of the display 1610 is expanded or reduced. When it is determined that the externally exposed region of the display 1610 is changed (operation 1920—Yes), the processor 1520 may proceed to operation 1930. When it is determined that the externally exposed region of the display 1610 is maintained (operation 1920—No), the processor 1520 may return to operation 1910.

In operation 1930, the processor 1520 according to an embodiment may update the externally exposed region of the display 1610 in the processor 1520. The processor 1520 may generate a control map that stores state information of the display 1610. The state information of the display 1610 may include information about the externally exposed region of the display 1610, and when the externally exposed region of the display 1610 is changed, the processor 1520 may update a changed exposed region in the control map.

In operation 1940, the processor 1520 according to an embodiment may turn on a gate driver of the externally exposed region of the display 1610 (e.g., the gate driver 1723 of FIG. 17). The processor 1520 may wake up the gate driver 1723 and a power driver (e.g., the power driver 1725 of FIG. 17) of the externally exposed region of the display 1610. The processor 1520 may supply a scan signal to pixels disposed in the externally exposed region of the display 1610. The processor 1520 may partially supply the scan signal to the pixels disposed in the externally exposed region among the pixels disposed in the display 1610.

In operation 1950, the processor 1520 according to an embodiment may determine whether the second sub-region (e.g., the second sub-region 1712 of FIG. 18) is exposed to the outside. When it is determined that the second sub-region 1712 is inserted into the electronic device (e.g., the electronic device 1501 of FIG. 15) (operation 1950—No), the processor 1520 may proceed to operation 1960. When it is determined that the second sub-region 1712 is exposed to the outside (operation 1950—Yes), the processor 1520 may proceed to operation 1970.

In operation 1960, the processor 1520 according to an embodiment may determine whether the first sub-region (e.g., the first sub-region 1711 of FIG. 18) is exposed to the outside. When it is determined that the first sub-region is inserted into the electronic device 1501 (operation 1960—No), the processor 1520 may proceed to operation 1975. When it is determined that the first sub-region 1711 is exposed to the outside (operation 1960—Yes), the processor 1520 may proceed to operation 1980.

In operation 1970, the processor 1520 according to an embodiment may determine whether the first sub-region 1711 is exposed to the outside. When it is determined that the first sub-region 1711 is inserted into the electronic device 1501 (operation 1970—No), the processor 1520 may proceed to operation 1985. When it is determined that the first sub-region 1711 is exposed to the outside (operation 1970—Yes), the processor 1520 may proceed to operation 1990.

In operation 1975, the display driver IC according to an embodiment (e.g., the display driver IC 1630 of FIG. 17) may apply the data voltage to the main region (e.g., the main region 1701 of FIG. 18). When it is determined that the first sub-region 1711 and the second sub-region 1712 are inserted into the electronic device 1501, the processor 1520 may control the display driver IC 1630 to apply the data voltage to the main region 1701.

In operation 1980, the display driver IC 1630 according to an embodiment may apply the data voltage to the main region 1701 and the first sub-region 1711. When it is determined that the first sub-region 1711 is exposed to the outside and the second sub-region 1712 is inserted into the electronic device 1501, the processor 1520 may control the display driver IC 1630 to apply the data voltage to the main region 1701 and the first sub-region 1711.

In operation 1985, the display driver IC 1630 according to an embodiment may apply the data voltage to the main region 1701 and the second sub-region 1712. When it is determined that the first sub-region 1711 is inserted into the electronic device 1501 and the second sub-region 1712 is exposed to the outside, the processor 1520 may control the display driver IC 1630 to apply the data voltage to the main region 1701 and the second sub-region 1712.

In operation 1990, the display driver IC 1630 according to an embodiment may apply the data voltage to the main region 1701, the first sub-region 1711, and the second sub-region 1712. When it is determined that the first sub-region 1711 and the second sub-region 1712 are exposed to the outside, the processor 1520 may control the display driver IC 1630 to apply the data voltage to the main region 1701, the first sub-region 1711, and the second sub-region 1712. For example, the processor 1520 may control the display driver IC 1630 to apply the data voltage to the second sub-region 1712 and thereafter apply the data voltage to the main region 1701 and the first sub-region 1711.

Figure 20:
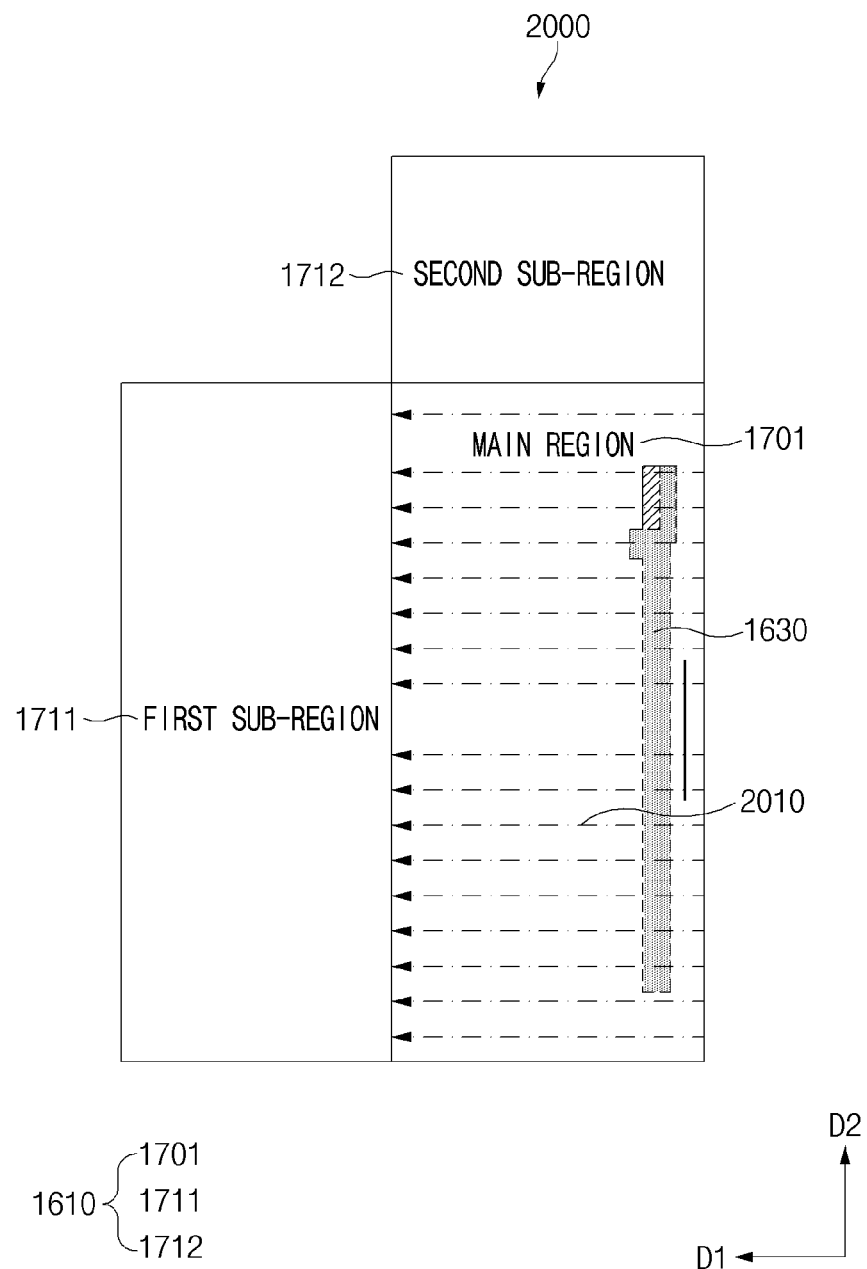
FIG. 20 is a view illustrating an operation of applying a data voltage to a main region of the display according to an embodiment of the disclosure.

FIG. 20 is a view illustrating an operation of applying a data voltage to a main region of a display according to an embodiment of the disclosure.

Referring to FIG. 20, in a view 2000, in the first state, the processor (e.g., the processor 1520 of FIG. 17) may control the display driver IC 1630 to perform a third scan 2010 to apply the data voltage to the main region 1701. The first state may be a state in which only the main region 1701 of the display 1610 is exposed to the outside and the first sub-region 1711 and the second sub-region 1712 are inserted into the electronic device (e.g., the electronic device 1501 of FIG. 15).

In an embodiment, the processor 1520 may control the display driver IC 1630 to perform the third scan 2010 to apply the data voltage to the main region 1701. When only the main region 1701 is exposed to the outside, the processor 1520 may control the display driver IC 1630 to perform the third scan 2010. When the first sub-region 1711 and the second sub-region 1712 are inserted into the electronic device 1501, the processor 1520 may control the display driver IC 1630 to perform the third scan 2010.

In an embodiment, the processor 1520 may control the display driver IC 1630 to supply a scan signal to the gate electrodes of the pixels disposed in the main region 1701. The processor 1520 may control the display driver IC 1630 to interrupt the supply of the scan signal to the gate electrodes of the pixels disposed in the first sub-region 1711 and the second sub-region 1712.

Figure 21:
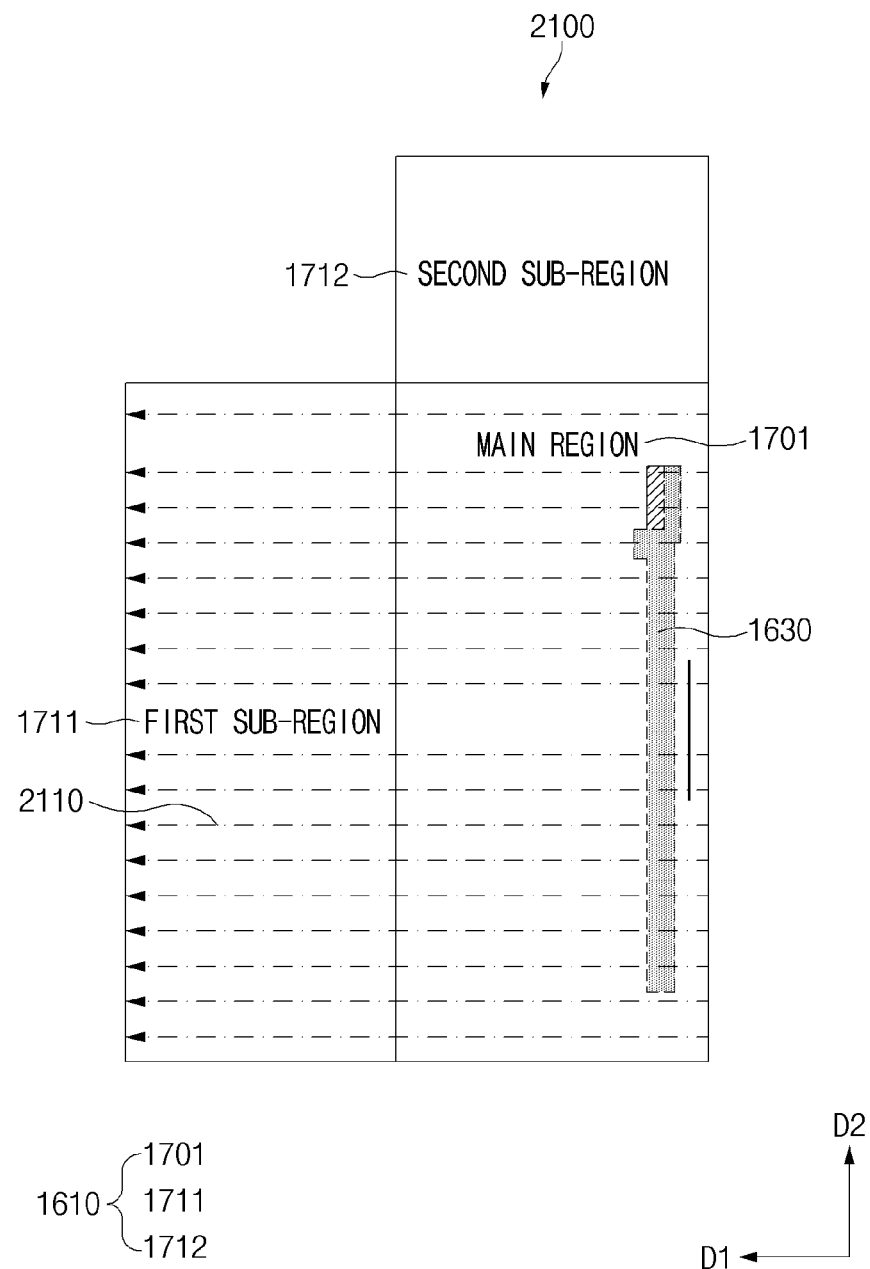
FIG. 21 is a view illustrating an operation of applying a data voltage to a main region and the first sub-region of the display according to an embodiment of the disclosure.

FIG. 21 is a view illustrating an operation of applying a data voltage to a main region and a first sub-region of the display 1610 according to an embodiment of the disclosure.

Referring to FIG. 21, in a view 2100, in the second state, the processor (e.g., the processor 1520 of FIG. 17) may control the display driver IC 1630 to perform a fourth scan 2110 to apply the data voltage to the main region 1701 and the first sub-region 1711. The second state may be a state in which the main region 1701 and at least a portion of the first sub-region 1711 of the display 1610 are exposed to the outside and the second sub-region 1712 is inserted into the electronic device (e.g., the electronic device 1501 of FIG. 15).

In an embodiment, the processor 1520 may control the display driver IC 1630 to perform the fourth scan 2110 to apply the data voltage to the main region 1701 and the first sub-region 1711. When the main region 1701 and the first sub-region 1711 are exposed to the outside, the processor 1520 may control the display driver IC 1630 to perform the fourth scan 2110. When the second sub-region 1712 is inserted into the electronic device 1501, the processor 1520 may control the display driver IC 1630 to perform the fourth scan 2110.

In an embodiment, the processor 1520 may control the display driver IC 1630 to supply a scan signal to the gate electrodes of the pixels disposed in the main region 1701 and the first sub-region 1711. The processor 1520 may control the display driver IC 1630 to interrupt the supply of the scan signal to the gate electrodes of the pixels disposed in the second sub-region 1712.

In an embodiment, when displaying one screen on the main region 1701 and the first sub-region 1711, the processor 1520 may control the display driver IC 1630 such that the scan rate of the main region 1701 and the scan rate of the first sub-region 1711 are substantially the same as each other. When displaying one screen on the main region 1701 and the first sub-region 1711, the processor 1520 may control the display driver IC 1630 such that a scan is completely performed on the main region 1701 and the first sub-region 1711 by one scan operation. Accordingly, when displaying one screen on the main region 1701 and the first sub-region 1711, the processor 1520 may prevent a phenomenon in which a difference between screens occurs due to a scan rate difference.

In an embodiment, when displaying separate screens on the main region 1701 and the first sub-region 1711, the processor 1520 may control the display driver IC 1630 such that the scan rate of the main region 1701 and the scan rate of the first sub-region 1711 differ from each other. When displaying separate screens on the main region 1701 and the first sub-region 1711, the processor 1520 may control the display driver IC 1630 such that scans are performed on the main region 1701 and the first sub-region 1711, respectively. Accordingly, when displaying separate screens on the main region 1701 and the first sub-region 1711, the processor 1520 may adjust the scan rates according to the types of screens displayed on the main region 1701 and the first sub-region 1711, respectively. For example, when displaying moving images on the main region 1701 and displaying an execution screen of a message application on the first sub-region 1711, the processor 1520 may set the scan rate of the main region 1701 to be higher than the scan rate of the first sub-region 1711.

Figure 22:
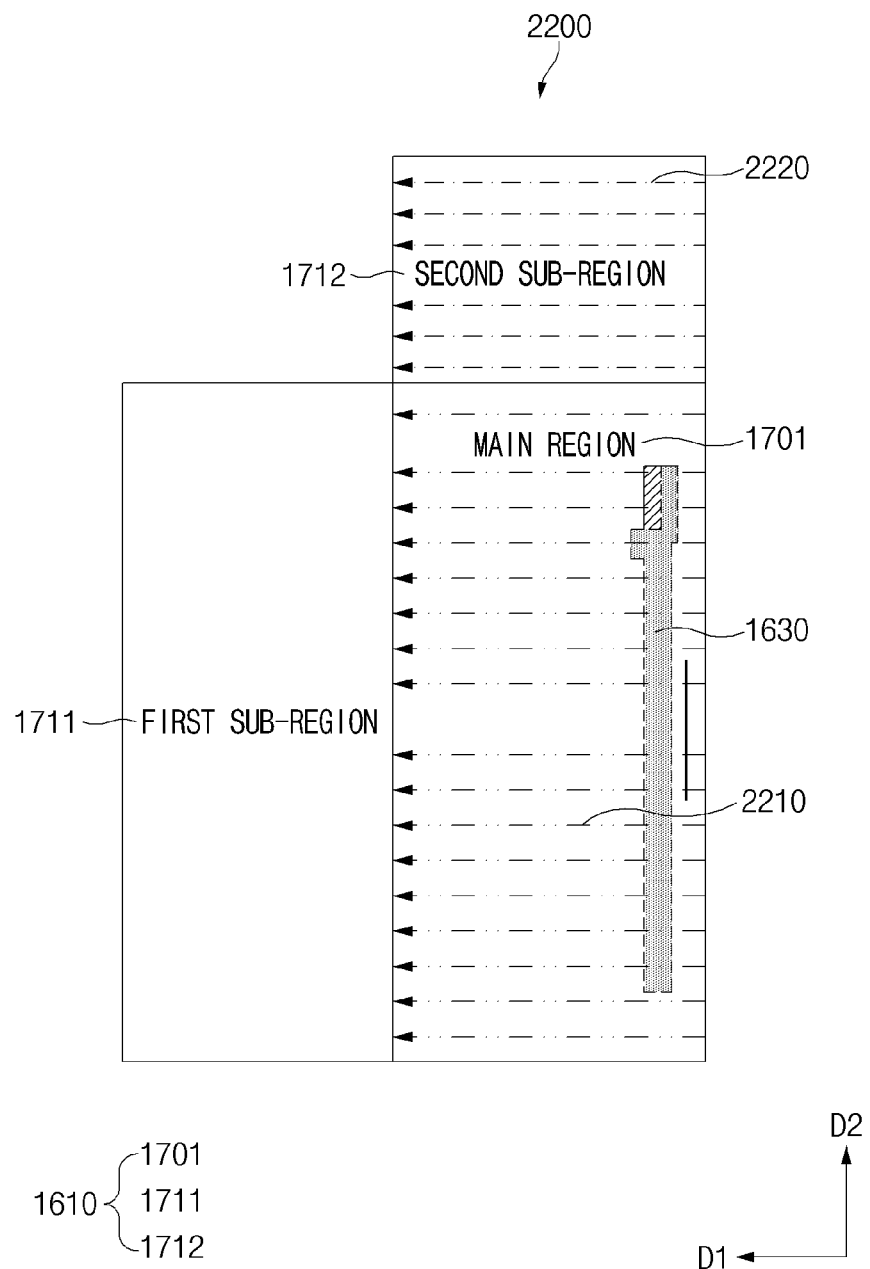
FIG. 22 is a view illustrating an operation of applying a data voltage to a main region and a second sub-region of a display according to an embodiment of the disclosure.

FIG. 22 is a view illustrating an operation of applying a data voltage to a main region and a second sub-region of a display according to an embodiment of the disclosure.

Referring to FIG. 22, in a view 2200, in the third state, the processor (e.g., the processor 1520 of FIG. 17) may control the display driver IC 1630 to perform a fifth scan 2210 and a sixth scan 2220 to apply the data voltage to the main region 1701 and the second sub-region 1712. The third state may be a state in which the main region 1701 and at least a portion of the second sub-region 1712 of the display 1610 are exposed to the outside and the first sub-region 1711 is inserted into the electronic device (e.g., the electronic device 1501 of FIG. 15).

In an embodiment, the processor (e.g., the processor 1520 of FIG. 17) may control the display driver IC 1630 to perform the fifth scan 2210 to apply the data voltage to the main region 1701 and the sixth scan 2220 to apply the data voltage to the second sub-region 1712. When the main region 1701 and the second sub-region 1712 are exposed to the outside, the processor 1520 may control the display driver IC 1630 to perform the fifth scan 2210 and the sixth scan 2220. When the first sub-region 1711 is inserted into the electronic device (e.g., the electronic device 1501 of FIG. 15), the processor 1520 may control the display driver IC 1630 to perform the fifth scan 2210 and the sixth scan 2220.

In an embodiment, the processor 1520 may control the display driver IC 1630 to supply a scan signal to the gate electrodes of the pixels disposed in the main region 1701 and the second sub-region 1712. The processor 1520 may control the display driver IC 1630 to interrupt the supply of the scan signal to the gate electrodes of the pixels disposed in the first sub-region 1711.

In an embodiment, when displaying one screen on the main region 1701 and the second sub-region 1712, the processor 1520 may control the display driver IC 1630 such that the scan rate of the fifth scan 2210 and the scan rate of the sixth scan 2220 are substantially the same as each other. When displaying one screen on the main region 1701 and the second sub-region 1712, the processor 1520 may control the display driver IC 1630 such that scans are performed on the main region 1701 and the second sub-region 1712 at the same scan rate. Accordingly, when displaying one screen on the main region 1701 and the second sub-region 1712, the processor 1520 may prevent a phenomenon in which a difference between screens occurs due to a scan rate difference.

In an embodiment, when displaying separate screens on the main region 1701 and the second sub-region 1712, the processor 1520 may control the display driver IC 1630 such that the scan rate of the fifth scan 2210 and the scan rate of the sixth scan 2220 differ from each other. Accordingly, when displaying separate screens on the main region 1701 and the second sub-region 1712, the processor 1520 may adjust the scan rate of the fifth scan 2210 and the scan rate of the sixth scan 2220 according to the types of screens displayed on the main region 1701 and the second sub-region 1712, respectively. For example, when displaying moving images on the main region 1701 and displaying a text input screen on the second sub-region 1712, the processor 1520 may set the scan rate of the fifth scan 2210 to be higher than the scan rate of the sixth scan 2220.

Figure 23:
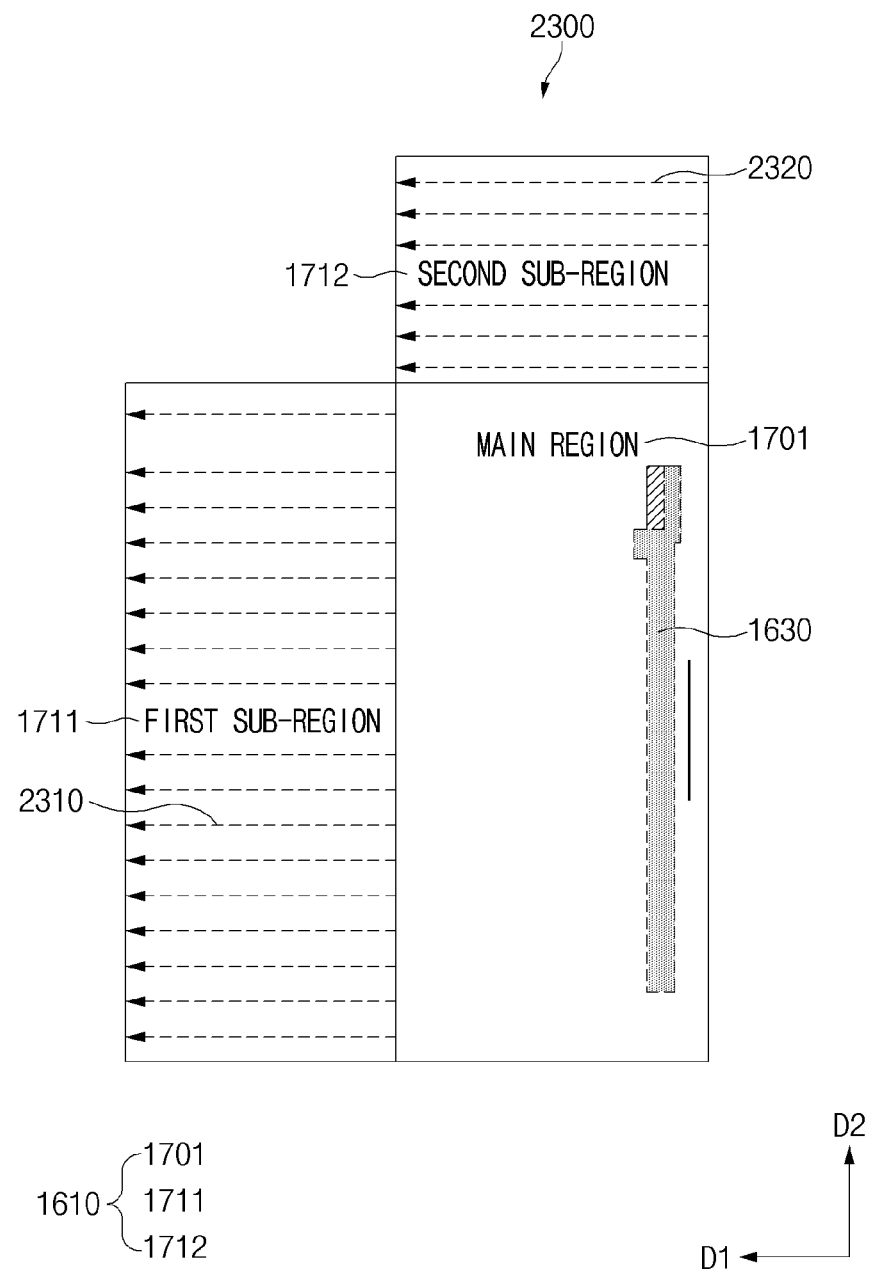
FIG. 23 is a view illustrating an operation of applying a data voltage to a first sub-region and a second sub-region of a display according to an embodiment of the disclosure.

FIG. 23 is a view illustrating an operation of applying a data voltage to a first sub-region and a second sub-region of a display according to an embodiment of the disclosure.

Referring to FIG. 23, in a view of 2300, in the fourth state, the processor (e.g., the processor 1520 of FIG. 17) may control the display driver IC 1630 to perform a seventh scan 2310 to apply the data voltage to the first sub-region 1711 and an eighth scan 2320 to apply the data voltage to the second sub-region 1712. When the first sub-region 1711 and the second sub-region 1712 are exposed to the outside, the processor 1520 may control the display driver IC 1630 to perform the seventh scan 2310 and the eighth scan 2320. When displaying screens on the first sub-region 1711 and the second sub-region 1712 without displaying a screen on the main region 1701, the processor 1520 may control the display driver IC 1630 to perform the seventh scan 2310 and the eighth scan 2320.

In an embodiment, the processor 1520 may control the display driver IC 1630 to supply a scan signal to the gate electrodes of the pixels disposed in the first sub-region 1711 and the second sub-region 1712. The processor 1520 may control the display driver IC 1630 to interrupt the supply of the scan signal to the gate electrodes of the pixels disposed in the main region 1701.

In an embodiment, the processor 1520 may control the display driver IC 1630 to independently set the scan rate of the seventh scan 2310 and the scan rate of the eighth scan 2320. The scan rate of the seventh scan 2310 and the scan rate of the eighth scan 2320 may be equal to, or different from, each other. Accordingly, the processor 1520 may adjust the scan rate of the seventh scan 2310 and the scan rate of the eighth scan 2320 according to the types of screens displayed on the first sub-region 1711 and the second sub-region 1712, respectively.

Figure 24:
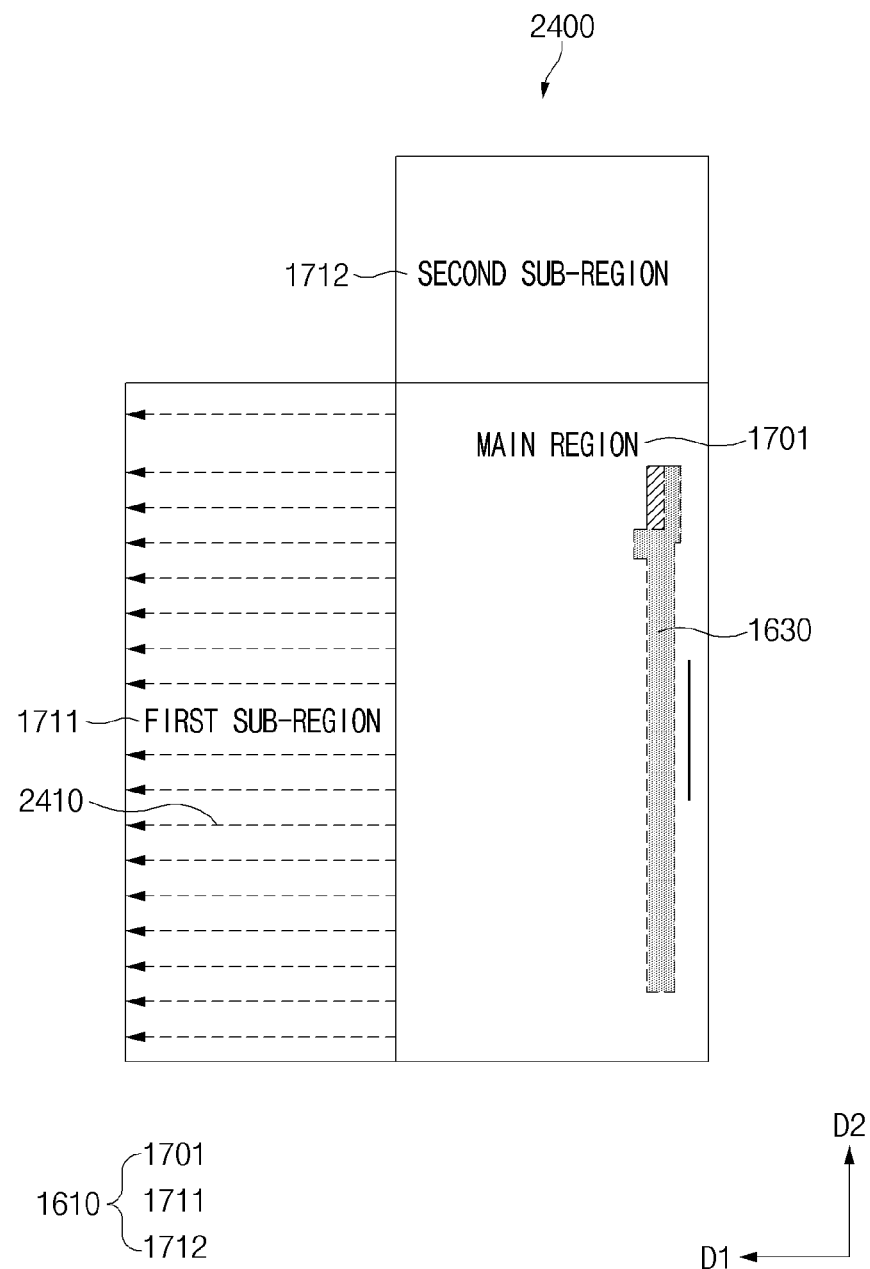
FIG. 24 is a view illustrating an operation of applying a data voltage to a first sub-region of the display according to an embodiment of the disclosure.

FIG. 24 is a view illustrating an operation of applying a data voltage to a first sub-region of a display according to an embodiment of the disclosure.

Referring to FIG. 24, in the second state or the fourth state, the processor (e.g., the processor 1520 of FIG. 17) may control the display driver IC 1630 to perform a ninth scan 2410 to apply the data voltage to the first sub-region 1711. When the main region 1701 and the first sub-region 1711 are exposed to the outside, the processor 1520 may control the display driver IC 1630 to perform the ninth scan 2410. For example, when displaying a screen only on the first sub-region 1711 without displaying a screen on the main region 1701 in the state in which the second sub-region 1712 is inserted into the electronic device (e.g., the electronic device 1501 of FIG. 15), the processor 1520 may control the display driver IC 1630 to perform the ninth scan 2410.

In an embodiment, the processor 1520 may control the display driver IC 1630 to supply a scan signal to the gate electrodes of the pixels disposed in the first sub-region 1711. The processor 1520 may control the display driver IC 1630 to interrupt the supply of the scan signal to the gate electrodes of the pixels disposed in the main region 1701 and the second sub-region 1712.

Figure 25:
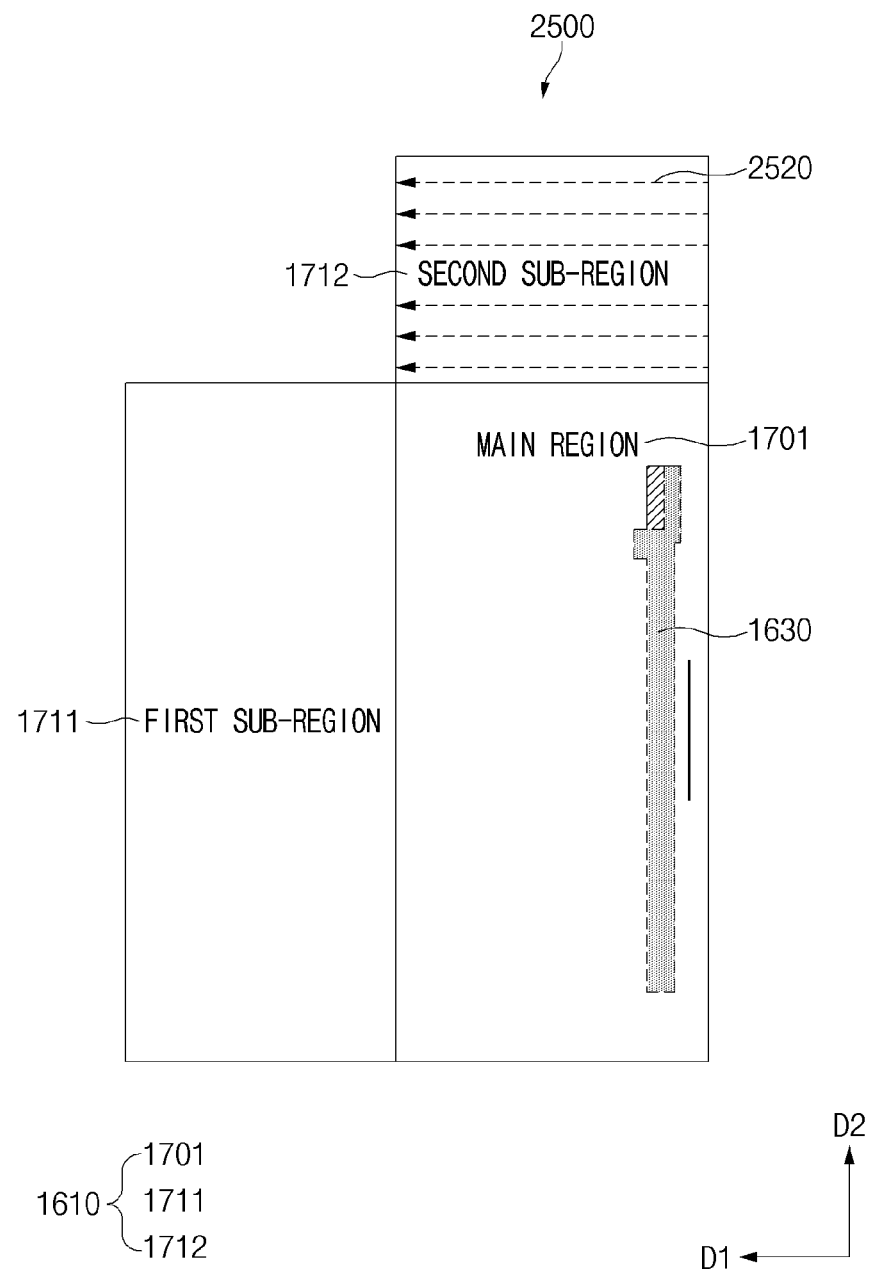
FIG. 25 is a view illustrating an operation of applying a data voltage to a second sub-region of the display according to an embodiment of the disclosure.

FIG. 25 is a view illustrating an operation of applying a data voltage to a second sub-region of a display according to an embodiment of the disclosure.

Referring to FIG. 25, in a view of 2500, in the third state or the fourth state, the processor (e.g., the processor 1520 of FIG. 17) may control the display driver IC 1630 to perform a tenth scan 2520 to apply the data voltage to the second sub-region 1712. When the main region 1701 and the second sub-region 1712 are exposed to the outside, the processor 1520 may control the display driver IC 1630 to perform the tenth scan 2520. For example, when displaying a screen only on the second sub-region 1712 without displaying a screen on the main region 1701 in the state in which the first sub-region 1711 is inserted into the electronic device (e.g., the electronic device 1501 of FIG. 15), the processor 1520 may control the display driver IC 1630 to perform the tenth scan 2520.

In an embodiment, the processor 1520 may control the display driver IC 1630 to supply a scan signal to the gate electrodes of the pixels disposed in the second sub-region 1712. The processor 1520 may control the display driver IC 1630 to interrupt the supply of the scan signal to the gate electrodes of the pixels disposed in the main region 1701 and the first sub-region 1711.

Figure 26:
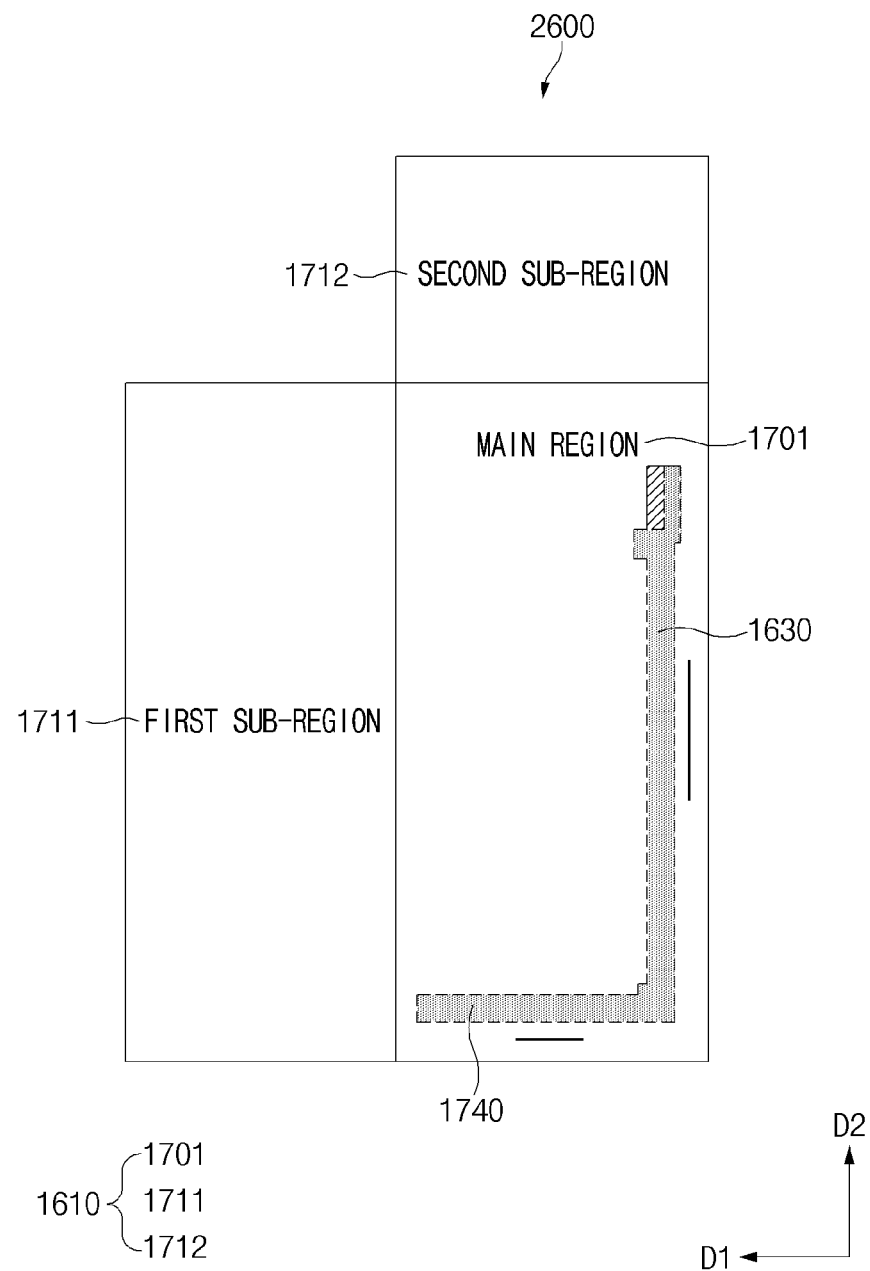
FIG. 26 is a view illustrating a main region, a first sub-region, and a second sub-region of a display, a display driver IC, and a sub-display driver IC according to an embodiment of the disclosure.

FIG. 26 is a view illustrating a main region, a first sub-region, and a second sub-region of a display, a display driver IC, a sub-display driver IC according to an embodiment of the disclosure.

Referring to FIG. 26, in a view 2600, the electronic device (e.g., the electronic device 1501 of FIG. 15) may further include the sub-display driver IC 1740. The sub-display driver IC 1740 may receive image data from the processor 1520. The sub-display driver IC 1740 may operate together with or separately from the display driver IC 1630. The sub-display driver IC 1740 may display a screen on a partial region of the display 1610. For example, the driver IC 1740 may apply a data voltage to the second sub-region 1712.

In an embodiment, the display driver IC 1630 and the sub-display driver IC 1740 may be disposed perpendicular to each other. For example, the display driver IC 1630 and the sub-display driver IC 1740 may be disposed in an L shape, a shape symmetrical to the L shape in the first direction D1 with respect to a line therebetween, or a shape symmetrical to the L shape in the second direction D2 with respect to a line therebetween. For example, the display driver IC 1630 may be disposed to face in the first direction DR1, and the sub-display driver IC 1740 may be disposed to face in the second direction D2 perpendicular to the first direction D1.

In an embodiment, the display driver IC 1630 and the sub-display driver IC 1740 may be disposed to make contact with each other. For example, one side of the display driver IC 1630 and one side of the sub-display driver IC 1740 may make contact with each other. A space in which the display driver IC 1630 and the sub-display driver IC 1740 are disposed may be reduced by attaching the display driver IC 1630 and the sub-display driver IC 1740 to each other. In addition, the area of a non-display region or a bezel region of the display 1610 may be reduced by attaching the display driver IC 1630 and the sub-display driver IC 1740 to each other.

In an embodiment, the display driver IC 1630 and the sub-display driver IC 1740 may independently operate. The processor (e.g., the processor 1520 of FIG. 17) may select at least one of the display driver IC 1630 or the sub-display driver IC 1740 and may apply the data voltage to the display 1610.

In an embodiment, the processor 1520 may select, from the display driver IC 1630 and the sub-display driver IC 1740, a driver IC that applies the data voltage, based on whether the first sub-region 1711 or the second sub-region 1712 of the display 1610 extends to the outside. When the first sub-region 1711 extends to the outside and the second sub-region 1712 is inserted into the electronic device (e.g., the electronic device 1501 of FIG. 15), the processor 1520 may perform control such that the display driver IC 1630 applies the data voltage. When the first sub-region 1711 is inserted into the electronic device (e.g., the electronic device 1501 of FIG. 15) and the second sub-region 1712 extends to the outside, the processor 1520 may perform control such that the sub-display driver IC 1740 applies the data voltage.

In an embodiment, when the first sub-region 1711 and the second sub-region 1712 of the display 1610 extend to the outside, the processor 1520 may select, from the display driver IC 1630 and the sub-display driver IC 1740, a driver IC that applies the data voltage in a direction in which distortion is less. When identifying contents of a screen displayed on the display 1610 and applying the data voltage, the processor 1520 may determine a direction in which distortion due to a jelly scroll phenomenon is less.

Figure 27:
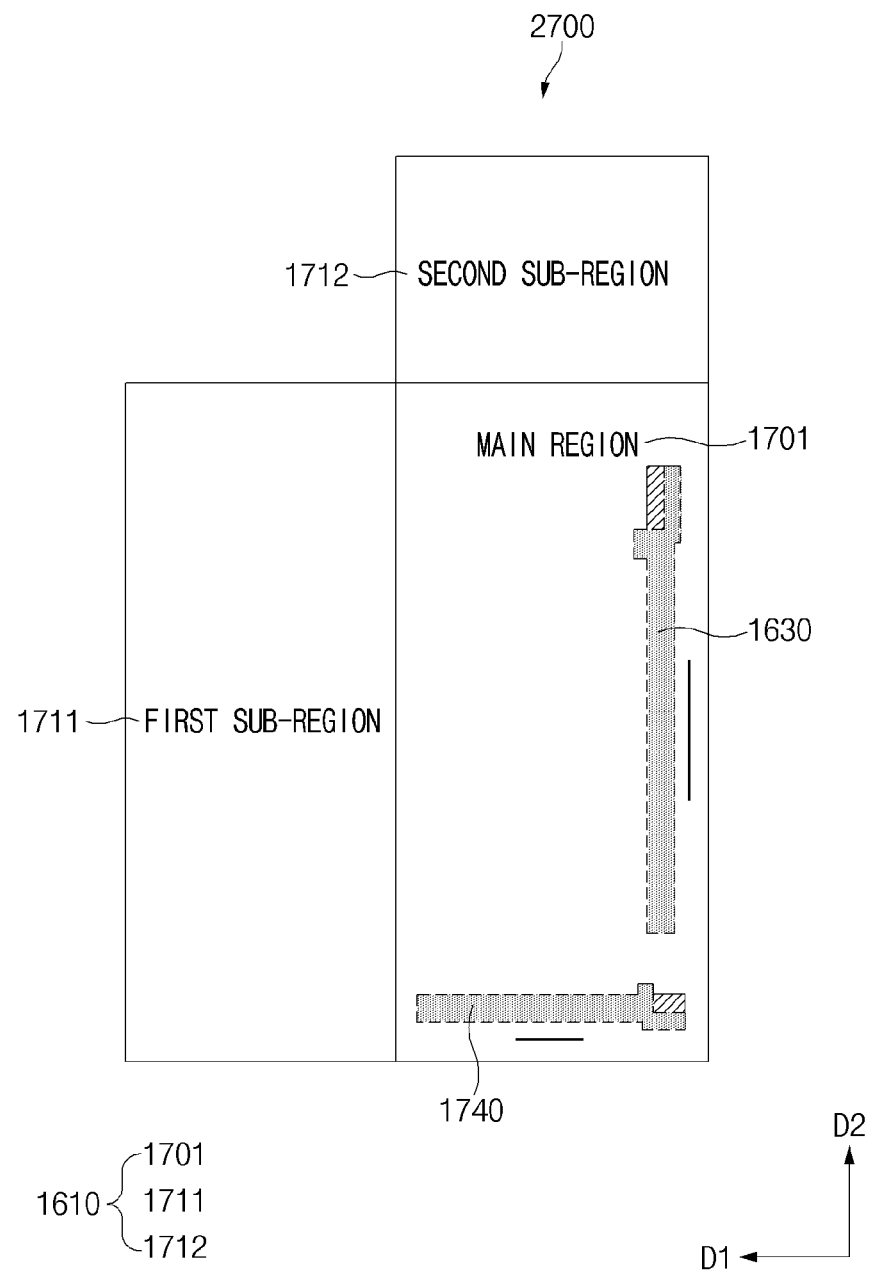
FIG. 27 is a view illustrating the main region, a first sub-region, and a second sub-region of a display, a display driver IC, and a sub-display driver IC according to an embodiment of the disclosure.

FIG. 27 is a view illustrating a main region, a first sub-region, and a second sub-region of a display, a display driver IC 1630, and a sub-display driver IC according to an embodiment of the disclosure.

Referring to FIG. 27, in a view 2700, the electronic device according to an embodiment (e.g., the electronic device 1501 of FIG. 15) may further include the sub-display driver IC 1740. The sub-display driver IC 1740 may receive image data from the processor 1520. The sub-display driver IC 1740 may operate together with or separately from the display driver IC 1630. The sub-display driver IC 1740 may display a screen on a partial region of the display 1610. For example, the driver IC 1740 may apply a data voltage to the second sub-region 1712.

In an embodiment, the display driver IC 1630 and the sub-display driver IC 1740 may be disposed perpendicular to each other. For example, the display driver IC 1630 and the sub-display driver IC 1740 may be disposed in an L shape, a shape symmetrical to the L shape in the first direction D1 with respect to a line therebetween, or a shape symmetrical to the L shape in the second direction D2 with respect to a line therebetween. For example, the display driver IC 1630 may be disposed to face in the first direction DR1, and the sub-display driver IC 1740 may be disposed to face in the second direction D2 perpendicular to the first direction D1.

In an embodiment, the display driver IC 1630 and the sub-display driver IC 1740 may be spaced apart from each other. For example, the display driver IC 1630 may be disposed in a first edge region on the opposite side to the first sub-region 1711, and the sub-display driver IC 1740 may be disposed in a second edge region on the opposite side to the second sub-region 1712. When the display driver IC 1630 and the sub-display driver IC 1740 are used as a dual driver IC, the amorphous display 1610 may be stably driven. In particular, when the size of the amorphous display 1610 is increased and a high-speed operation is required, the driving performance may be improved by using the display driver IC 1630 and the sub-display driver IC 1740 as the dual driver IC.

In an embodiment, the display driver IC 1630 and the sub-display driver IC 1740 may independently operate. The processor (e.g., the processor 1520 of FIG. 17) may select at least one of the display driver IC 1630 or the sub-display driver IC 1740 and may apply the data voltage to the display 1610. Power consumption may be reduced by selectively driving the display driver IC 1630 and the sub-display driver IC 1740 while partially turning on or off the display driver IC 1630 and the sub-display driver IC 1740.

In an embodiment, the processor 1520 may partially turn on or off the gate electrodes of the pixels disposed in the first sub-region 1711 or the second sub-region 1712, based on whether the first sub-region 1711 or the second sub-region 1712 of the display 1610 extends to the outside. The processor 1520 may selectively supply a scan signal to the gate electrodes of the pixels disposed in the first sub-region 1711 or the second sub-region 1712. The processor 1520 may partially control the first sub-region 1711 or the second sub-region 1712, thereby reducing power consumption.

In an embodiment, the processor 1520 may select, from the display driver IC 1630 and the sub-display driver IC 1740, a driver IC that applies the data voltage, based on whether the first sub-region 1711 or the second sub-region 1712 of the display 1610 extends to the outside. When the first sub-region 1711 extends to the outside and the second sub-region 1712 is inserted into the electronic device (e.g., the electronic device 1501 of FIG. 15), the processor 1520 may perform control such that the display driver IC 1630 applies the data voltage. When the first sub-region 1711 is inserted into the electronic device (e.g., the electronic device 1501 of FIG. 15) and the second sub-region 1712 extends to the outside, the processor 1520 may perform control such that the sub-display driver IC 1740 applies the data voltage. Accordingly, the processor 1520 may partially apply the data voltage only to the first sub-region 1711 or the second sub-region 1712 that requires the application of the data voltage, thereby improving the response speed and the scan rate performance.

Figure 28:
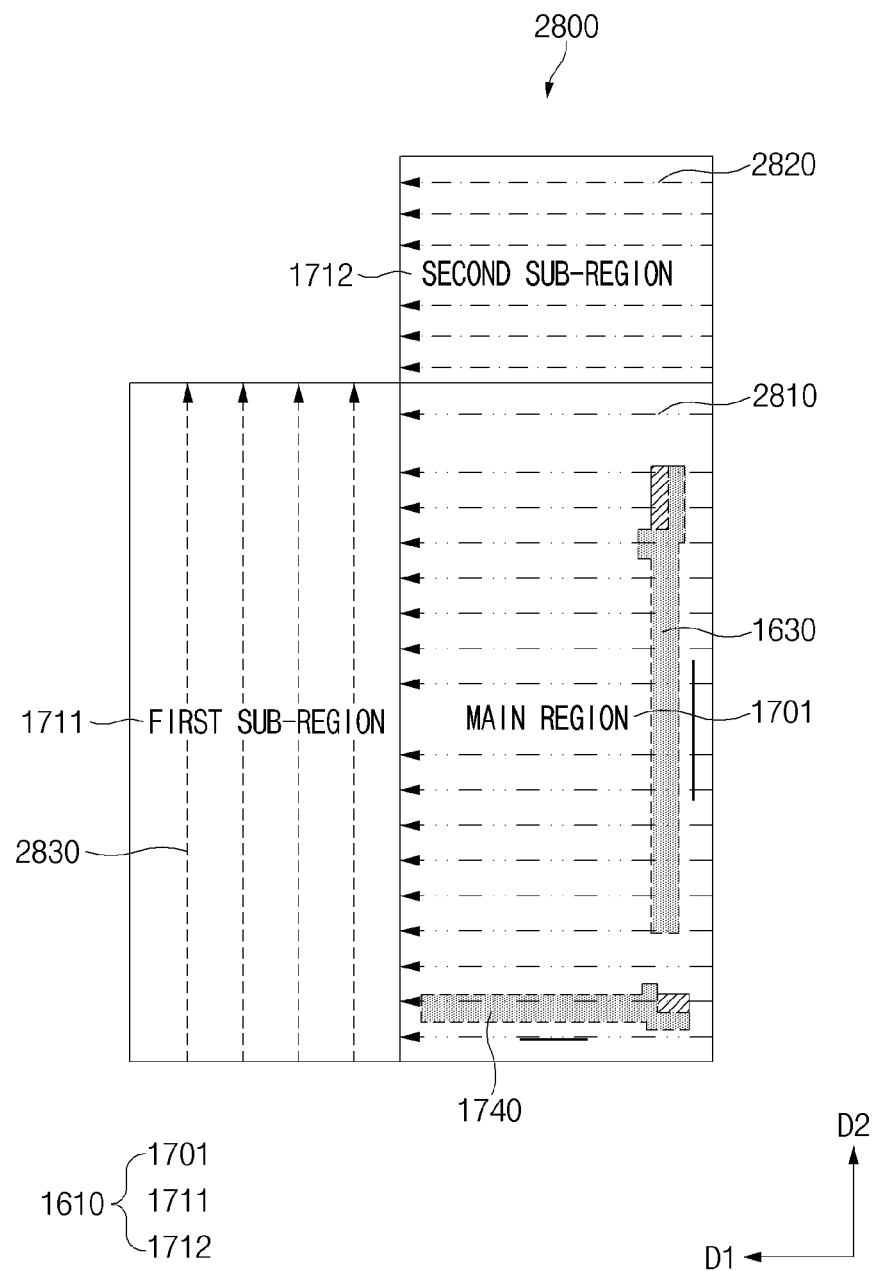
FIG. 28 is a view illustrating an operation of applying a data voltage to a main region, a first sub-region, and a second sub-region of a display according to an embodiment of the disclosure.

FIG. 28 is a view illustrating an operation of applying a data voltage to a main region, a first sub-region, and a second sub-region of a display according to an embodiment of the disclosure.

Referring to FIG. 28, in a view 2800, in an embodiment, in the fourth state, the processor 1520 may control the display driver IC 1630 and the sub-display driver IC 1740 to perform the first scan 1810 and the second scan 1820 to apply the data voltage to the main region 1701, the first sub-region 1711, and the second sub-region 1712. The fourth state may be a state in which the main region 1701, at least a portion of the first sub-region 1711, and at least a portion of the second sub-region 1712 of the display 1610 are exposed to the outside.

In an embodiment, the processor 1520 may control the display driver IC 1630 and the sub-display driver IC 1740 to perform an eleventh scan 2810 on the main region 1701, a twelfth scan 2820 on the second sub-region 1712, and a thirteenth scan 2830 on the first sub-region 1711. Characteristics of the eleventh scan 2810, the twelfth scan 2820, and the thirteenth scan 2830 may be independently set. For example, the drive frequency of the eleventh scan 2810, the drive frequency of the twelfth scan 2820, and the drive frequency of the thirteenth scan 2830 may be equal to, or different from, one another.

In an embodiment, to apply the data voltage to the main region 1701, the first sub-region 1711, and the second sub-region 1712, the processor 1520 may use the display driver IC 1630 and the sub-display driver IC 1740. When it is not easy to apply the data voltage from one driver IC to the main region 1701, the first sub-region 1711, and the second sub-region 1712, the processor 1520 may set a region to which the data voltage is applied, such that the display driver IC 1630 and the sub-display driver IC 1740 apply the data voltage to different regions.

In an embodiment, the display driver IC 1630 and the sub-display driver IC 1740 may apply the data voltage in different directions. For example, the display driver IC 1630 may apply the data voltage in the first direction D1, and the sub-display driver IC 1740 may apply the data voltage in the second direction D2.

In an embodiment, the processor 1520 may control the display driver IC 1630 and the sub-display driver IC 1740 such that the display driver IC 1630 applies the data voltage to the main region 1701 and the second sub-region 1712 and the sub-display driver IC 1740 applies the data voltage to the first sub-region 1711. The display driver IC 1630 may perform the eleventh scan 2810 and the twelfth scan 2820 in the first direction D1, and the sub-display driver IC 1740 may perform the thirteenth scan 2830 in the second direction D2.

Figure 29:
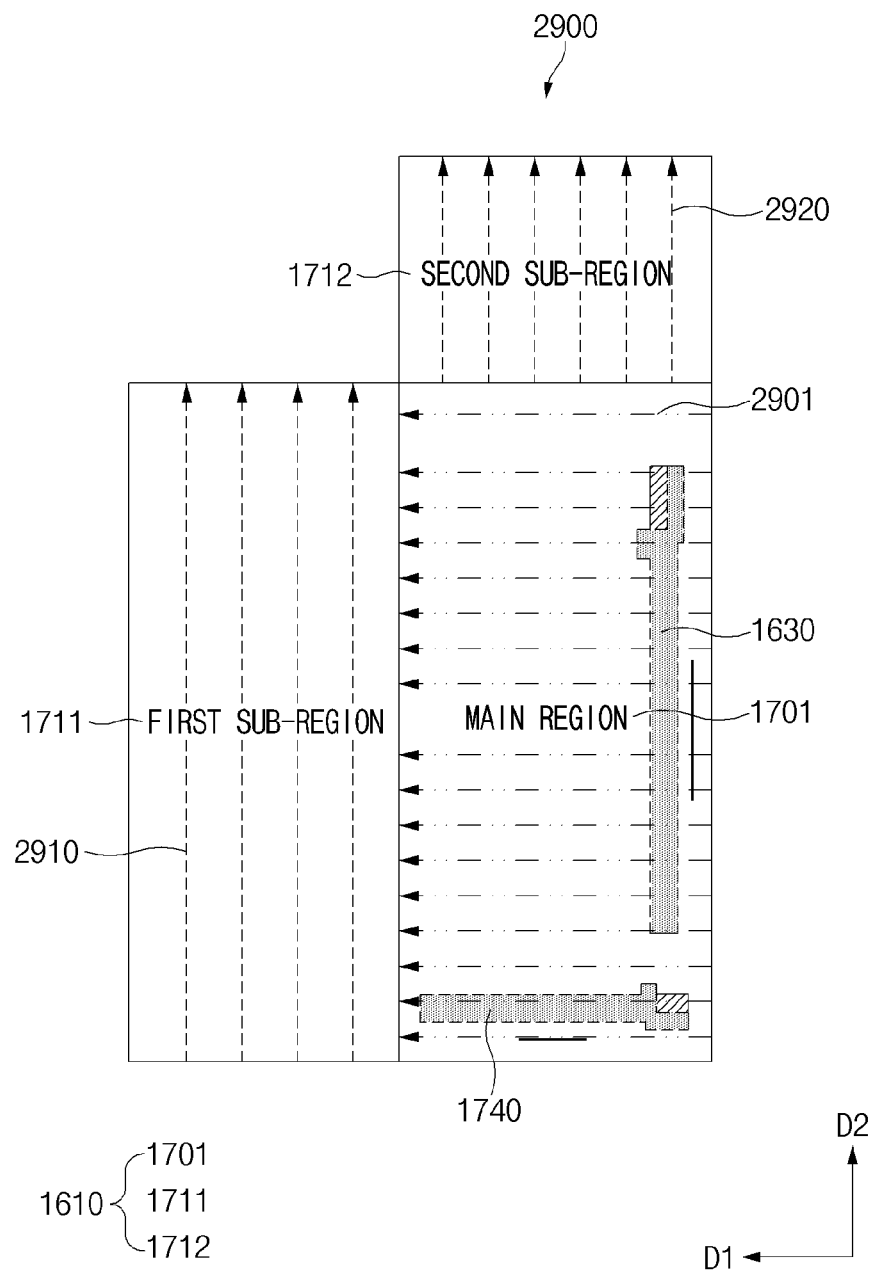
FIG. 29 is a view illustrating an operation of applying a data voltage to a main region, a first sub-region, and a second sub-region of a display according to an embodiment of the disclosure.

FIG. 29 is a view illustrating an operation of applying a data voltage to a main region, a first sub-region, and a second sub-region of a display according to an embodiment of the disclosure.

Referring to FIG. 29, in a view 2900, In an embodiment, the processor 1520 may control the display driver IC 1630 and the sub-display driver IC 1740 to perform a fourteenth scan 2901 on the main region 1701, a fifteenth scan 2910 on the first sub-region 1711, and a sixteenth scan 2920 on the second sub-region 1712.

In an embodiment, the processor 1520 may control the display driver IC 1630 and the sub-display driver IC 1740 such that the display driver IC 1630 applies the data voltage to the main region 1701 and the sub-display driver IC 1740 applies the data voltage to the first sub-region 1711 and the second sub-region 1712. The display driver IC 1630 may perform the fourteenth scan 2901 in the first direction D1, and the sub-display driver IC 1740 may perform the fifteenth scan 2910 and the sixteenth scan 2920 in the second direction D2.

Figure 30:
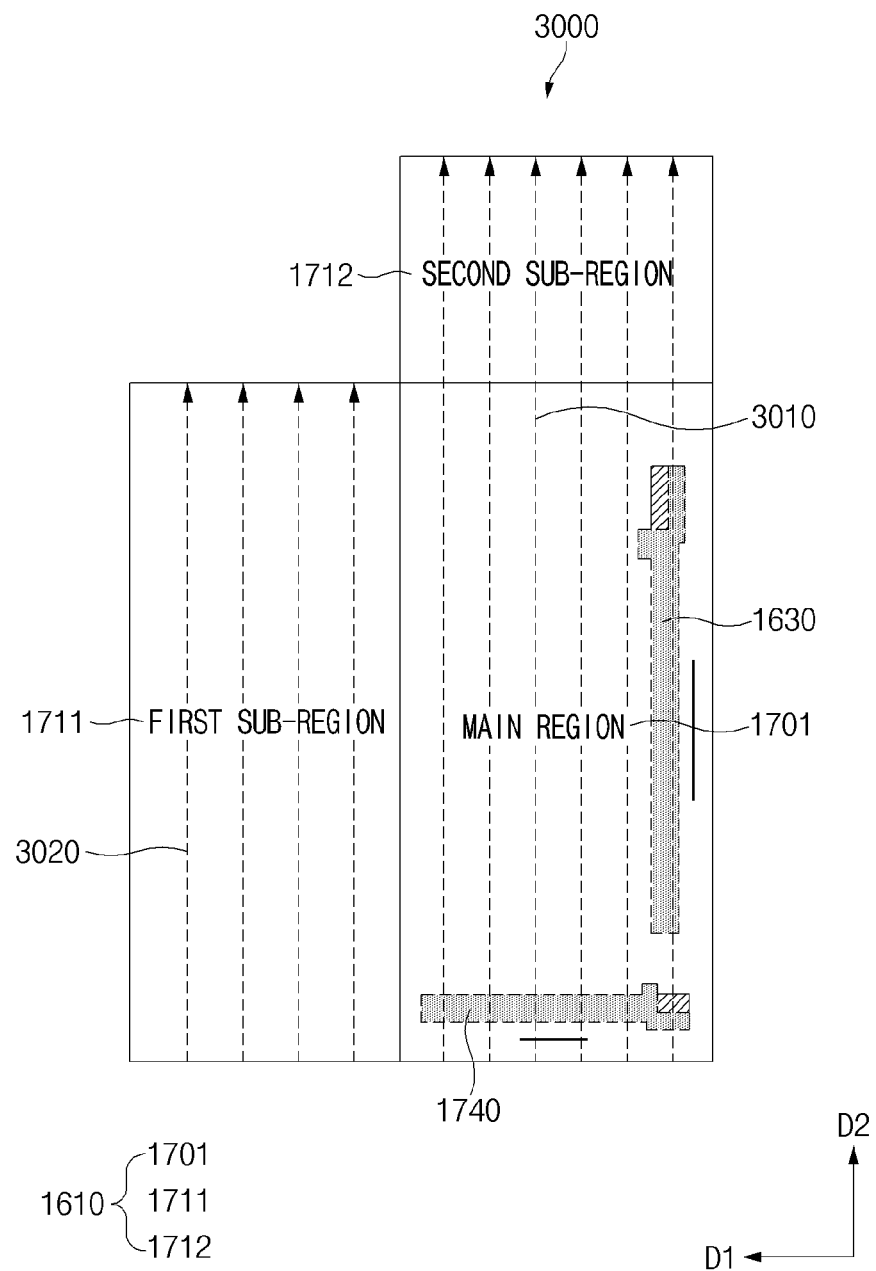
FIG. 30 is a view illustrating an operation of applying a data voltage to a main region, a first sub-region, and a second sub-region of a display according to an embodiment of the disclosure.

FIG. 30 is a view illustrating an operation of applying a data voltage to a main region, a first sub-region, and a second sub-region of a display according to an embodiment of the disclosure.

Referring to FIG. 30, in a view 3000, the processor 1520 may control the display driver IC 1630 or the sub-display driver IC 1740 to perform a seventeenth scan 3010 on the main region 1701 and the second sub-region 1712 and an eighteenth scan 3020 on the first sub-region 1711.

In an embodiment, the processor 1520 may control the sub-display driver IC 1740 such that the sub-display driver IC 1740 applies the data voltage to the main region 1701, the first sub-region 1711, and the second sub-region 1712. The sub-display driver IC 1740 may perform the seventeenth scan 3010 and the eighteenth scan 3020 in the second direction D2.

FIGS. 28 to 30 illustrate the operation in which the processor 1520 controls the display driver IC 1630 and the sub-display driver IC 1740 to apply the data voltage to the main region 1701, the first sub-region 1711, and the second sub-region 1712. However, without being limited thereto, the display driver IC 1630 and the sub-display driver IC 1740 may be selected in various ways. For example, the processor 1520 may control the display driver IC 1630 and the sub-display driver IC 1740 such that the display driver IC 1630 applies the data voltage to the main region 1701 and the first sub-region 1711 and the sub-display driver IC 1740 applies the data voltage to the second sub-region 1712. In another example, the processor 1520 may control the sub-display driver IC 1630 such that the sub-display driver IC 1630 applies the data voltage to the main region 1701, the first sub-region 1711, and the second sub-region 1712.

In an embodiment, the processor 1520 may control the display driver IC 1630 and the sub-display driver IC 1740 such that the display driver IC 630 applies the data voltage to a region requiring a specified scan rate or more and the sub-display driver IC 1740 applies the data voltage to a region capable of displaying a screen at a scan rate lower than the specified scan rate. For example, the processor 1520 may control the display driver IC 1630 and the sub-display driver IC 1740 such that the display driver IC 1630 applies the data voltage to a region that displays moving images and the sub-display driver IC 1740 applies the data voltage to a region that displays a still image.

Figure 31:
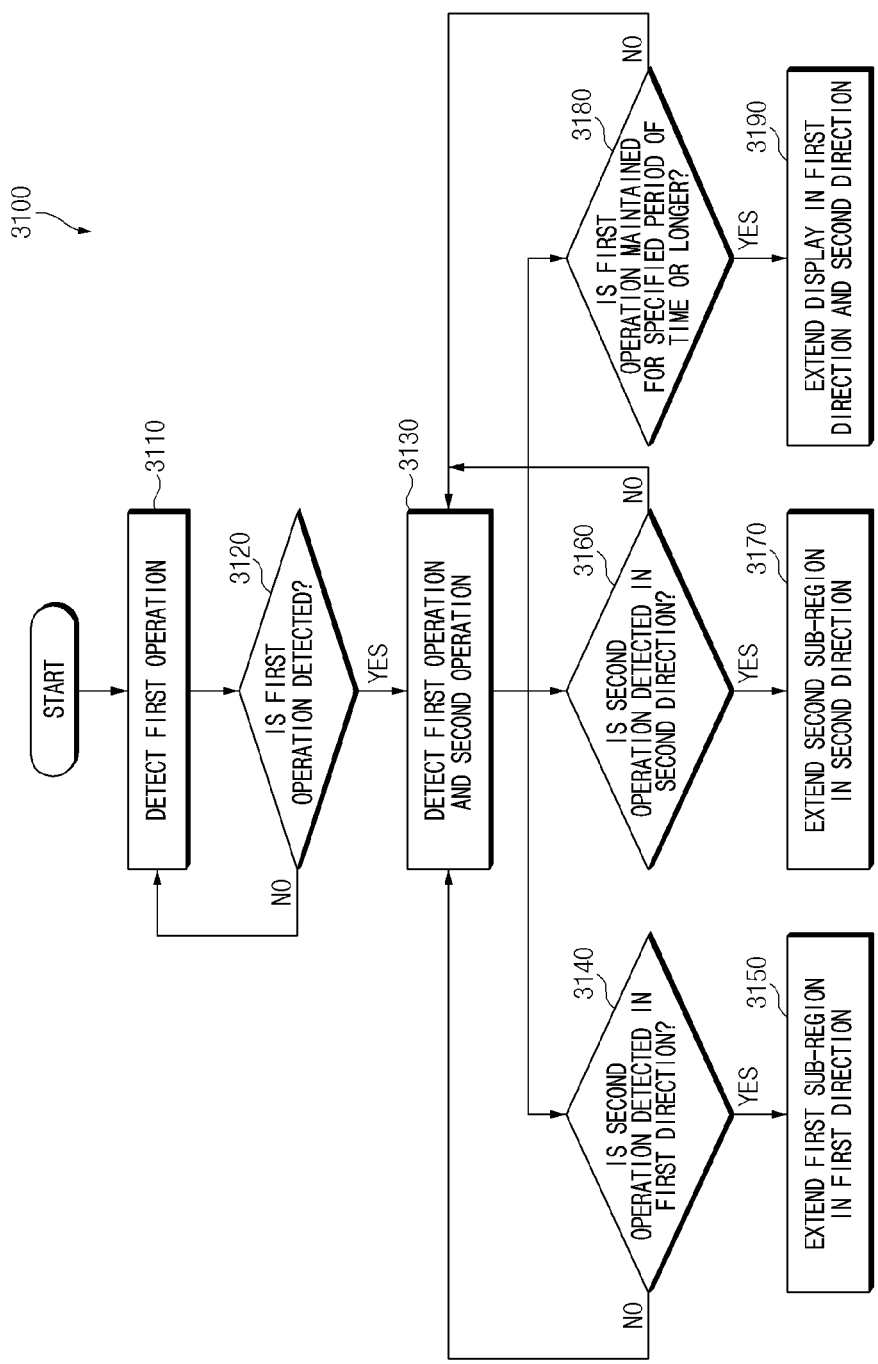
FIG. 31 is a flowchart illustrating an operation of extending a first sub-region and/or a second sub-region of the display according to an embodiment of the disclosure.

FIG. 31 is a flowchart illustrating an operation of extending a first sub-region and/or a second sub-region of a display (e.g., the display 1610 of FIG. 17) according to an embodiment of the disclosure.

Referring to FIG. 31, in a method 3100, in operation 3110, the processor according to an embodiment (e.g., the processor 1520 of FIG. 17) may detect a first operation. The first operation may be an operation of preparing to start an operation of sliding the display 1610. The first operation may be an operation of triggering the operation of sliding the display 1610. The first operation may be an operation defined to extend both the first sub-region 1711 and the second sub-region 1712 to the outside when the first operation is maintained for a specified period of time or longer after the first operation is detected.

In an embodiment, the first operation may include an operation previously set by a user of the electronic device (e.g., the electronic device 1501 of FIG. 15) to slide the display 1610. For example, the first operation may include an operation of recognizing a fingerprint of the user. The fingerprint of the user may be recognized by using a touch or a force touch on a fingerprint sensor disposed below a region in which the display 1610 is disposed. In another example, the first operation may be an operation of performing a force touch with a specified pressure or higher on the display 1610, performing a force touch in at least one specified position on the display 1610, or performing a force touch on a specified area or more on the display 1610. In another example, the first operation may be an operation in which the user surrounds at least one side surface of the electronic device 1501 with a hand or presses a physical key or button of the electronic device 1501.

In an embodiment, the processor 1520 may determine context of the display 1610 while detecting the first operation. The processor 1520 may determine a state related to the form of the display 1610. For example, the processor 1520 may determine whether the electronic device is in the first state in which only the main region (e.g., the main region 1701 of FIG. 17) of the display 1610 is exposed to the outside, whether the electronic device is in the second state in which the main region 1701 and the first sub-region (e.g., the first sub-region 1711 of FIG. 17) of the display 1610 are exposed to the outside, whether the electronic device is in the third state in which the main region 1701 and the second sub-region (e.g., the second sub-region 1712 of FIG. 17) of the display 1610 are exposed to the outside, and whether the electronic device is in the fourth state in which the main region 1701, the first sub-region 1711, and the second sub-region 1712 of the display 1610 are exposed to the outside. The processor 1520 may determine the type of screen displayed on the display 1610. For example, the processor 1520 may determine whether the display 1610 displays an execution screen of an application or displays a lock screen.

In operation 3120, the processor 1520 according to an embodiment may determine whether the first operation is detected. For example, the processor 1520 may determine whether the fingerprint sensor recognizes the user's fingerprint. In another example, the processor 1520 may determine whether a force touch with a specified pressure or higher is applied to the display 1610, a force touch is applied to at least one specified position on the display 1610, or a force touch is applied to a specified area or more on the display 1610. In another example, the processor 1520 may determine whether at least one side surface of the electronic device 1501 is surrounded by the user's hand or a physical key or button of the electronic device 1501 is pressed. When it is determined that the first operation is detected (operation 3120—Yes), the processor 1520 may proceed to operation 3130. When it is determined that the first operation is not detected (operation 3120—No), the processor 1520 may return to operation 3110.

In operation 3130, the processor 1520 according to an embodiment may detect the first operation and a second operation. The first operation may be an operation defined to extend both the first sub-region 1711 and the second sub-region 1712 when the first operation is maintained for a specified period of time. The processor 1520 may measure the time during which the first operation is maintained. The second operation may be an operation defined to selectively extend the first sub-region 1711 or the second sub-region 1712. For example, the second operation may be an operation in which the user swipes a finger over the display 1610 in the first direction (e.g., the first direction D1 of FIG. 18) or the second direction (e.g., the second direction D2 of FIG. 18). In another example, the second operation may be an operation in which the user tilts the electronic device 1501 in the first direction D1 or the second direction D2. The processor 1520 may identify the direction in which the second operation is detected.

In operation 3140, the processor 1520 according to an embodiment may determine whether the second operation is detected in the first direction D1. For example, the processor 1520 may determine whether a touch input for a swipe in the first direction D1 is detected, by using a touch sensor disposed in the display 1610 (e.g., the touch sensor 1651 of FIG. 16). In another example, the processor 1520 may determine whether the electronic device 1501 is tilted in the first direction D1, by using a gyro sensor included in a sensor module (e.g., the sensor module 1576 of FIG. 15). When it is determined that the second operation is detected in the first direction D1 (operation 3140—Yes), the processor 1520 may proceed to operation 3150. When it is determined that the second operation is not detected in the first direction D1 (operation 3140—No), the processor 1520 may return to operation 3130.

In operation 3150, the processor 1520 according to an embodiment may control the sliding member such that the first sub-region 1711 extends in the first direction D1. When it is determined that the second operation is detected in the first direction D1, the processor 1520 may control the sliding member to extend the display 1610 in the first direction D1 and expose the first sub-region 1711 to the outside.

In operation 3160, the processor 1520 according to an embodiment may determine whether the second operation is detected in the second direction D2. For example, the processor 1520 may determine whether a touch input for a swipe in the second direction D2 is detected, by using the touch sensor 1651 disposed in the display 1610. In another example, the processor 1520 may determine whether the electronic device 1501 is tilted in the second direction D2, by using the gyro sensor included in the sensor module 1576. When it is determined that the second operation is detected in the second direction D2 (operation 3160—Yes), the processor 1520 may proceed to operation 3170. When it is determined that the second operation is not detected in the second direction D2 (operation 3160—No), the processor 1520 may return to operation 3130.

In operation 3170, the processor 1520 according to an embodiment may control the sliding member such that the second sub-region 1712 extends in the second direction D2. When it is determined that the second operation is detected in the second direction D2, the processor 1520 may control the sliding member to extend the display 1610 in the second direction D2 and expose the second sub-region 1712 to the outside.

When it is determined that the second operation is detected in the first direction D1 and the second direction D2, the processor 1520 according to an embodiment may control the sliding member to extend the display 1610 in the first direction D1 and the second direction D2 and expose the first sub-region 1711 and the second sub-region 1712 to the outside. When it is determined that the second operation is detected in the first direction D1 and the second direction D2, the processor 1520 may change the display 1610 from the first state to the fourth state.

In operation 3180, the processor 1520 according to an embodiment may determine whether the first operation is maintained for a specified period of time or longer. For example, the processor 1520 may determine whether the user's fingerprint is recognized by the fingerprint sensor disposed in the display 1610 for a specified period of time or longer. In another example, the processor 1520 may determine whether a force touch is maintained on the display 1610 for a specified period of time or longer. In another example, the processor 1520 may determine whether at least one side surface of the electronic device 1501 is surrounded by the user's hand for a specified period of time or longer or a physical key or button of the electronic device 1501 is pressed for a specified period of time or longer. When it is determined that the first operation is maintained for the specified period of time or longer (operation 3180—Yes), the processor 1520 may proceed to operation 3190. When it is determined that the first operation is not maintained for the specified period of time or longer (operation 3180—No), the processor 1520 may return to operation 3130.

In operation 3190, the processor 1520 according to an embodiment may control the sliding member such that the first sub-region 1711 extends in the first direction D1 and the second sub-region 1712 extends in the second direction D2.

When it is determined that the first operation is maintained for the specified period of time or longer, the processor 1520 may control the sliding member to extend the display 1610 in the first direction D1 and the second direction D2 and expose the first sub-region 1711 and the second sub-region 1712 to the outside.

Figure 32:
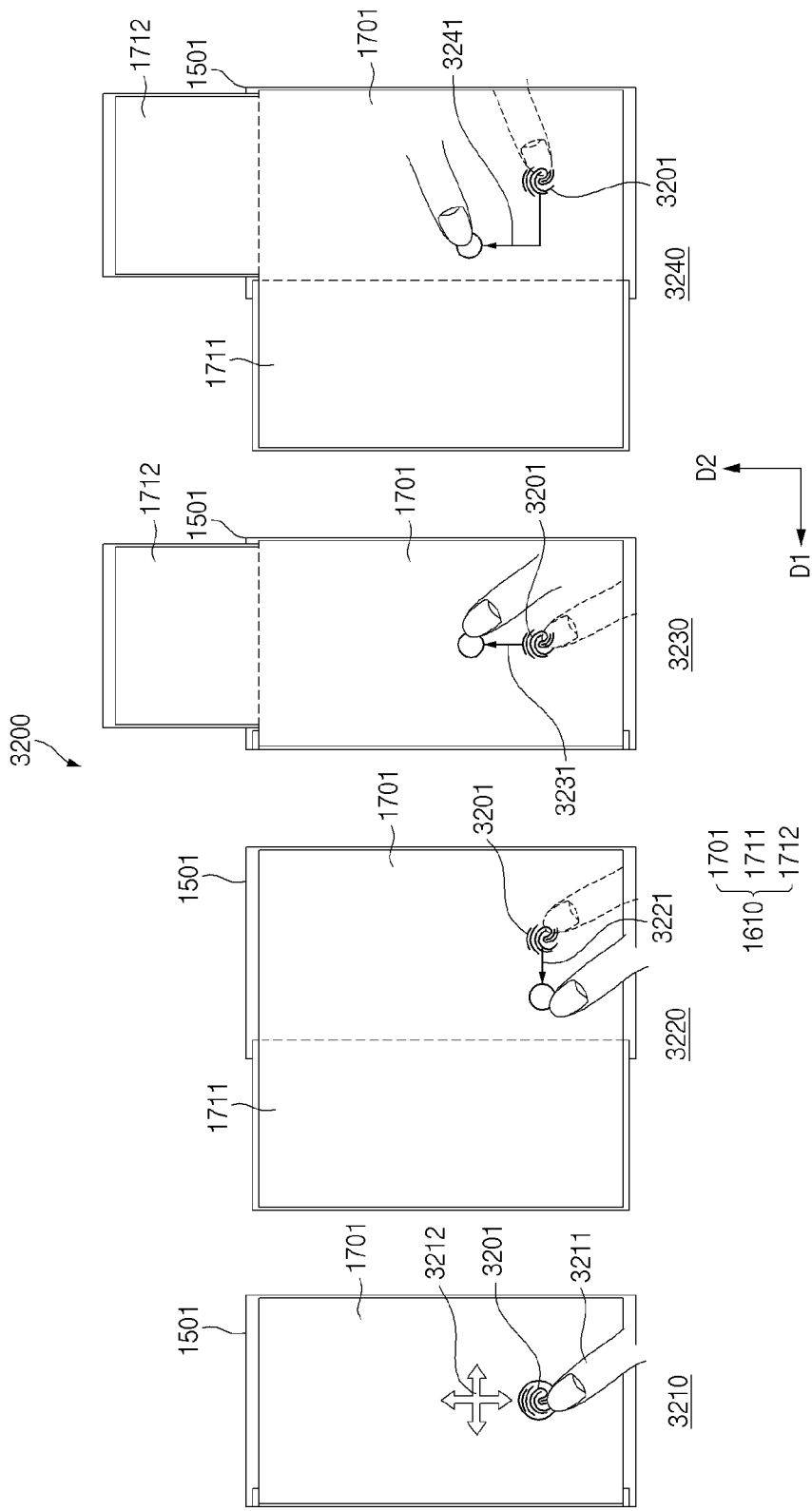
FIG. 32 is a view illustrating an operation of extending a first sub-region and/or a second sub-region of a display depending on a first operation and a second operation according to an embodiment of the disclosure.

FIG. 32 is a view illustrating an operation of extending a first sub-region and/or a second sub-region of a display depending on a first operation and a second operation according to an embodiment of the disclosure.

Referring to FIG. 32, in a view 3200, in an embodiment, the display 1610 of the electronic device 1501 may be in a first state 3210. The first state 3210 may be a state in which the main region 1701 of the display 1610 is exposed to the outside and the first sub-region 1711 and the second sub-region 1712 are inserted into the electronic device 1501.

In an embodiment, a fingerprint sensor 3201 may be disposed on the main region 1701 of the display 1610. The fingerprint sensor 3201 may recognize a touch of a user's finger and may recognize a fingerprint from the user's finger.

In an embodiment, the user may perform the first operation 3211. The first operation 3211 may be an operation of brining the user's finger into contact with the portion of the main region 1701 of the display 1610 on which the fingerprint sensor 3201 is disposed. The processor (e.g., the processor 1520 of FIG. 17) may detect the first operation 3211 and may trigger an operation of extending the display 1610.

In an embodiment, the processor 1520 may detect the first operation 3211 and may display a user interface 3212 on the display 1610. The user interface 3212 may guide a second operation capable of extending at least one of the first sub-region 1711 or the second sub-region 1712 of the display 1610 to the user. For example, the user interface 3212 may be an arrow icon for guiding performance of a swipe input in the first direction D1 and the second direction D2. The user interface 3212 may be an icon in the form of an arrow pointing in four directions.

In an embodiment, the user may perform a second operation 3221, 3231, or 3241 after the first operation 3211 to change the display 1610 of the electronic device 1501 to a second state 3220, a third state 3230, or a fourth state 3240.

In an embodiment, when detecting the second operation 3221 of swiping the user's finger over the main region 1701 of the display 1610 in the first direction D1, the processor 1520 may move the sliding member to change the display 1610 of the electronic device 1501 to the second state 3220. The electronic device 1501 may include at least one of an actuator that manually or automatically slides the display 1610 by mechanical operation. The actuator may move the display 1610 into and/or out of the electronic device 1501. For example, the actuator may change the display 1610 into a form in which the display 1610 is mounted inside the electronic device 1501 or a form in which the display 1610 extends outside the electronic device 1501. The actuator may be implemented with a mechanical structure or a power device for moving the display 1610. For example, the actuator may be at least one of a slide-type rail structure or a motor disposed inside the electronic device 100. When detecting the second operation 3221 of swiping the user's finger over the main region 1701 of the display 1610 in the first direction D1, the processor 1520 may move the sliding member in the first direction D1 to expose the first sub-region 1711 to the outside.

In an embodiment, when detecting the second operation 3231 of swiping the user's finger over the main region 1701 of the display 1610 in the second direction D2, the processor 1520 may move the sliding member to change the display 1610 of the electronic device 1501 to the third state 3230. When detecting the second operation 3231 of swiping the user's finger over the main region 1701 of the display 1610 in the second direction D2, the processor 1520 may move the sliding member in the second direction D2 to expose the second sub-region 1712 to the outside.

In an embodiment, when detecting the second operation 3241 of swiping the user's finger over the main region 1701 of the display 1610 in the first direction D1 and the second direction D2, the processor 1520 may move the sliding member to change the display 1610 of the electronic device 1501 to the fourth state 3240. When detecting the second operation 3241 of swiping the user's finger over the main region 1701 of the display 1610 in the first direction D1 and the second direction D2, the processor 1520 may move the sliding member in the first direction D1 and the second direction D2 to expose the first sub-region 1711 and the second sub-region 1712 to the outside.

Figure 33:
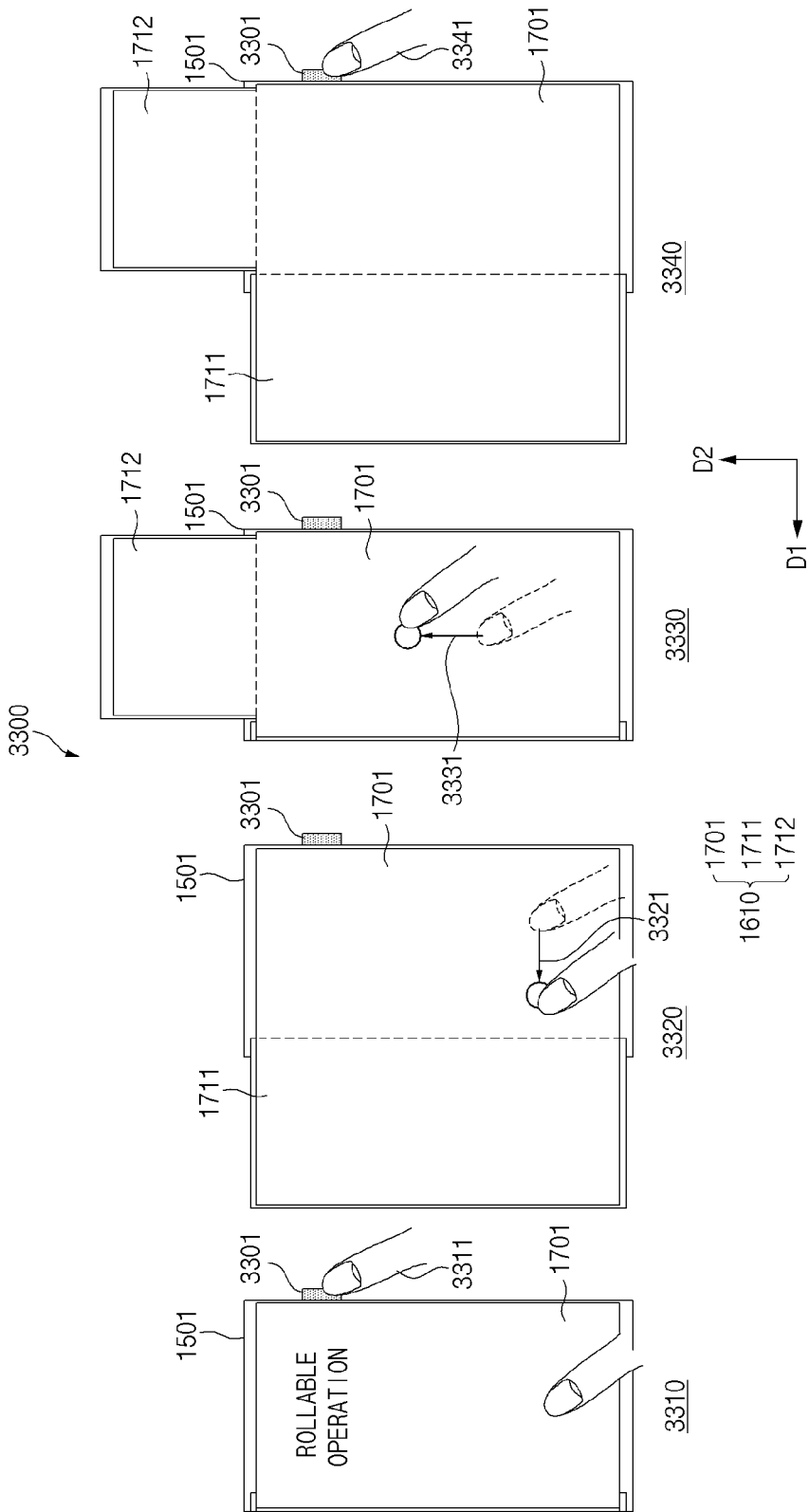
FIG. 33 is a view illustrating an operation of extending a first sub-region and/or a second sub-region of a display depending on a first operation and/or a second operation according to an embodiment of the disclosure.

FIG. 33 is a view illustrating an operation of extending a first sub-region and/or a second sub-region of a display depending on a first operation and/or a second operation according to an embodiment of the disclosure.

Referring to FIG. 33, in a view 3300, the display 1610 of the electronic device 1501 may be in a first state 3310. The first state 3310 may be a state in which the main region 1701 of the display 1610 is exposed to the outside and the first sub-region 1711 and the second sub-region 1712 are inserted into the electronic device 1501.

In an embodiment, a physical key 3301 may be disposed on one side of the electronic device 1501. The physical key 3301 may protrude in the form of a button such that a user is able to physically press the button.

In an embodiment, the user may perform the first operation 3311. The first operation 3311 may be an operation of pressing the physical key 3301. The processor (e.g., the processor 1520 of FIG. 17) may detect the first operation 3311 and may trigger an operation of extending the display 1610.

In an embodiment, the processor 1520 may detect the first operation 3211 and may display, on the display 1610, a message or icon that guides performance of an operation of expanding the area by which the display 1560 is exposed. Through the display 1560, the processor 1520 may notify the user that the display 1610 is in the process of performing the second operation of capable of extending at least one of the first sub-region 1711 or the second sub-region 1712. For example, the processor 1520 may display, on the display 1610, text notifying of performance of a rollable operation of moving the display 1610.

In an embodiment, the user may perform the second operation 3321 or 3331 after the first operation 3311 to change the display 1610 of the electronic device 1501 to a second state 3320 or a third state 3330.

In an embodiment, when detecting the second operation 3321 of swiping the user's finger over the main region 1701 of the display 1610 in the first direction D1, the processor 1520 may move the sliding member to change the display 1610 of the electronic device 1501 to the second state 3320. When detecting the second operation 3321 of swiping the user's finger over the main region 1701 of the display 1610 in the first direction D1, the processor 1520 may move the sliding member in the first direction D1 to expose the first sub-region 1711 to the outside.

In an embodiment, when detecting the second operation 3331 of swiping the user's finger over the main region 1701 of the display 1610 in the second direction D2, the processor 1520 may move the sliding member to change the display 1610 of the electronic device 1501 to the third state 3330. When detecting the second operation 3331 of swiping the user's finger over the main region 1701 of the display 1610 in the second direction D2, the processor 1520 may move the sliding member in the second direction D2 to expose the second sub-region 1712 to the outside.

In an embodiment, when detecting that the first operation 3341 of pressing the physical key 3301 is maintained for a specified period of time or longer, the processor 1520 may move the sliding member to change the display 1610 of the electronic device 1501 to a fourth state 3340. When detecting that the first operation 3341 of pressing the physical key 3301 is maintained for the specified period of time or longer, the processor 1520 may move the sliding member in the first direction D1 and the second direction D2 to expose the first sub-region 1711 and the second sub-region 1712 to the outside.

Figure 34:
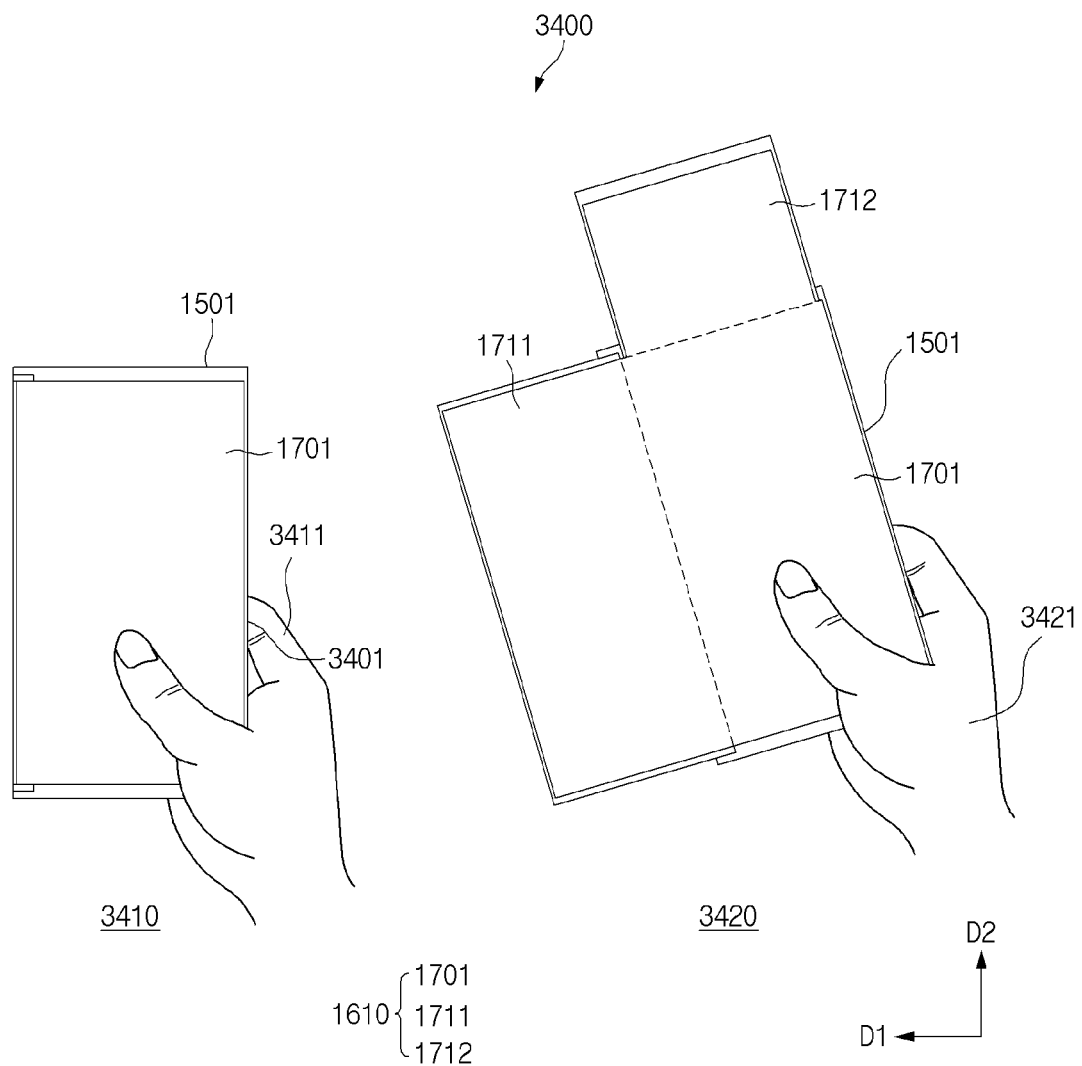
FIG. 34 is a view illustrating an operation of extending a first sub-region and/or a second sub-region of a display depending on a first operation and a second operation according to an embodiment of the disclosure.

FIG. 34 is a view illustrating an operation of extending a first sub-region and/or a second sub-region of a display depending on a first operation and a second operation according to an embodiment of the disclosure.

Referring to FIG. 34, in a view of 3400, the display 1610 of the electronic device 1501 may be in a first state 3410. The first state 3210 may be a state in which the main region 1701 of the display 1610 is exposed to the outside and the first sub-region 1711 and the second sub-region 1712 are inserted into the electronic device 1501.

In an embodiment, a grip sensor 3401 may be disposed at an edge portion of the electronic device 1501. The grip sensor 3401 may be disposed on one side surface or opposite side surfaces of the electronic device 1501. The grip sensor 3401 may recognize an operation in which a user surrounds the electronic device 1501 with a palm. However, a portion that recognizes the operation of surrounding the electronic device 1501 with the palm is not limited to the edge portion of the electronic device 1501, and the processor of the electronic device 1501 (e.g., the processor 1520 of FIG. 15) may detect grip operations of the user that occur at various portions of the electronic device 1501. For example, the processor 1520 may detect a grip operation of the user using a touch sensor on the front surface of the electronic device 1501. In another example, the processor 1520 may detect a grip operation of the user using an antenna pattern or a conductive metal part on a side surface or a rear surface.

In an embodiment, the user may perform a first operation 3411. The first operation 3411 may be a squeeze operation of wrapping and gripping one side surface or opposite side surfaces of the electronic device 1501 with fingers. The processor (e.g., the processor 1520 of FIG. 17) may detect the first operation 3411 and may trigger an operation of extending the display 1610.

In an embodiment, the user may perform the second operation 3421. The second operation 3421 may be an operation of obliquely tilting the electronic device 1501 in the first direction D1 and the second direction D2. For example, the second operation 3421 may be an operation of obliquely tilting side surfaces of the electronic device 1501 facing in the first direction D1 and the second direction D2 downward. However, without being limited thereto, the second operation 3421 may be an operation of obliquely tilting the side surfaces of the electronic device 1501 facing in the first direction D1 and the second direction D2 upward. Alternatively, the second operation 3421 may be an operation of obliquely tilting the electronic device 1501 only in the first direction D1. In another case, the second operation 3421 may be an operation of obliquely tilting the electronic device 1501 only in the second direction D2.

In an embodiment, when detecting the second operation 3421 of obliquely tilting the electronic device 1501 in the first direction D1 and the second direction D2, the processor 1520 may move the sliding member to change the display 1610 of the electronic device 1501 to a fourth state 3420. When detecting the second operation 3421 of obliquely tilting the electronic device 1501 in the first direction D1 and the second direction D2, the processor 1520 may move the sliding member in the first direction D1 and the second direction D2 to expose the first sub-region 1711 and the second sub-region 1712 to the outside.

Figure 35:
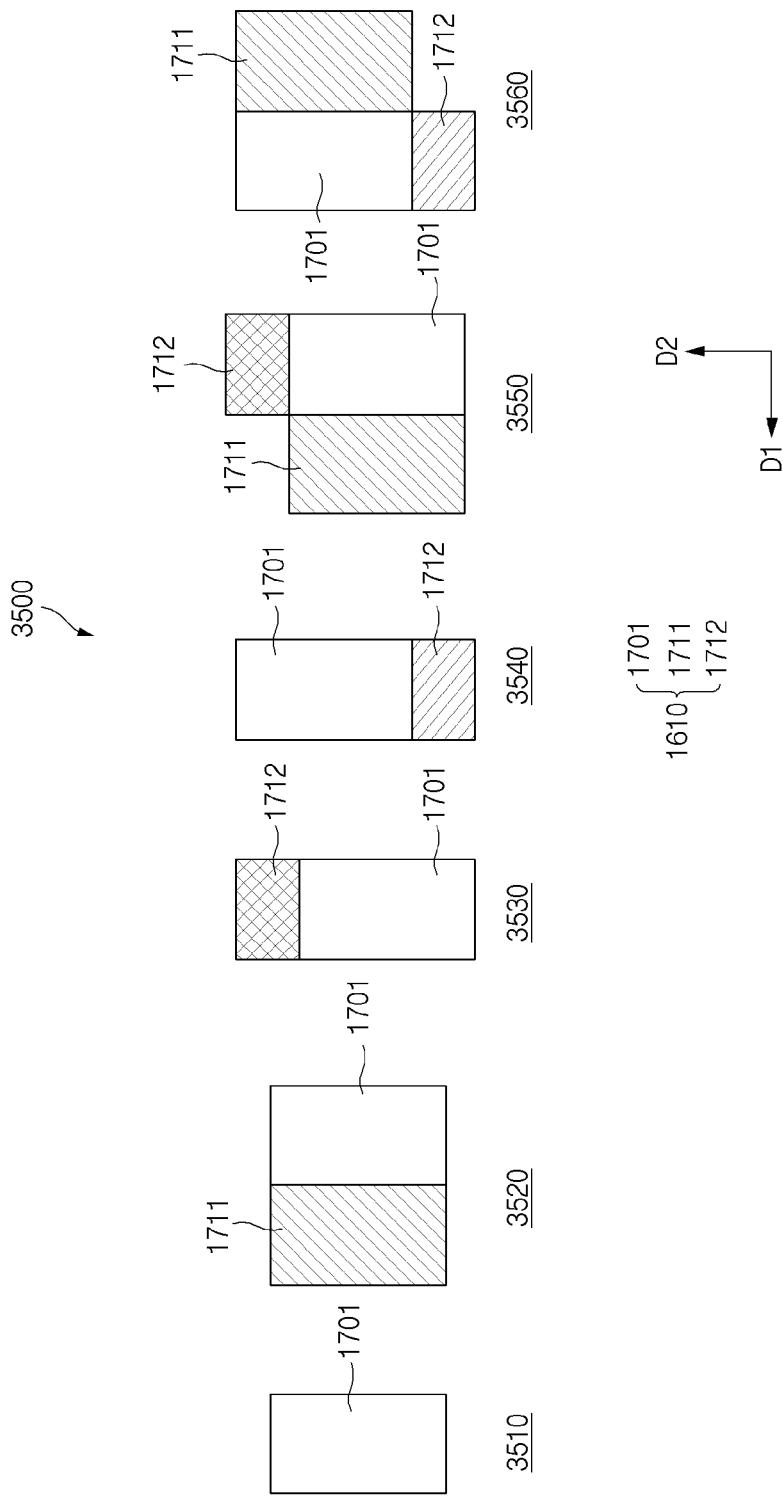
FIG. 35 is a view illustrating a plurality of usage situations in which a first sub-region and/or a second sub-region of a display is extended and used according to an embodiment of the disclosure.

FIG. 35 is a view illustrating a plurality of usage situations in which a first sub-region and/or the second sub-region of a display is extended and used according to an embodiment of the disclosure.

Referring to FIG. 35, in a view of 3500, the processor (e.g., the processor 1520 of FIG. 17) may determine whether to display a screen on at least one of the first sub-region 1711 or the second sub-region 1712, based on a state of the display 1610 of the electronic device (e.g., the electronic device 1501 of FIG. 15). The processor 1520 may determine whether to display a screen on at least one of the first sub-region 1711 or the second sub-region 1712, based on whether at least one of the first sub-region 1711 or the second sub-region 1712 of the display 1610 is exposed to the outside.

In an embodiment, the processor 1520 may set the type of screen displayed on the display 1610, based on the type of application executed in the electronic device 1501, the type of screen displayed on the main region 1701 of the display 1610, the orientation in which the display 1610 is placed, and the position in which at least one of the first sub-region 1711 or the second sub-region 1712 is placed from the main region 1701. For example, the processor 1520 may display different types of screens on the first sub-region 1711 when the first sub-region 1711 is disposed on the left side of the main region 1701 and when the first sub-region 1711 is disposed on the right side of the main region 1701. In another example, the processor 1520 may display different types of screens on the second sub-region 1712 when the second sub-region 1712 is disposed on the upper side of the main region 1701 and when the second sub-region 1712 is disposed on the lower side of the main region 1701.

In an embodiment, when the display 1610 of the electronic device 1501 is in a first state 3510 in a portrait mode, the main region 1701 may be exposed to the outside, and the first sub-region 1711 and the second sub-region 1712 may be inserted into the electronic device 1501. When the display 1610 of the electronic device 1501 is in the first state 3510, the processor 1520 may control the display driver IC (e.g., the display driver IC 1630 of FIG. 17) to display a screen on the main region 1701 of the display 1610.

In an embodiment, when the display 1610 of the electronic device 1501 is in a second state 3520 in the portrait mode, the main region 1701 and the first sub-region 1711 may be exposed to the outside, and the second sub-region 1712 may be inserted into the electronic device 1501. When the display 1610 of the electronic device 1501 is in the second state 3520 in the portrait mode, the first sub-region 1711 may extend in the first direction D1. When the display 1610 of the electronic device 1501 is in the second state 3520, the processor 1520 may control the display driver IC 1630 to display a screen on the main region 1701 and the first sub-region 1711 of the display 1610.

In an embodiment, when the display 1610 of the electronic device 1501 is changed from the first state 3510 to the second state 3520 in the portrait mode, the processor 1520 may display a screen in a high-priority display type among a plurality of display types included in a first display list. The first display list may be stored in a memory (e.g., the memory 1530 of FIG. 15 or the memory 1633 of FIG. 17). The plurality of display types included in the first display list may include screen magnification, notification display, and an application selection menu screen.

In an embodiment, when the display 1610 of the electronic device 1501 is in a third state 3530 in the portrait mode, the main region 1701 and the second sub-region 1712 may be exposed to the outside, and the first sub-region 1711 may be inserted into the electronic device 1501. When the display 1610 of the electronic device 1501 is in the third state 3530 in the portrait mode, the second sub-region 1712 may extend in the second direction D2. When the display 1610 of the electronic device 1501 is in the third state 3530, the processor 1520 may control the display driver IC 1630 to display a screen on the main region 1701 and the second sub-region 1712 of the display 1610.

In an embodiment, when the display 1610 of the electronic device 1501 is changed from the first state 3510 to the third state 3530 in the portrait mode, the processor 1520 may display a screen in a high-priority display type among a plurality of display types included in a second display list. The second display list may be stored in the memory 1530 or 1633. The plurality of display types included in the second display list may include screen magnification, movement of video to an upper end, notification display, and an application selection menu screen.

In an embodiment, when the display 1610 of the electronic device 1501 is in an inverted third state 3540 in the portrait mode, the orientation in which the electronic device 1501 is placed may be turned upside down, compared to that in the third state 3530. When the display 1610 of the electronic device 1501 is in the inverted third state 3540 in the portrait mode, the main region 1701 and the second sub-region 1712 may be exposed to the outside, and the first sub-region 1711 may be inserted into the electronic device 1501. When the display 1610 of the electronic device 1501 is in the inverted third state 3540, the second sub-region 1712 may extend in the direction opposite to the second direction D2. When the display 1610 of the electronic device 1501 is in the inverted third state 3540, the processor 1520 may control the display driver IC 1630 to display a screen on the main region 1701 and the second sub-region 1712 of the display 1610.

In an embodiment, when the display 1610 of the electronic device 1501 is changed from the first state 3510 to the inverted third state 3540 in the portrait mode, the processor 1520 may display a screen in a high-priority display type among a plurality of display types included in a third display list. The third display list may be stored in the memory 1530 or 1633. The plurality of display types included in the third display list may include an input device screen, an auxiliary screen, and an application selection menu screen.

In an embodiment, when the display 1610 of the electronic device 1501 is in a fourth state 3550 in the portrait mode, the main region 1701, the first sub-region 1711, and the second sub-region 1712 may be exposed to the outside. When the display 1610 of the electronic device 1501 is in the fourth state 3550 in the portrait mode, the first sub-region 1711 may extend in the first direction D1, and the second sub-region 1712 may extend in the second direction D2. When the display 1610 of the electronic device 1501 is in the fourth state 3550, the processor 1520 may control the display driver IC 1630 to display a screen on the main region 1701, the first sub-region 1711, and the second sub-region 1712 of the display 1610.

In an embodiment, when the display 1610 of the electronic device 1501 is changed from the first state 3510 to the fourth state 3550 through the second state 3520 in the portrait mode, the processor 1520 may display a screen by applying one display type among the plurality of display types included in the first display list and thereafter applying one display type among the plurality of display types included in the second display list. When the display 1610 of the electronic device 1501 is changed from the first state 3510 to the fourth state 3550 through the third state 3530 in the portrait mode, the processor 1520 may display a screen by applying one display type among the plurality of display types included in the second display list and thereafter applying one display type among the plurality of display types included in the first display list. The processor 1520 may display a screen by sequentially applying a display type included in the first display list and a display type included in the second display list such that the display type included in the first display list and the display type included in the second display list do not overlap each other.

In an embodiment, when the display 1610 of the electronic device 1501 is in an inverted fourth state 3560 in the portrait mode, the orientation in which the electronic device 1501 is placed may be turned upside down, compared to that in the fourth state 3550. When the display 1610 of the electronic device 1501 is in the inverted fourth state 3560, the main region 1701, the first sub-region 1711, and the second sub-region 1712 may be exposed to the outside. When the display 1610 of the electronic device 1501 is in the inverted fourth state 3560 in the portrait mode, the first sub-region 1711 may extend in the direction opposite to the first direction D1, and the second sub-region 1712 may extend in the direction opposite to the second direction D2. When the display 1610 of the electronic device 1501 is in the inverted fourth state 3560, the processor 1520 may control the display driver IC 1630 to display a screen on the main region 1701, the first sub-region 1711, and the second sub-region 1712 of the display 1610.

In an embodiment, when the display 1610 of the electronic device 1501 is changed from the first state 3510 to the inverted fourth state 3560 through the second state 3520 in the portrait mode, the processor 1520 may display a screen by applying one display type among the plurality of display types included in the first display list and thereafter applying one display type among the plurality of display types included in the third display list. When the display 1610 of the electronic device 1501 is changed from the first state 3510 to the inverted fourth state 3560 through the inverted third state 3540 in the portrait mode, the processor 1520 may display a screen by applying one display type among the plurality of display types included in the third display list and thereafter applying one display type among the plurality of display types included in the first display list. The processor 1520 may display a screen by sequentially applying a display type included in the first display list and a display type included in the third display list such that the display type included in the first display list and the display type included in the third display list do not overlap each other.

Figure 36:
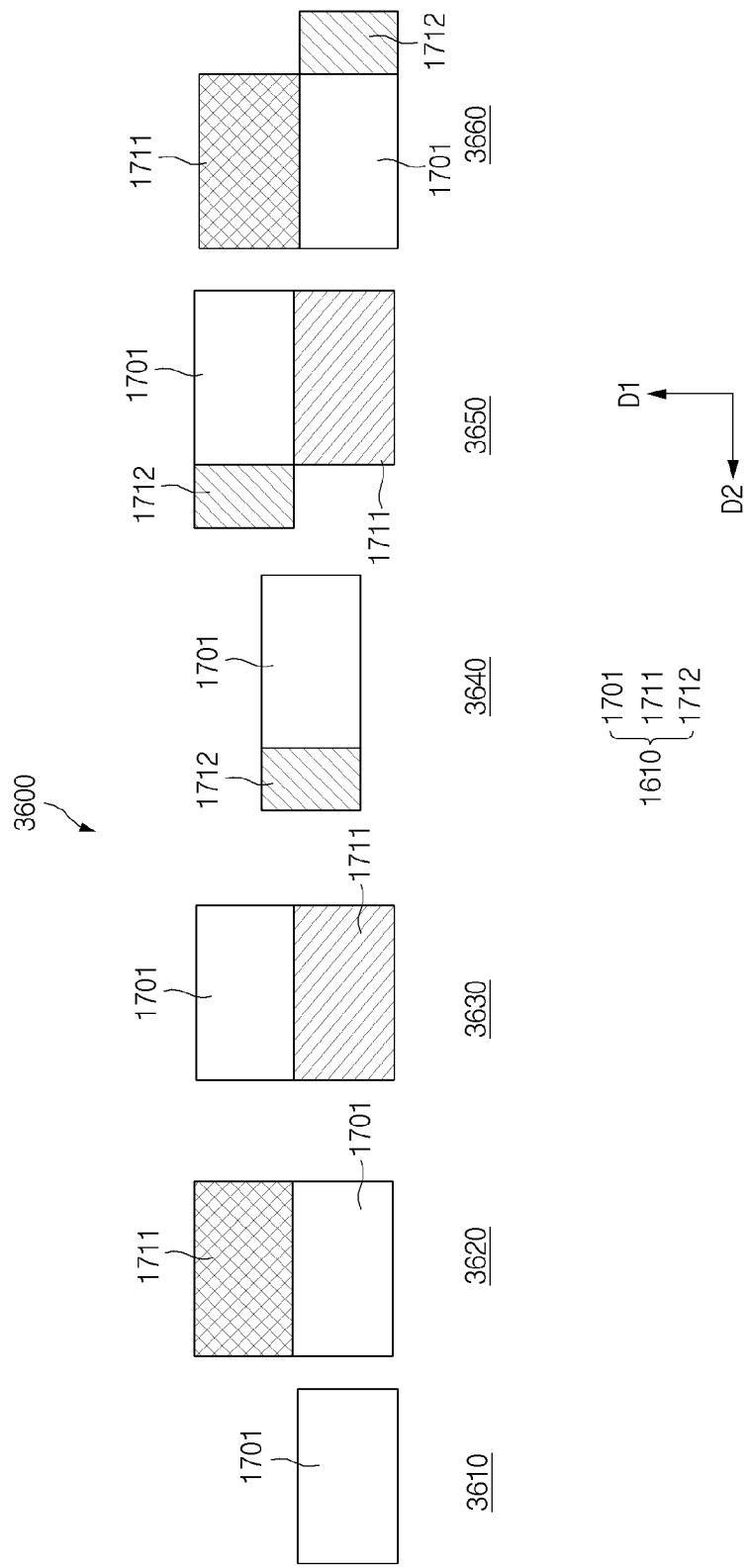
FIG. 36 is a view illustrating a plurality of usage situations in which a first sub-region and/or a second sub-region of a display is extended and used according to an embodiment of the disclosure.

FIG. 36 is a view illustrating a plurality of usage situations in which a first sub-region and/or a second sub-region of a display is extended and used according to an embodiment of the disclosure.

Referring to FIG. 36, in a view 3600, the processor (e.g., the processor 1520 of FIG. 17) may determine whether to display a screen on at least one of the first sub-region 1711 or the second sub-region 1712, based on a state of the display 1610 of the electronic device (e.g., the electronic device 1501 of FIG. 15). The processor 1520 may determine whether to display a screen on at least one of the first sub-region 1711 or the second sub-region 1712, based on whether the at least one of the first sub-region 1711 or the second sub-region 1712 of the display 1610 is exposed to the outside.

In an embodiment, the processor 1520 may set the type of screen displayed on the display 1610, based on the type of application executed in the electronic device 1501, the type of screen displayed on the main region 1701 of the display 1610, the orientation in which the display 1610 is placed, and the position in which at least one of the first sub-region 1711 or the second sub-region 1712 is placed from the main region 1701. For example, the processor 1520 may display different types of screens on the first sub-region 1711 when the first sub-region 1711 is disposed on the upper side of the main region 1701 and when the first sub-region 1711 is disposed on the lower side of the main region 1701. In another example, the processor 1520 may display different types of screens on the second sub-region 1712 when the second sub-region 1712 is disposed on the left side of the main region 1701 and when the second sub-region 1712 is disposed on the right side of the main region 1701.

In an embodiment, when the display 1610 of the electronic device 1501 is in a first state 3610 in a landscape mode, the main region 1701 may be exposed to the outside, and the first sub-region 1711 and the second sub-region 1712 may be inserted into the electronic device 1501. When the display 1610 of the electronic device 1501 is in the first state 3610, the processor 1520 may control the display driver IC (e.g., the display driver IC 1630 of FIG. 17) to display a screen on the main region 1701 of the display 1610.

In an embodiment, when the display 1610 of the electronic device 1501 is in a second state 3620 in the landscape mode, the main region 1701 and the first sub-region 1711 may be exposed to the outside, and the second sub-region 1712 may be inserted into the electronic device 1501. When the display 1610 of the electronic device 1501 is in the second state 3620 in the landscape mode, the first sub-region 1711 may extend in the first direction D1. When the display 1610 of the electronic device 1501 is in the second state 3620, the processor 1520 may control the display driver IC 1630 to display a screen on the main region 1701 and the first sub-region 1711 of the display 1610.

In an embodiment, when the display 1610 of the electronic device 1501 is changed from the first state 3610 to the second state 3620 in the landscape mode, the processor 1520 may display a screen in a high-priority display type among a plurality of display types included in a fourth display list. The fourth display list may be stored in the memory 1530 or 1633. The plurality of display types included in the fourth display list may include screen magnification, movement of video to an upper end, notification display, and an application selection menu screen.

In an embodiment, when the display 1610 of the electronic device 1501 is in an inverted second state 3630 in the landscape mode, the orientation in which the electronic device 1501 is placed may be turned upside down, compared to that in the second state 3620. When the display 1610 of the electronic device 1501 is in the inverted second state 3630 in the landscape mode, the main region 1701 and the first sub-region 1711 may be exposed to the outside, and the second sub-region 1712 may be inserted into the electronic device 1501. When the display 1610 of the electronic device 1501 is in the inverted second state 3630 in the landscape mode, the first sub-region 1711 may extend in the direction opposite to the first direction D1. When the display 1610 of the electronic device 1501 is in the inverted second state 3630 in the landscape mode, the processor 1520 may control the display driver IC 1630 to display a screen on the main region 1701 and the first sub-region 1711 of the display 1610.

In an embodiment, when the display 1610 of the electronic device 1501 is changed from the first state 3610 to the inverted second state 3630 in the landscape mode, the processor 1520 may display a screen in a high-priority display type among a plurality of display types included in a fifth display list. The fifth display list may be stored in the memory 1530 or 1633. The plurality of display types included in the fifth display list may include an input device screen, an auxiliary screen, and an application selection menu screen.

In an embodiment, when the display 1610 of the electronic device 1501 is in a third state 3640 in the landscape mode, the main region 1701 and the second sub-region 1712 may be exposed to the outside, and the first sub-region 1711 may be inserted into the electronic device 1501. When the display 1610 of the electronic device 1501 is in the third state 3640 in the landscape mode, the second sub-region 1712 may extend in the second direction D2. When the display 1610 of the electronic device 1501 is in the third state 3640, the processor 1520 may control the display driver IC 1630 to display a screen on the main region 1701 and the second sub-region 1712 of the display 1610.

In an embodiment, when the display 1610 of the electronic device 1501 is changed from the first state 3610 to the third state 3640 in the landscape mode, the processor 1520 may display a screen in a high-priority display type among a plurality of display types included in a sixth display list. The sixth display list may be stored in the memory 1530 or 1633. The plurality of display types included in the sixth display list may include screen magnification, notification display, an auxiliary screen, and an application selection menu screen.

In an embodiment, when the display 1610 of the electronic device 1501 is in a fourth state 3650 in the landscape mode, the main region 1701, the first sub-region 1711, and the second sub-region 1712 may be exposed to the outside. When the display 1610 of the electronic device 1501 is in the fourth state 3650 in the landscape mode, the first sub-region 1711 may extend in the direction opposite to the first direction D1, and the second sub-region 1712 may extend in the second direction D2. When the display 1610 of the electronic device 1501 is in the fourth state 3650, the processor 1520 may control the display driver IC 1630 to display a screen on the main region 1701, the first sub-region 1711, and the second sub-region 1712 of the display 1610.

In an embodiment, when the display 1610 of the electronic device 1501 is changed from the first state 3610 to the fourth state 3650 through the inverted second state 3630 in the landscape mode, the processor 1520 may display a screen by applying one display type among the plurality of display types included in the fifth display list and thereafter applying one display type among the plurality of display types included in the sixth display list. When the display 1610 of the electronic device 1501 is changed from the first state 3610 to the fourth state 3650 through the third state 3640 in the landscape mode, the processor 1520 may display a screen by applying one display type among the plurality of display types included in the sixth display list and thereafter applying one display type among the plurality of display types included in the fifth display list. The processor 1520 may display a screen by sequentially applying a display type included in the fifth display list and a display type included in the sixth display list such that the display type included in the fifth display list and the display type included in the sixth display list do not overlap each other.

In an embodiment, when the display 1610 of the electronic device 1501 is in an inverted fourth state 3660 in the landscape mode, the orientation in which the electronic device 1501 is placed may be turned upside down, compared to that in the fourth state 3650. When the display 1610 of the electronic device 1501 is in the inverted fourth state 3660, the main region 1701, the first sub-region 1711, and the second sub-region 1712 may be exposed to the outside. When the display 1610 of the electronic device 1501 is in the inverted fourth state 3660 in the landscape mode, the first sub-region 1711 may extend in the first direction D1, and the second sub-region 1712 may extend in the direction opposite to the second direction D2. When the display 1610 of the electronic device 1501 is in the inverted fourth state 3660, the processor 1520 may control the display driver IC 1630 to display a screen on the main region 1701, the first sub-region 1711, and the second sub-region 1712 of the display 1610.

In an embodiment, when the display 1610 of the electronic device 1501 is changed from the first state 3610 to the inverted fourth state 3660 through the second state 3620 in the landscape mode, the processor 1520 may display a screen by applying one display type among the plurality of display types included in the fourth display list and thereafter applying one display type among the plurality of display types included in the sixth display list. When the display 1610 of the electronic device 1501 is changed from the first state 3610 to the inverted fourth state 3660 through the third state 3640 in the landscape mode, the processor 1520 may display a screen by applying one display type among the plurality of display types included in the sixth display list and thereafter applying one display type among the plurality of display types included in the fourth display list. The processor 1520 may display a screen by sequentially applying a display type included in the fourth display list and a display type included in the sixth display list such that the display type included in the fourth display list and the display type included in the sixth display list do not overlap each other.

Figure 37:
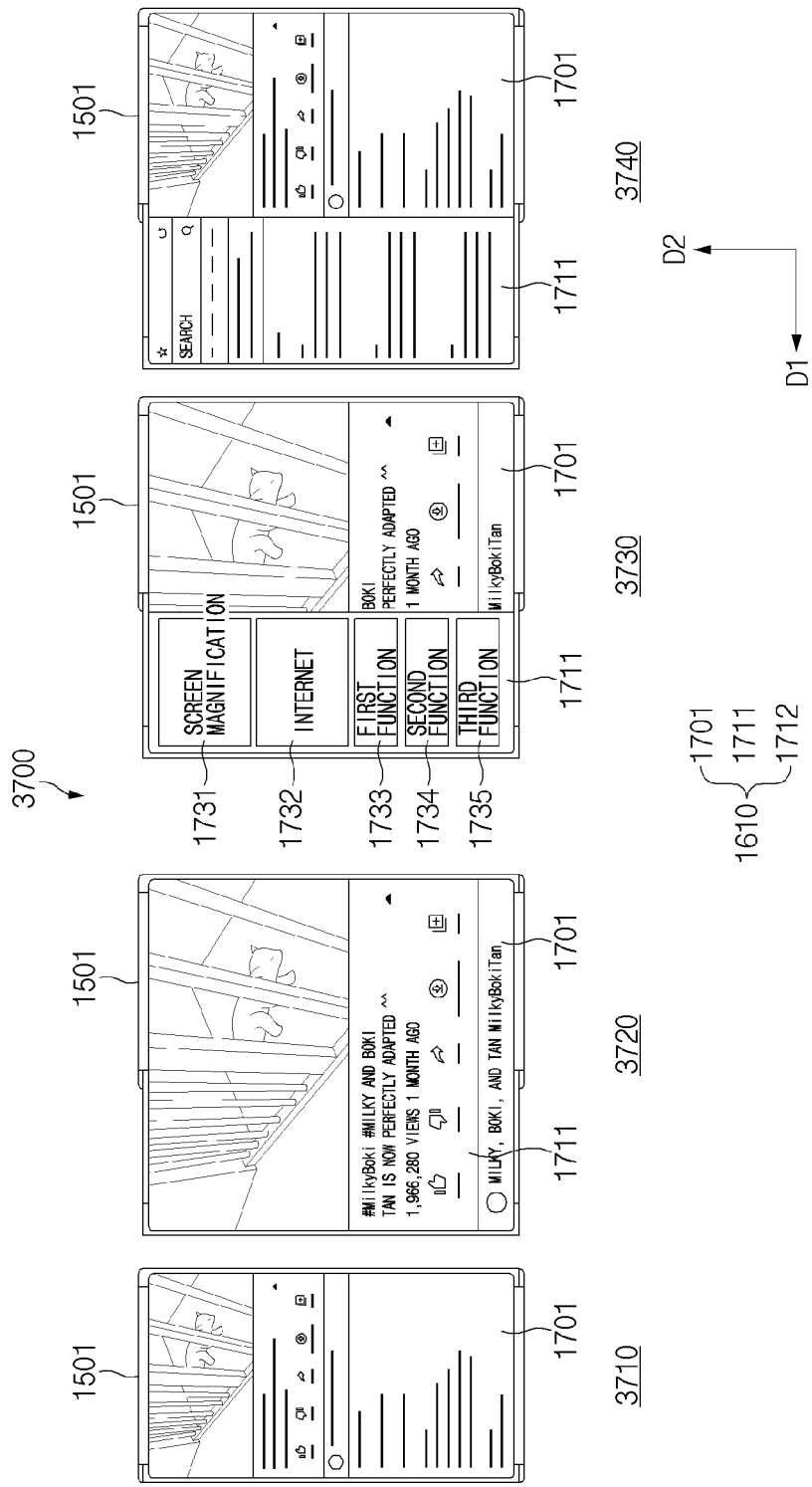
FIG. 37 is a view illustrating an operation of extending a first sub-region of a display and displaying a selected function on a first sub-region according to an embodiment of the disclosure.

FIG. 37 is a view illustrating an operation of extending a first sub-region of a display and displaying a selected function on the first sub-region according to an embodiment of the disclosure.

Referring to FIG. 37, in a view 3700, the electronic device 1501 may execute a video application. The processor (e.g., the processor 1520 of FIG. 17) may control the display driver IC (e.g., the display driver IC 1630 of FIG. 17) to display an execution screen of the video application on the display 1610, based on a state of the display 1610 of the electronic device 1501.

In an embodiment, when the display 1610 of the electronic device 1501 is in a first state 3710 in the portrait mode, the main region 1701 may be exposed to the outside, and the first sub-region 1711 and the second sub-region 1712 may be inserted into the electronic device 1501. When the display 1610 of the electronic device 1501 is in the first state 3510, the processor 1520 may control the display driver IC 1630 to display the execution screen of the video application on the main region 1701 of the display 1610.

In an embodiment, when the display 1610 of the electronic device 1501 is in a second state 3720 in the portrait mode, the main region 1701 and the first sub-region 1711 may be exposed to the outside, and the second sub-region 1712 may be inserted into the electronic device 1501. When the display 1610 of the electronic device 1501 is in the second state 3720 in the portrait mode, the first sub-region 1711 may extend in the first direction D1. When the display 1610 of the electronic device 1501 is in the second state 3720, the processor 1520 may control the display driver IC 1630 to display the execution screen of the video application on the main region 1701 and the first sub-region 1711 of the display 1610.

In an embodiment, when the display 1610 of the electronic device 1501 is changed from the first state 3710 to the second state 3720 in the portrait mode, the processor 1520 may magnify and display the execution screen of the video application. The processor 1520 may select screen magnification as the highest priority display type from the plurality of display types included in the first display list stored in the memory (e.g., the memory 1530 of FIG. 15 or the memory 1633 of FIG. 17). The processor 1520 may automatically magnify and display the execution screen of the video application depending on the screen magnification selected as the highest priority display type.

In an embodiment, when the display 1610 of the electronic device 1501 is changed from the first state 3710 to a second state 3730 in the portrait mode, the processor 1520 may display application selection menu icons 1731, 1732, 1733, 1734, and 1735 on the first sub-region 1711. The application selection menu icons 1731, 1732, 1733, 1734, and 1735 may include the screen magnification icon 1731, the Internet execution icon 1732, the first function execution icon 1733, the second function execution icon 1734, and the third function execution icon 1735. The processor 1520 may select application selection menu screen display as the highest priority display type from the plurality of display types included in the first display list stored in the memory 1530 or 1633. The processor 1520 may display the application selection menu icons 1731, 1732, 1733, 1734, and 1735 depending on the application selection menu screen display selected as the highest priority display type.

In an embodiment, in a second state 3740, the processor 1520 may control the display driver IC 1630 to display, on the first sub-region 1711, a screen corresponding to a selected selection menu icon among the displayed selection menu icons 1731, 1732, 1733, 1734, and 1735. For example, when the Internet execution icon 1732 among the displayed selection menu icons 1731, 1732, 1733, 1734, and 1735 is selected in the second state 3730, the processor 1520 may display an Internet execution screen on the first sub-region 1711 in the second state 3740.

Figure 38:
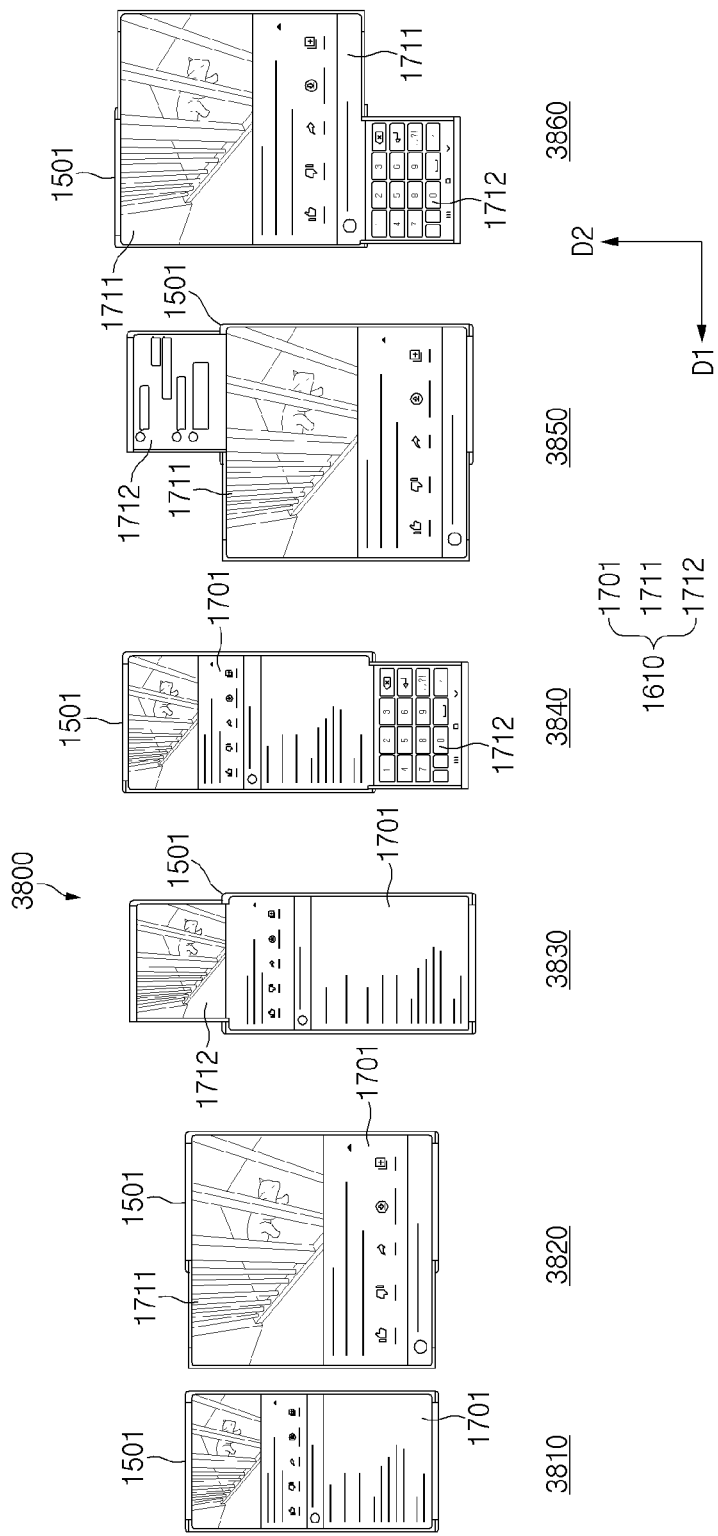
FIG. 38 is a view illustrating an operation of extending a first sub-region and/or a second sub-region of a display and displaying a screen on the display when executing a video application in an electronic device according to an embodiment of the disclosure.

FIG. 38 is a view illustrating an operation of extending a first sub-region and/or a second sub-region of a display and displaying a screen on the display when executing a video application in an electronic device according to an embodiment of the disclosure.

Referring to FIG. 38, in a view 3800, the electronic device 1501 may execute the video application. The processor (e.g., the processor 1520 of FIG. 17) may control the display driver IC (e.g., the display driver IC 1630 of FIG. 17) to display an execution screen of the video application on the display 1610, based on a state of the display 1610 of the electronic device 1501. The execution screen of the video application may include a video portion and a portion displaying explanation related to a video.

In an embodiment, when the display 1610 of the electronic device 1501 is in a first state 3810 in the portrait mode, the processor 1520 may control the display driver IC 1630 to display the execution screen of the video application on the main region 1701 of the display 1610.

In an embodiment, when the display 1610 of the electronic device 1501 is in a second state 3820 in the portrait mode, the main region 1701 and the first sub-region 1711 may be exposed to the outside, and the second sub-region 1712 may be inserted into the electronic device 1501. When the display 1610 of the electronic device 1501 is in the second state 3820 in the portrait mode, the first sub-region 1711 may extend in the first direction D1.

In an embodiment, when the display 1610 of the electronic device 1501 is in the second state 3820 in the portrait mode, the processor 1520 may uniformly magnify and display the execution screen of the video application on the main region 1701 and the first sub-region 1711 of the display 1610. The processor 1520 may magnify, adjust, and display the execution screen of the video application according to the size and ratio of a screen changed while the main region 1701 and the first sub-region 1711 are exposed to the outside. For example, the processor 1520 may magnify and display the video portion of the execution screen of the video application such that the video portion is larger than the portion displaying the explanation related to the video.

In an embodiment, when the display 1610 of the electronic device 1501 is in a third state 3830 in the portrait mode, the main region 1701 and the second sub-region 1712 may be exposed to the outside, and the first sub-region 1711 may be inserted into the electronic device 1501. When the display 1610 of the electronic device 1501 is in the third state 3830 in the portrait mode, the second sub-region 1712 may extend in the second direction D2.

In an embodiment, when the display 1610 of the electronic device 1501 is in the third state 3830 in the portrait mode, the processor 1520 may control the display driver IC 1630 to display the explanation related to the video on the main region 1701 of the display 1610 and display the video portion on the second sub-region 1712.

In an embodiment, when the display 1610 of the electronic device 1501 is in an inverted third state 3840 in the portrait mode, the orientation in which the electronic device 1501 is placed may be turned upside down, compared to that in the third state 3830. When the display 1610 of the electronic device 1501 is in the inverted third state 3840 in the portrait mode, the main region 1701 and the second sub-region 1712 may be exposed to the outside, and the first sub-region 1711 may be inserted into the electronic device 1501. When the display 1610 of the electronic device 1501 is in the inverted third state 3840, the second sub-region 1712 may extend in the direction opposite to the second direction D2.

In an embodiment, when the display 1610 of the electronic device 1501 is in the inverted third state 3840, the processor 1520 may control the display driver IC 1630 to display the execution screen of the video application on the main region 1701 of the display 1610 and display an input device screen on the second sub-region 1712. For example, when the display 1610 of the electronic device 1501 is in the inverted third state 3840, the processor 1520 may control the display driver IC 1630 to display a keyboard input device screen on the second sub-region 1712.

In an embodiment, when the display 1610 of the electronic device 1501 is in a fourth state 3850 in the portrait mode, the main region 1701, the first sub-region 1711, and the second sub-region 1712 may be exposed to the outside. When the display 1610 of the electronic device 1501 is in the fourth state 3850 in the portrait mode, the first sub-region 1711 may extend in the first direction D1, and the second sub-region 1712 may extend in the second direction D2.

In an embodiment, when the display 1610 of the electronic device 1501 is in the fourth state 3850, the processor 1520 may control the display driver IC 1630 to uniformly magnify and display the execution screen of the video application on the main region 1701 and the first sub-region 1711 of the display 1610 and display an auxiliary screen on the second sub-region 1712. For example, when the display 1610 of the electronic device 1501 is in the fourth state 3850, the processor 1520 may control the display driver IC 1630 to display a reduced execution screen of a message application on the second sub-region 1712.

In an embodiment, when the display 1610 of the electronic device 1501 is in an inverted fourth state 3860 in the portrait mode, the orientation in which the electronic device 1501 is placed may be turned upside down, compared to that in the fourth state 3850. When the display 1610 of the electronic device 1501 is in the inverted fourth state 3860, the main region 1701, the first sub-region 1711, and the second sub-region 1712 may be exposed to the outside. When the display 1610 of the electronic device 1501 is in the inverted fourth state 3860 in the portrait mode, the first sub-region 1711 may extend in the direction opposite to the first direction D1, and the second sub-region 1712 may extend in the direction opposite to the second direction D2.

In an embodiment, when the display 1610 of the electronic device 1501 is in the inverted fourth state 3860, the processor 1520 may control the display driver IC 1630 to uniformly magnify and display the execution screen of the video application on the main region 1701 and the first sub-region 1711 of the display 1610 and display the input device screen on the second sub-region 1712. For example, when the display 1610 of the electronic device 1501 is in the inverted fourth state 3860, the processor 1520 may control the display driver IC 1630 to display the keyboard input device screen on the second sub-region 1712.

Figure 39:
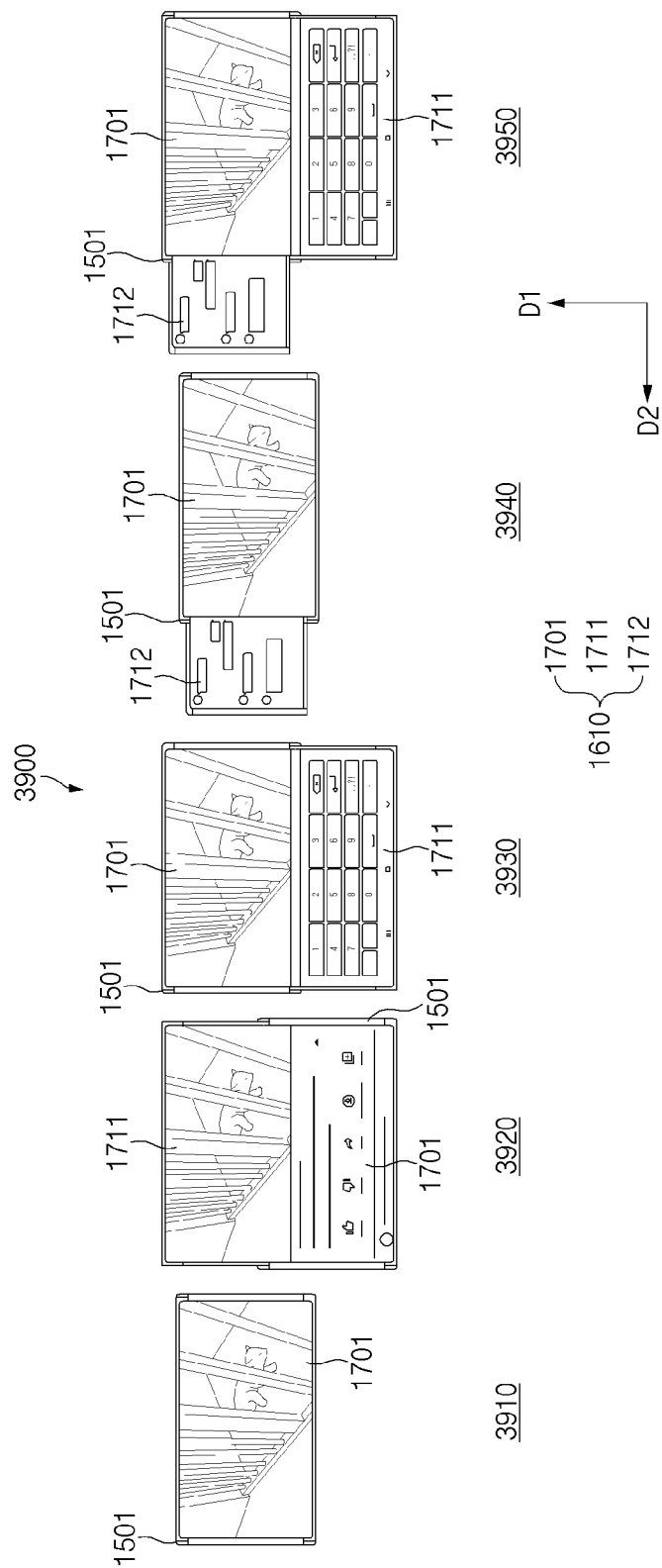
FIG. 39 is a view illustrating an operation of extending a first sub-region and/or a second sub-region of a display and displaying a screen on the display when executing a video application in an electronic device according to an embodiment of the disclosure.

FIG. 39 is a view illustrating an operation of extending a first sub-region and/or a second sub-region of a display and displaying a screen on the display when executing a video application in an electronic device according to an embodiment of the disclosure.

Referring to FIG. 39, in a view of 3900, the electronic device 1501 may execute the video application. The processor (e.g., the processor 1520 of FIG. 17) may control the display driver IC (e.g., the display driver IC 1630 of FIG. 17) to display an execution screen of the video application on the display 1610, based on a state of the display 1610 of the electronic device 1501.

In an embodiment, when the display 1610 of the electronic device 1501 is in a first state 3910 in the landscape mode, the processor 1520 may control the display driver IC 1630 to display a video portion of the execution screen of the video application as a full screen on the main region 1701 of the display 1610.

In an embodiment, when the display 1610 of the electronic device 1501 is in a second state 3920 in the landscape mode, the main region 1701 and the first sub-region 1711 may be exposed to the outside, and the second sub-region 1712 may be inserted into the electronic device 1501. When the display 1610 of the electronic device 1501 is in the second state 3920, the first sub-region 1711 may extend in the first direction D1.

In an embodiment, when the display 1610 of the electronic device 1501 is in the second state 3920 in the landscape mode, the processor 1520 may uniformly magnify and display the execution screen of the video application on the main region 1701 and the first sub-region 1711 of the display 1610. For example, the processor 1520 may display the video portion of the execution screen of the video application on the first sub-region 1711 and may display a portion displaying explanation related to a video on the main region 1701.

In an embodiment, when the display 1610 of the electronic device 1501 is in an inverted second state 3930 in the landscape mode, the main region 1701 and the first sub-region 1711 may be exposed to the outside, and the second sub-region 1712 may be inserted into the electronic device 1501. When the display 1610 of the electronic device 1501 is in the inverted second state 3930 in the landscape mode, the first sub-region 1711 may extend in the direction opposite to the first direction D1.

In an embodiment, when the display 1610 of the electronic device 1501 is in the inverted second state 3930 in the landscape mode, the processor 1520 may control the display driver IC 1630 to display the video portion on the main region 1701 of the display 1610 and display an input device screen on the first sub-region 1711. For example, when the display 1610 of the electronic device 1501 is in the inverted second state 3930 in the landscape mode, the processor 1520 may control the display driver IC 1630 to display a keyboard input device screen on the first sub-region 1711.

In an embodiment, when the display 1610 of the electronic device 1501 is in a third state 3940 in the landscape mode, the main region 1701 and the second sub-region 1712 may be exposed to the outside, and the first sub-region 1711 may be inserted into the electronic device 1501. When the display 1610 of the electronic device 1501 is in the third state 3940, the second sub-region 1712 may extend in the second direction D2.

In an embodiment, when the display 1610 of the electronic device 1501 is in the third state 3940, the processor 1520 may control the display driver IC 1630 to display the video portion of the execution screen of the video application on the main region 1701 of the display 1610 and display an auxiliary screen on the second sub-region 1712. For example, when the display 1610 of the electronic device 1501 is in the third state 3940, the processor 1520 may control the display driver IC 1630 to display a reduced execution screen of a message application on the second sub-region 1712.

In an embodiment, when the display 1610 of the electronic device 1501 is in a fourth state 3950 in the landscape mode, the main region 1701, the first sub-region 1711, and the second sub-region 1712 may be exposed to the outside. When the display 1610 of the electronic device 1501 is in the fourth state 3850 in the landscape mode, the first sub-region 1711 may extend in the direction opposite to the first direction D1, and the second sub-region 1712 may extend in the second direction D2.

In an embodiment, when the display 1610 of the electronic device 1501 is in the fourth state 3950 in the landscape mode, the processor 1520 may control the display driver IC 1630 to display the video portion of the execution screen of the video application on the main region 1701 of the display 1610, display the input device screen on the first sub-region 1711, and display the auxiliary screen on the second sub-region 1712.

Figure 40:
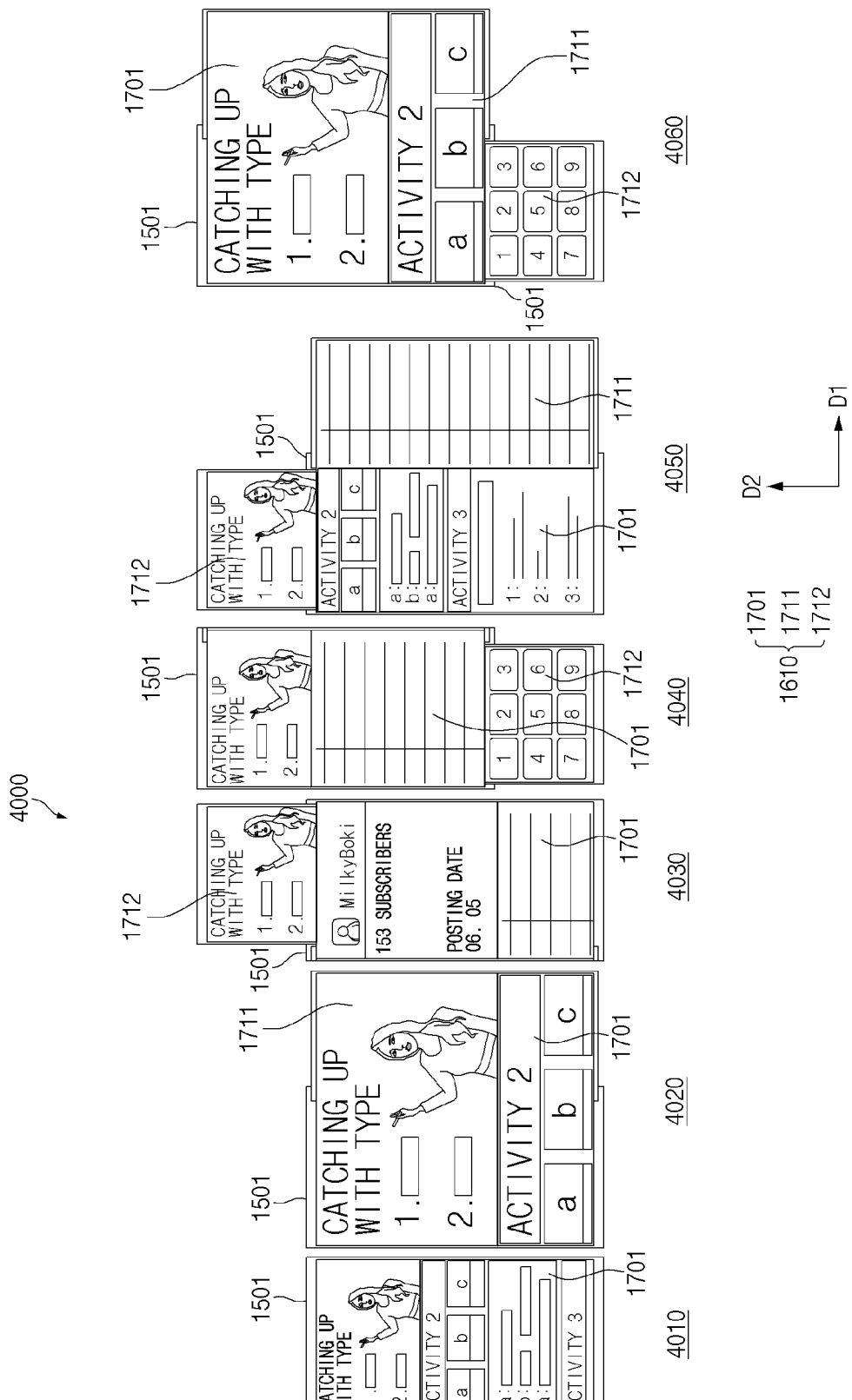
FIG. 40 is a view illustrating an operation of extending a first sub-region and/or a second sub-region of a display and displaying a screen on the display when executing a video lecture application in an electronic device according to an embodiment of the disclosure.

FIG. 40 is a view illustrating an operation of extending a first sub-region and/or a second sub-region of a display and displaying a screen on a display when executing a video lecture application in an electronic device according to an embodiment of the disclosure.

Referring to FIG. 40, in a view 4000, the electronic device 1501 may execute the video lecture application. The processor (e.g., the processor 1520 of FIG. 17) may control the display driver IC (e.g., the display driver IC 1630 of FIG. 17) to display an execution screen of the video lecture application on the display 1610, based on a state of the display 1610 of the electronic device 1501.

In an embodiment, when the display 1610 of the electronic device 1501 is in a first state 4010 in the portrait mode, the processor 1520 may control the display driver IC 1630 to display the execution screen of the video lecture application on the main region 1701 of the display 1610. The execution screen of the video lecture application may include a video lecture portion, a portion displaying the title of a lecture, and a portion displaying contents of the lecture.

In an embodiment, when the display 1610 of the electronic device 1501 is in a second state 4020 in the portrait mode, the main region 1701 and the first sub-region 1711 may be exposed to the outside, and the second sub-region 1712 may be inserted into the electronic device 1501. When the display 1610 of the electronic device 1501 is in the second state 4020 in the portrait mode, the first sub-region 1711 may extend in the first direction D1.

In an embodiment, when the display 1610 of the electronic device 1501 is in the second state 4020 in the portrait mode, the processor 1520 may uniformly magnify and display the execution screen of the video lecture application on the main region 1701 and the first sub-region 1711 of the display 1610. The processor 1520 may magnify, adjust, and display the execution screen of the video lecture application according to the size and ratio of a screen changed while the main region 1701 and the first sub-region 1711 are exposed to the outside. For example, the processor 1520 may magnify and display the video lecture portion of the execution screen of the video lecture application such that the video lecture portion is larger than the portion displaying the title of the lecture and the portion displaying the contents of the lecture.

In an embodiment, when the display 1610 of the electronic device 1501 is in a third state 4030 in the portrait mode, the main region 1701 and the second sub-region 1712 may be exposed to the outside, and the first sub-region 1711 may be inserted into the electronic device 1501. When the display 1610 of the electronic device 1501 is in the third state 4030 in the portrait mode, the second sub-region 1712 may extend in the second direction D2.

In an embodiment, when the display 1610 of the electronic device 1501 is in the third state 4030 in the portrait mode, the processor 1520 may control the display driver IC 1630 to display the portion displaying the title of the lecture, the portion displaying the contents of the lecture, and a memo screen on the main region 1701 of the display 1610 and display the video lecture portion on the second sub-region 1712. The memo screen may be a screen on which memos related to the lecture are written.

In an embodiment, when the display 1610 of the electronic device 1501 is in an inverted third state 4040 in the portrait mode, the orientation in which the electronic device 1501 is placed may be turned upside down, compared to that in the third state 4030. When the display 1610 of the electronic device 1501 is in the inverted third state 4040 in the portrait mode, the main region 1701 and the second sub-region 1712 may be exposed to the outside, and the first sub-region 1711 may be inserted into the electronic device 1501. When the display 1610 of the electronic device 1501 is in the inverted third state 4040, the second sub-region 1712 may extend in the direction opposite to the second direction D2.

In an embodiment, when the display 1610 of the electronic device 1501 is in the inverted third state 4040, the processor 1520 may control the display driver IC 1630 to display a video lecture screen and the memo screen on the main region 1701 of the display 1610 and display an input device screen on the second sub-region 1712. For example, when the display 1610 of the electronic device 1501 is in the inverted third state 4040, the processor 1520 may control the display driver IC 1630 to display a keyboard input device screen on the second sub-region 1712.

In an embodiment, when the display 1610 of the electronic device 1501 is in a fourth state 4050 in the portrait mode, the main region 1701, the first sub-region 1711, and the second sub-region 1712 may be exposed to the outside. When the display 1610 of the electronic device 1501 is in the fourth state 4050 in the portrait mode, the first sub-region 1711 may extend in the first direction D1, and the second sub-region 1712 may extend in the second direction D2.

In an embodiment, when the display 1610 of the electronic device 1501 is in the fourth state 4050, the processor 1520 may control the display driver IC 1630 to display the portion displaying the title of the lecture and the portion displaying the contents of the lecture on the main region 1701 of the display 1610, display the memo screen on the first sub-region 1711, and display the video lecture screen on the second sub-region 1712.

In an embodiment, when the display 1610 of the electronic device 1501 is in an inverted fourth state 4060 in the portrait mode, the orientation in which the electronic device 1501 is placed may be turned upside down, compared to that in the fourth state 4050. When the display 1610 of the electronic device 1501 is in the inverted fourth state 4060, the main region 1701, the first sub-region 1711, and the second sub-region 1712 may be exposed to the outside. When the display 1610 of the electronic device 1501 is in the inverted fourth state 4060 in the portrait mode, the first sub-region 1711 may extend in the first direction D1, and the second sub-region 1712 may extend in the direction opposite to the second direction D2.

In an embodiment, when the display 1610 of the electronic device 1501 is in the inverted fourth state 4060, the processor 1520 may control the display driver IC 1630 to uniformly magnify and display the execution screen of the video lecture application on the main region 1701 and the first sub-region 1711 of the display 1610 and display the input device screen on the second sub-region 1712. For example, when the display 1610 of the electronic device 1501 is in the inverted fourth state 4060, the processor 1520 may control the display driver IC 1630 to display the keyboard input device screen on the second sub-region 1712.

Figure 41:
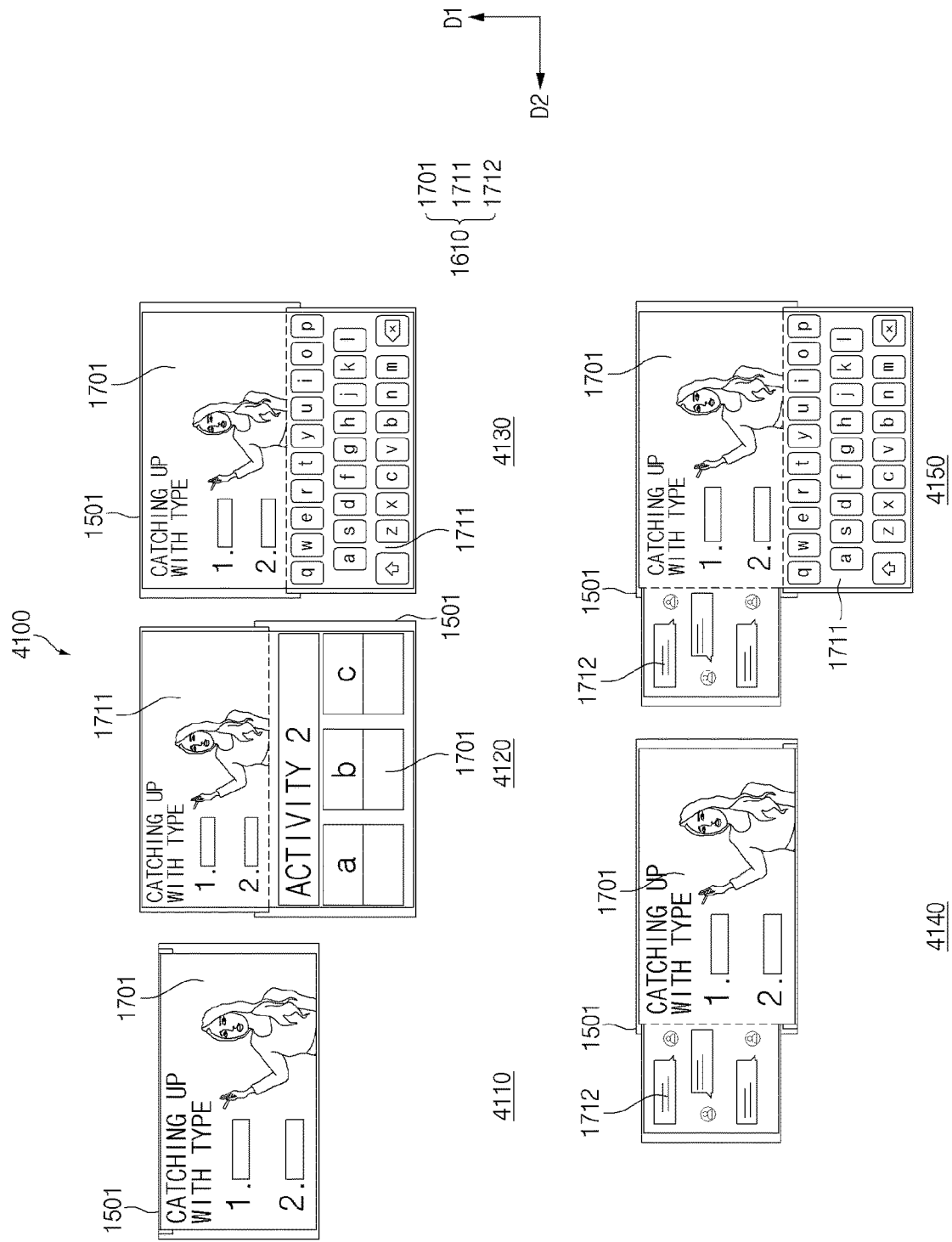
FIG. 41 is a view illustrating an operation of extending a first sub-region and/or a second sub-region of a display and displaying a screen on the display when executing a video lecture application in an electronic device according to an embodiment of the disclosure.

FIG. 41 is a view illustrating an operation of extending a first sub-region and/or a second sub-region of a display and displaying a screen on the display when executing a video lecture application in an electronic device according to an embodiment of the disclosure.

Referring to FIG. 41, in a view 4100, the electronic device 1501 may execute the video lecture application. The processor (e.g., the processor 1520 of FIG. 17) may control the display driver IC (e.g., the display driver IC 1630 of FIG. 17) to display an execution screen of the video lecture application on the display 1610, based on a state of the display 1610 of the electronic device 1501.

In an embodiment, when the display 1610 of the electronic device 1501 is in a first state 4110 in the landscape mode, the processor 1520 may control the display driver IC 1630 to display a video lecture portion of the execution screen of the video lecture application as a full screen on the main region 1701 of the display 1610.

In an embodiment, when the display 1610 of the electronic device 1501 is in a second state 4120 in the landscape mode, the main region 1701 and the first sub-region 1711 may be exposed to the outside, and the second sub-region 1712 may be inserted into the electronic device 1501. When the display 1610 of the electronic device 1501 is in the second state 4120, the first sub-region 1711 may extend in the first direction D1.

In an embodiment, when the display 1610 of the electronic device 1501 is in the second state 4120 in the landscape mode, the processor 1520 may display a portion displaying the title of a lecture and a portion displaying contents of the lecture of the execution screen of the video lecture application on the main region 1701 of the display 1610 and may display the video lecture portion on the first sub-region 1711.

In an embodiment, when the display 1610 of the electronic device 1501 is in an inverted second state 4130 in the landscape mode, the main region 1701 and the first sub-region 1711 may be exposed to the outside, and the second sub-region 1712 may be inserted into the electronic device 1501. When the display 1610 of the electronic device 1501 is in the inverted second state 4130 in the landscape mode, the first sub-region 1711 may extend in the direction opposite to the first direction D1.

In an embodiment, when the display 1610 of the electronic device 1501 is in the inverted second state 4130 in the landscape mode, the processor 1520 may control the display driver IC 1630 to display the video portion on the main region 1701 of the display 1610 and display an input device screen on the first sub-region 1711. For example, when the display 1610 of the electronic device 1501 is in the inverted second state 4130 in the landscape mode, the processor 1520 may control the display driver IC 1630 to display a keyboard input device screen on the first sub-region 1711.

In an embodiment, when the display 1610 of the electronic device 1501 is in a third state 4140 in the landscape mode, the main region 1701 and the second sub-region 1712 may be exposed to the outside, and the first sub-region 1711 may be inserted into the electronic device 1501. When the display 1610 of the electronic device 1501 is in the third state 4140, the second sub-region 1712 may extend in the second direction D2.

In an embodiment, when the display 1610 of the electronic device 1501 is in the third state 4140, the processor 1520 may control the display driver IC 1630 to display the video lecture portion of the execution screen of the video lecture application on the main region 1701 of the display 1610 and display an auxiliary screen on the second sub-region 1712. For example, when the display 1610 of the electronic device 1501 is in the third state 4140, the processor 1520 may control the display driver IC 1630 to display a reduced execution screen of a message application on the second sub-region 1712.

In an embodiment, when the display 1610 of the electronic device 1501 is in a fourth state 4150 in the landscape mode, the main region 1701, the first sub-region 1711, and the second sub-region 1712 may be exposed to the outside. When the display 1610 of the electronic device 1501 is in the fourth state 4150 in the landscape mode, the first sub-region 1711 may extend in the direction opposite to the first direction D1, and the second sub-region 1712 may extend in the second direction D2.

In an embodiment, when the display 1610 of the electronic device 1501 is in the fourth state 4150 in the landscape mode, the processor 1520 may control the display driver IC 1630 to display the video lecture portion of the execution screen of the video lecture application on the main region 1701 of the display 1610, display the input device screen on the first sub-region 1711, and display the auxiliary screen on the second sub-region 1712.

Figure 42:
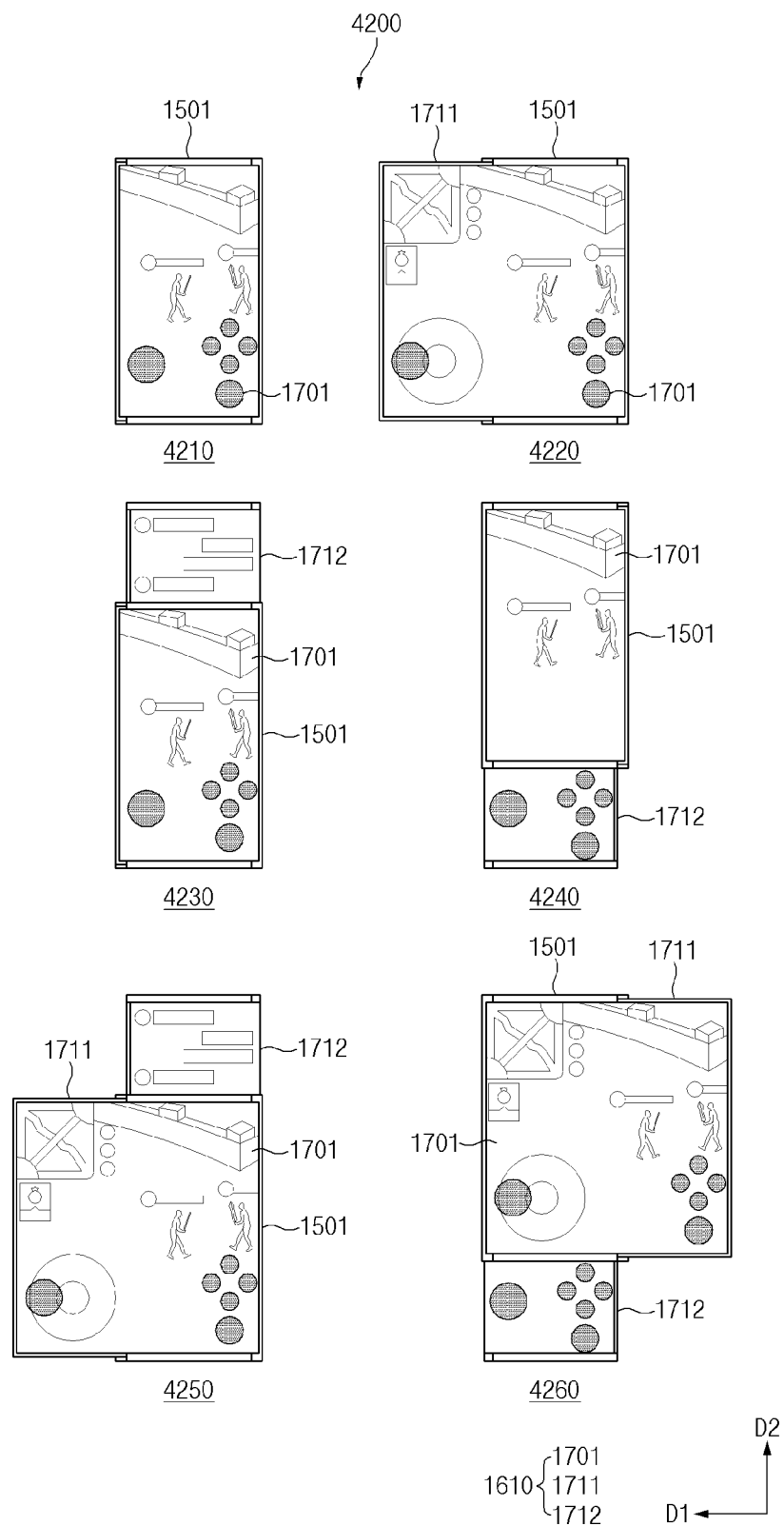
FIG. 42 is a view illustrating an operation of extending a first sub-region and/or a second sub-region of a display and displaying a screen on the display when executing a game application in an electronic device according to an embodiment of the disclosure.

FIG. 42 is a view illustrating an operation of extending a first sub-region and/or a second sub-region of a display and displaying a screen on the display when executing a game application in an electronic device according to an embodiment of the disclosure.

Referring to FIG. 42, in a view 4200, the electronic device 1501 may execute the game application. The processor (e.g., the processor 1520 of FIG. 17) may control the display driver IC (e.g., the display driver IC 1630 of FIG. 17) to display an execution screen of the game application on the display 1610, based on a state of the display 1610 of the electronic device 1501.

In an embodiment, when the display 1610 of the electronic device 1501 is in a first state 4210 in the portrait mode, the processor 1520 may control the display driver IC 1630 to display the execution screen of the game application on the main region 1701 of the display 1610. The execution screen of the game application may include a game screen and an input device screen. For example, the input device screen of the game application may include a manipulation interface through which a user manipulates a game.

In an embodiment, when the display 1610 of the electronic device 1501 is in a second state 4220 in the portrait mode, the main region 1701 and the first sub-region 1711 may be exposed to the outside, and the second sub-region 1712 may be inserted into the electronic device 1501. When the display 1610 of the electronic device 1501 is in the second state 4220 in the portrait mode, the first sub-region 1711 may extend in the first direction D1.

In an embodiment, when the display 1610 of the electronic device 1501 is in the second state 4220 in the portrait mode, the processor 1520 may uniformly adjust and display the execution screen of the game application on the main region 1701 and the first sub-region 1711 of the display 1610. The processor 1520 may adjust and display the execution screen of the game application according to the size and ratio of a screen changed while the main region 1701 and the first sub-region 1711 are exposed to the outside. For example, the processor 1520 may adjust and display the execution screen of the game application such that the game screen represents a wider region and information related to the game on the execution screen of the game application.

In an embodiment, when the display 1610 of the electronic device 1501 is in a third state 4230 in the portrait mode, the main region 1701 and the second sub-region 1712 may be exposed to the outside, and the first sub-region 1711 may be inserted into the electronic device 1501. When the display 1610 of the electronic device 1501 is in the third state 4230 in the portrait mode, the second sub-region 1712 may extend in the second direction D2.

In an embodiment, when the display 1610 of the electronic device 1501 is in the third state 4230 in the portrait mode, the processor 1520 may control the display driver IC 1630 to display the execution screen of the game application on the main region 1701 of the display 1610 and display an auxiliary screen on the second sub-region 1712. For example, when the display 1610 of the electronic device 1501 is in the third state 4230, the processor 1520 may control the display driver IC 1630 to display a reduced execution screen of a message application on the second sub-region 1712.

In an embodiment, when the display 1610 of the electronic device 1501 is in an inverted third state 4240 in the portrait mode, the orientation in which the electronic device 1501 is placed may be turned upside down, compared to that in the third state 4230. When the display 1610 of the electronic device 1501 is in the inverted third state 4240 in the portrait mode, the main region 1701 and the second sub-region 1712 may be exposed to the outside, and the first sub-region 1711 may be inserted into the electronic device 1501. When the display 1610 of the electronic device 1501 is in the inverted third state 4240, the second sub-region 1712 may extend in the direction opposite to the second direction D2.

In an embodiment, when the display 1610 of the electronic device 1501 is in the inverted third state 4240, the processor 1520 may control the display driver IC 1630 to display the game screen on the main region 1701 of the display 1610 and display the input device screen on the second sub-region 1712. For example, when the display 1610 of the electronic device 1501 is in the inverted third state 4240, the processor 1520 may control the display driver IC 1630 to display the manipulation interface on the second sub-region 1712.

In an embodiment, when the display 1610 of the electronic device 1501 is in a fourth state 4250 in the portrait mode, the main region 1701, the first sub-region 1711, and the second sub-region 1712 may be exposed to the outside. When the display 1610 of the electronic device 1501 is in the fourth state 4250 in the portrait mode, the first sub-region 1711 may extend in the first direction D1, and the second sub-region 1712 may extend in the second direction D2.

In an embodiment, when the display 1610 of the electronic device 1501 is in the fourth state 4250, the processor 1520 may control the display driver IC 1630 to adjust and display the execution screen of the game application on the main region 1701 and the first sub-region 1711 of the display 1610 and display the auxiliary screen on the second sub-region 1712.

In an embodiment, when the display 1610 of the electronic device 1501 is in an inverted fourth state 4260 in the portrait mode, the orientation in which the electronic device 1501 is placed may be turned upside down, compared to that in the fourth state 4250. When the display 1610 of the electronic device 1501 is in the inverted fourth state 4260, the main region 1701, the first sub-region 1711, and the second sub-region 1712 may be exposed to the outside. When the display 1610 of the electronic device 1501 is in the inverted fourth state 4260 in the portrait mode, the first sub-region 1711 may extend in the first direction D1, and the second sub-region 1712 may extend in the direction opposite to the second direction D2.

In an embodiment, when the display 1610 of the electronic device 1501 is in the inverted fourth state 4260, the processor 1520 may control the display driver IC 1630 to adjust and display the execution screen of the game application on the main region 1701 and the first sub-region 1711 of the display 1610 and display the input device screen on the second sub-region 1712. For example, when the display 1610 of the electronic device 1501 is in the inverted fourth state 4260, the processor 1520 may control the display driver IC 1630 to display the manipulation interface on the second sub-region 1712.

Figure 43:
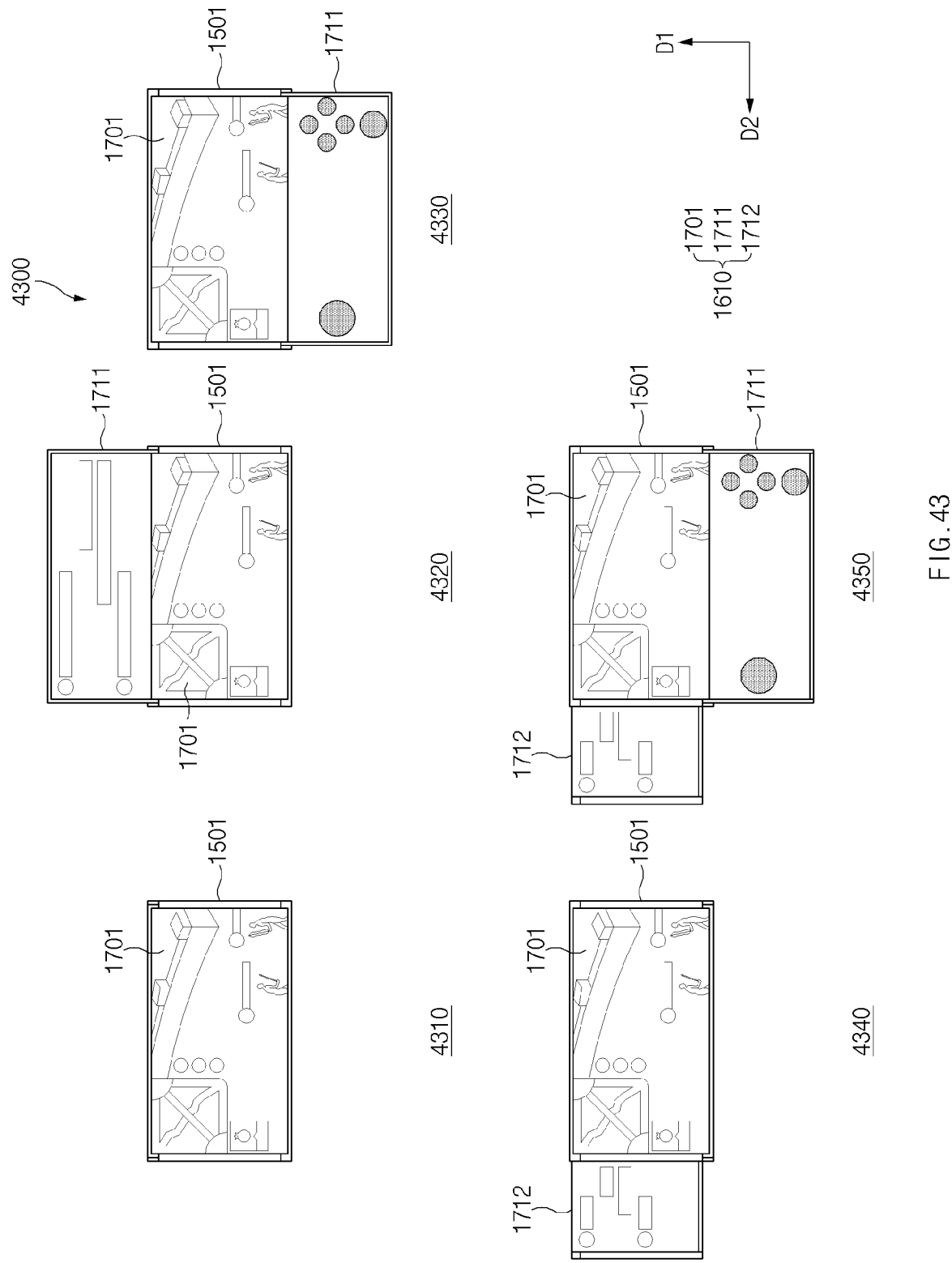
FIG. 43 is a view illustrating an operation of extending a first sub-region and/or a second sub-region of a display and displaying a screen on the display when executing a game application in an electronic device according to an embodiment of the disclosure.

FIG. 43 is a view illustrating an operation of extending a first sub-region and/or a second sub-region of a display and displaying a screen on the display when executing a game application in an electronic device according to an embodiment of the disclosure.

Referring to FIG. 43, in a view of 4300, the electronic device 1501 may execute the game application. The processor (e.g., the processor 1520 of FIG. 17) may control the display driver IC (e.g., the display driver IC 1630 of FIG. 17) to display an execution screen of the game application on the display 1610, based on a state of the display 1610 of the electronic device 1501.

In an embodiment, when the display 1610 of the electronic device 1501 is in a first state 4310 in the landscape mode, the processor 1520 may control the display driver IC 1630 to display a game screen of the execution screen of the game application as a full screen on the main region 1701 of the display 1610.

In an embodiment, when the display 1610 of the electronic device 1501 is in a second state 4320 in the landscape mode, the main region 1701 and the first sub-region 1711 may be exposed to the outside, and the second sub-region 1712 may be inserted into the electronic device 1501. When the display 1610 of the electronic device 1501 is in the second state 4320, the first sub-region 1711 may extend in the first direction D1.

In an embodiment, when the display 1610 of the electronic device 1501 is in the second state 4320 in the landscape mode, the processor 1520 may display the execution screen of the game application on the main region 1701 of the display 1610 and may display an auxiliary screen on the first sub-region 1711. For example, when the display 1610 of the electronic device 1501 is in the second state 4320, the processor 1520 may control the display driver IC 1630 to display a reduced execution screen of a message application on the first sub-region 1711.

In an embodiment, when the display 1610 of the electronic device 1501 is in an inverted second state 4330 in the landscape mode, the main region 1701 and the first sub-region 1711 may be exposed to the outside, and the second sub-region 1712 may be inserted into the electronic device 1501. When the display 1610 of the electronic device 1501 is in the inverted second state 4330 in the landscape mode, the first sub-region 1711 may extend in the direction opposite to the first direction D1.

In an embodiment, when the display 1610 of the electronic device 1501 is in the inverted second state 4330 in the landscape mode, the processor 1520 may control the display driver IC 1630 to display the game screen on the main region 1701 of the display 1610 and display an input device screen on the first sub-region 1711. For example, when the display 1610 of the electronic device 1501 is in the inverted second state 4330 in the landscape mode, the processor 1520 may control the display driver IC 1630 to display a manipulation interface on the first sub-region 1711.

In an embodiment, when the display 1610 of the electronic device 1501 is in a third state 4340 in the landscape mode, the main region 1701 and the second sub-region 1712 may be exposed to the outside, and the first sub-region 1711 may be inserted into the electronic device 1501. When the display 1610 of the electronic device 1501 is in the third state 4340, the second sub-region 1712 may extend in the second direction D2.

In an embodiment, when the display 1610 of the electronic device 1501 is in the third state 4340, the processor 1520 may control the display driver IC 1630 to display the game screen on the main region 1701 of the display 1610 and display the auxiliary screen on the second sub-region 1712. For example, when the display 1610 of the electronic device 1501 is in the third state 4340, the processor 1520 may control the display driver IC 1630 to display a reduced execution screen of a message application on the second sub-region 1712.

In an embodiment, when the display 1610 of the electronic device 1501 is in a fourth state 4350 in the landscape mode, the main region 1701, the first sub-region 1711, and the second sub-region 1712 may be exposed to the outside. When the display 1610 of the electronic device 1501 is in the fourth state 4350 in the landscape mode, the first sub-region 1711 may extend in the direction opposite to the first direction D1, and the second sub-region 1712 may extend in the second direction D2.

In an embodiment, when the display 1610 of the electronic device 1501 is in the fourth state 4350 in the landscape mode, the processor 1520 may control the display driver IC 1630 to display the game screen on the main region 1701 of the display 1610, display the input device screen on the first sub-region 1711, and display the auxiliary screen on the second sub-region 1712.

Figure 44:
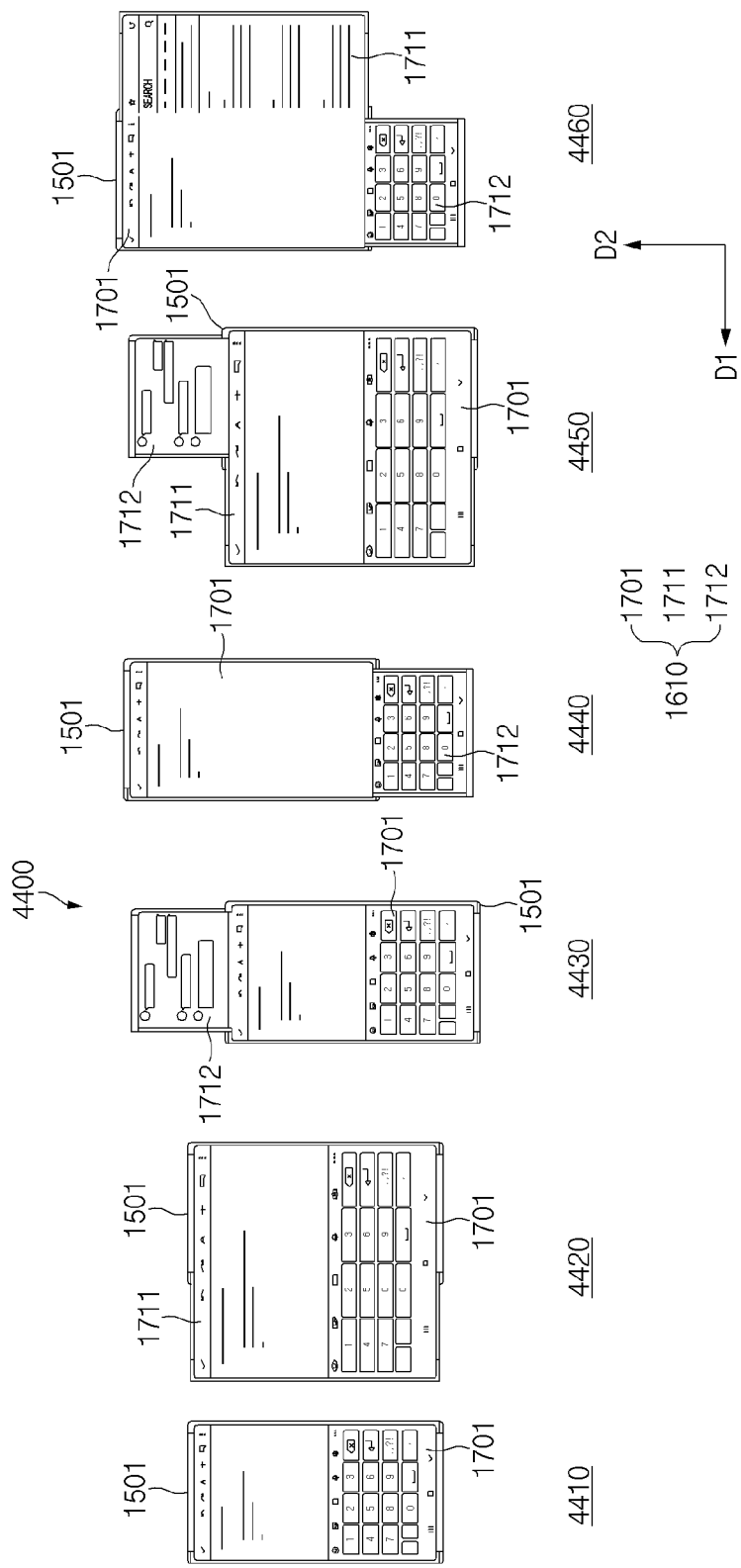
FIG. 44 is a view illustrating an operation of extending a first sub-region and/or a second sub-region of a display and displaying a screen on the display when executing a document application in an electronic device according to an embodiment of the disclosure.

FIG. 44 is a view illustrating an operation of extending a first sub-region and/or a second sub-region of a display and displaying a screen on the display when executing a document application in an electronic device according to an embodiment of the disclosure.

Referring to FIG. 44, in a view 4400, the electronic device 1501 may execute the document application. The processor (e.g., the processor 1520 of FIG. 17) may control the display driver IC (e.g., the display driver IC 1630 of FIG. 17) to display an execution screen of the document application on the display 1610, based on a state of the display 1610 of the electronic device 1501.

In an embodiment, when the display 1610 of the electronic device 1501 is in a first state 4410 in the portrait mode, the processor 1520 may control the display driver IC 1630 to display the execution screen of the document application on the main region 1701 of the display 1610. The execution screen of the document application may include a word processing portion and an input device screen. For example, the input device screen may be a keyboard input device screen.

In an embodiment, when the display 1610 of the electronic device 1501 is in a second state 4420 in the portrait mode, the main region 1701 and the first sub-region 1711 may be exposed to the outside, and the second sub-region 1712 may be inserted into the electronic device 1501. When the display 1610 of the electronic device 1501 is in the second state 4420 in the portrait mode, the first sub-region 1711 may extend in the first direction D1.

In an embodiment, when the display 1610 of the electronic device 1501 is in the second state 4420 in the portrait mode, the processor 1520 may uniformly magnify and display the execution screen of the document application on the main region 1701 and the first sub-region 1711 of the display 1610. The processor 1520 may magnify, adjust, and display the execution screen of the document application according to the size and ratio of a screen changed while the main region 1701 and the first sub-region 1711 are exposed to the outside. For example, the processor 1520 may magnify and display the execution screen of the document application in the first direction D1.

In an embodiment, when the display 1610 of the electronic device 1501 is in a third state 4430 in the portrait mode, the main region 1701 and the second sub-region 1712 may be exposed to the outside, and the first sub-region 1711 may be inserted into the electronic device 1501. When the display 1610 of the electronic device 1501 is in the third state 4430 in the portrait mode, the second sub-region 1712 may extend in the second direction D2.

In an embodiment, when the display 1610 of the electronic device 1501 is in the third state 4430 in the portrait mode, the processor 1520 may control the display driver IC 1630 to display the execution screen of the document application on the main region 1701 of the display 1610 and display an auxiliary screen on the second sub-region 1712. For example, the auxiliary screen may be a reduced screen of a message application.

In an embodiment, when the display 1610 of the electronic device 1501 is in an inverted third state 4440 in the portrait mode, the orientation in which the electronic device 1501 is placed may be turned upside down, compared to that in the third state 4430. When the display 1610 of the electronic device 1501 is in the inverted third state 4440 in the portrait mode, the main region 1701 and the second sub-region 1712 may be exposed to the outside, and the first sub-region 1711 may be inserted into the electronic device 1501. When the display 1610 of the electronic device 1501 is in the inverted third state 4440, the second sub-region 1712 may extend in the direction opposite to the second direction D2.

In an embodiment, when the display 1610 of the electronic device 1501 is in the inverted third state 4440, the processor 1520 may control the display driver IC 1630 to display the word processing portion on the main region 1701 of the display 1610 and display the input device screen on the second sub-region 1712. For example, when the display 1610 of the electronic device 1501 is in the inverted third state 4440, the processor 1520 may control the display driver IC 1630 to move the keyboard input device screen to the second sub-region 1712 and display the keyboard input device screen on the second sub-region 1712.

In an embodiment, when the display 1610 of the electronic device 1501 is in a fourth state 4450 in the portrait mode, the main region 1701, the first sub-region 1711, and the second sub-region 1712 may be exposed to the outside. When the display 1610 of the electronic device 1501 is in the fourth state 4450 in the portrait mode, the first sub-region 1711 may extend in the first direction D1, and the second sub-region 1712 may extend in the second direction D2.

In an embodiment, when the display 1610 of the electronic device 1501 is in the fourth state 4450, the processor 1520 may control the display driver IC 1630 to uniformly magnify and display the execution screen of the document application on the main region 1701 and the first sub-region 1711 of the display 1610 and display the auxiliary screen on the second sub-region 1712.

In an embodiment, when the display 1610 of the electronic device 1501 is in an inverted fourth state 4460 in the portrait mode, the orientation in which the electronic device 1501 is placed may be turned upside down, compared to that in the fourth state 4450. When the display 1610 of the electronic device 1501 is in the inverted fourth state 4460, the main region 1701, the first sub-region 1711, and the second sub-region 1712 may be exposed to the outside. When the display 1610 of the electronic device 1501 is in the inverted fourth state 4460 in the portrait mode, the first sub-region 1711 may extend in the first direction D1, and the second sub-region 1712 may extend in the direction opposite to the second direction D2.

In an embodiment, when the display 1610 of the electronic device 1501 is in the inverted fourth state 4460, the processor 1520 may control the display driver IC 1630 to display the word processing portion on the main region 1701 of the display 1610, display the auxiliary screen on the first sub-region 1711, and display the input device screen on the second sub-region 1712. For example, when the display 1610 of the electronic device 1501 is in the inverted fourth state 4460, the processor 1520 may control the display driver IC 1630 to display an Internet search screen on the first sub-region 1711 and display the keyboard input device screen on the second sub-region 1712.

Figure 45:
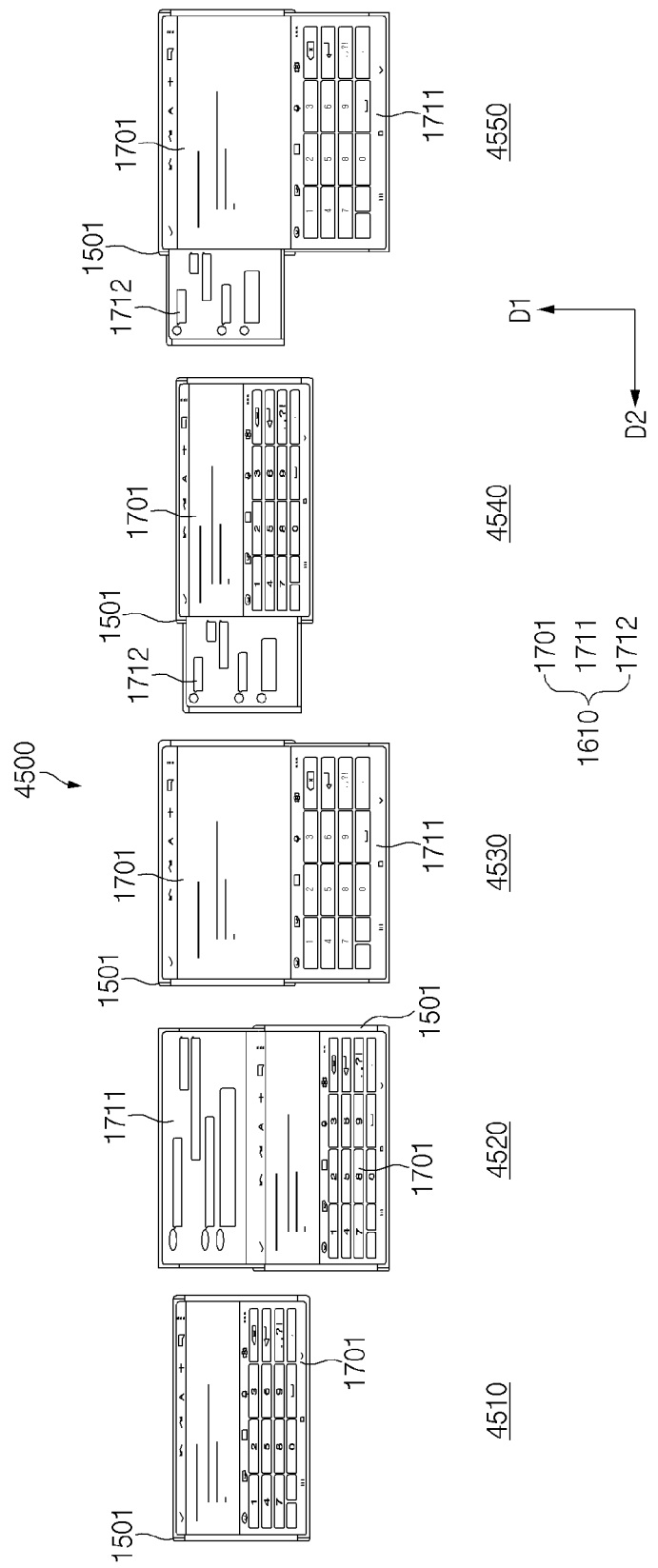
FIG. 45 is a view illustrating an operation of extending a first sub-region and/or a second sub-region of a display and displaying a screen on the display when executing a document application in an electronic device according to an embodiment of the disclosure.

FIG. 45 is a view illustrating an operation of extending an first sub-region and/or a second sub-region of a display and displaying a screen on the display when executing a document application in an electronic device according to an embodiment of the disclosure.

Referring to FIG. 45, in a view of 4500, the electronic device 1501 may execute the document application. The processor (e.g., the processor 1520 of FIG. 17) may control the display driver IC (e.g., the display driver IC 1630 of FIG. 17) to display an execution screen of the document application on the display 1610, based on a state of the display 1610 of the electronic device 1501.

In an embodiment, when the display 1610 of the electronic device 1501 is in a first state 4510 in the landscape mode, the processor 1520 may control the display driver IC 1630 to display the execution screen of the document application on the main region 1701 of the display 1610. The execution screen of the document application may include a word processing portion and an input device screen. For example, the input device screen may be a keyboard input device screen.

In an embodiment, when the display 1610 of the electronic device 1501 is in a second state 4520 in the landscape mode, the main region 1701 and the first sub-region 1711 may be exposed to the outside, and the second sub-region 1712 may be inserted into the electronic device 1501. When the display 1610 of the electronic device 1501 is in the second state 4520, the first sub-region 1711 may extend in the first direction D1.

In an embodiment, when the display 1610 of the electronic device 1501 is in the third state 4540 in the landscape mode, the processor 1520 may display the execution screen of the document application on the main region 1701 of the display 1610 and may display an auxiliary screen on the first sub-region 1711. For example, the processor 1520 may display a reduced screen of a message application on the first sub-region 1711.

In an embodiment, when the display 1610 of the electronic device 1501 is in an inverted second state 4530 in the landscape mode, the main region 1701 and the first sub-region 1711 may be exposed to the outside, and the second sub-region 1712 may be inserted into the electronic device 1501. When the display 1610 of the electronic device 1501 is in the inverted second state 4530 in the landscape mode, the first sub-region 1711 may extend in the direction opposite to the first direction D1.

In an embodiment, when the display 1610 of the electronic device 1501 is in the inverted second state 4530 in the landscape mode, the processor 1520 may control the display driver IC 1630 to display the word processing portion of the execution screen of the document application on the main region 1701 of the display 1610 and display the input device screen on the first sub-region 1711. For example, when the display 1610 of the electronic device 1501 is in the inverted second state 4530 in the landscape mode, the processor 1520 may control the display driver IC 1630 to display the keyboard input device screen on the first sub-region 1711.

In an embodiment, when the display 1610 of the electronic device 1501 is in a third state 4540 in the landscape mode, the main region 1701 and the second sub-region 1712 may be exposed to the outside, and the first sub-region 1711 may be inserted into the electronic device 1501. When the display 1610 of the electronic device 1501 is in the third state 4540, the second sub-region 1712 may extend in the second direction D2.

In an embodiment, when the display 1610 of the electronic device 1501 is in the third state 4540, the processor 1520 may control the display driver IC 1630 to display the execution screen of the document application on the main region 1701 of the display 1610 and display the auxiliary screen on the second sub-region 1712. For example, when the display 1610 of the electronic device 1501 is in the third state 4540, the processor 1520 may control the display driver IC 1630 to display a reduced execution screen of a message application on the second sub-region 1712.

In an embodiment, when the display 1610 of the electronic device 1501 is in a fourth state 4550 in the landscape mode, the main region 1701, the first sub-region 1711, and the second sub-region 1712 may be exposed to the outside. When the display 1610 of the electronic device 1501 is in the fourth state 4550 in the landscape mode, the first sub-region 1711 may extend in the direction opposite to the first direction D1, and the second sub-region 1712 may extend in the second direction D2.

In an embodiment, when the display 1610 of the electronic device 1501 is in the fourth state 4550 in the landscape mode, the processor 1520 may control the display driver IC 1630 to display the word processing portion of the execution screen of the document application on the main region 1701 of the display 1610, display the input device screen on the first sub-region 1711, and display the auxiliary screen on the second sub-region 1712.

Figure 46:
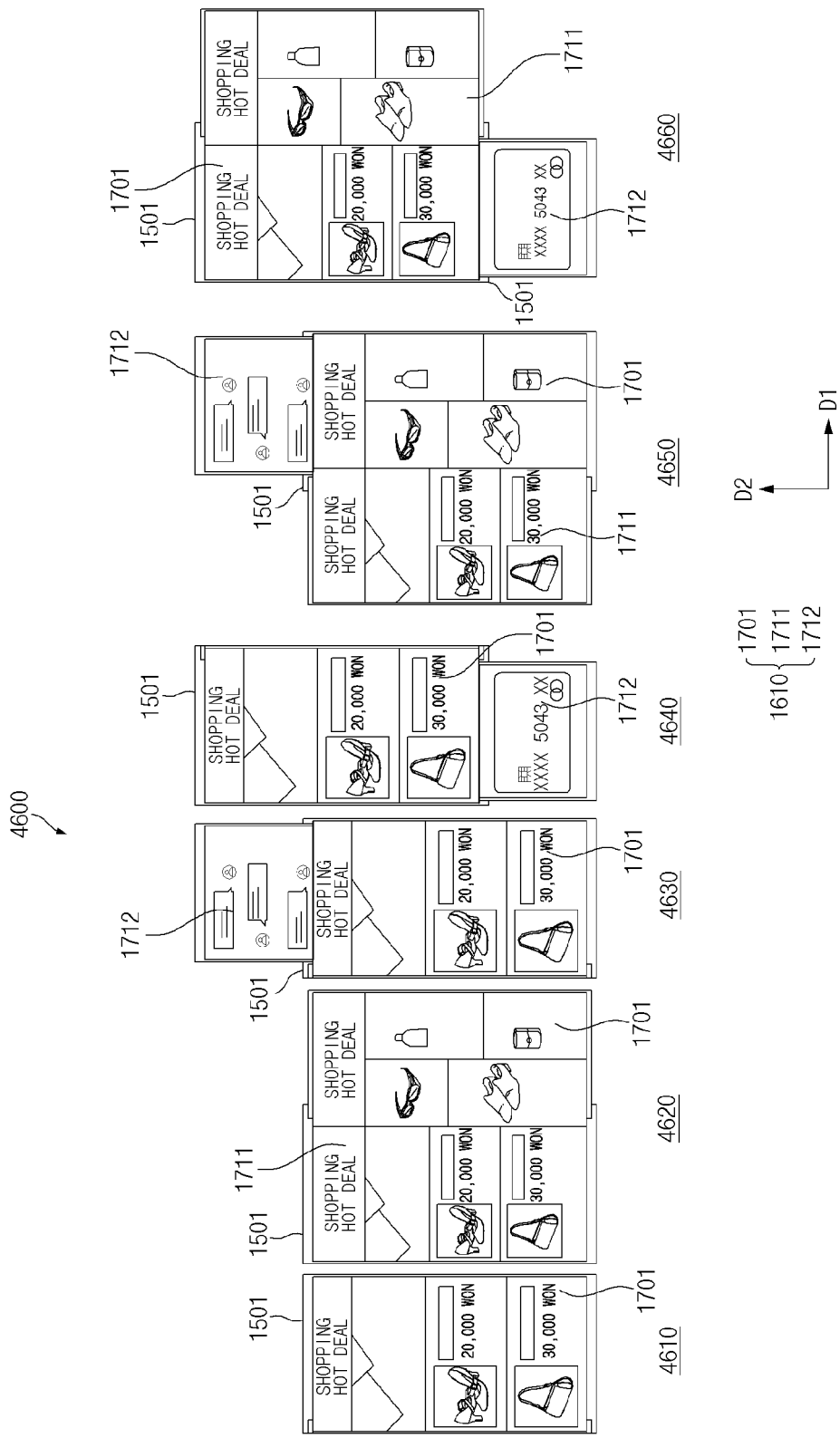
FIG. 46 is a view illustrating an operation of extending a first sub-region and/or a second sub-region of a display and displaying a screen on the display when executing a payment application in an electronic device according to an embodiment of the disclosure.

FIG. 46 is a view illustrating an operation of extending a first sub-region and/or a second sub-region of a display and displaying a screen on the display when executing a payment application in an electronic device according to an embodiment of the disclosure.

Referring to FIG. 46, in a view 4600, the electronic device 1501 may execute the payment application. The processor (e.g., the processor 1520 of FIG. 17) may control the display driver IC (e.g., the display driver IC 1630 of FIG. 17) to display an execution screen of the payment application on the display 1610, based on a state of the display 1610 of the electronic device 1501.

In an embodiment, when the display 1610 of the electronic device 1501 is in a first state 4610 in the portrait mode, the processor 1520 may control the display driver IC 1630 to display the execution screen of the payment application on the main region 1701 of the display 1610. The execution screen of the payment application may include a screen introducing information about products divided into a plurality of groups. On the screen introducing the information about the products, the products may be divided into the plurality of groups depending on the types thereof and may be displayed on different menus or different windows. For example, home appliances and clothing products may be displayed on different menus or different windows.

In an embodiment, when the display 1610 of the electronic device 1501 is in a second state 4620 in the portrait mode, the main region 1701 and the first sub-region 1711 may be exposed to the outside, and the second sub-region 1712 may be inserted into the electronic device 1501. When the display 1610 of the electronic device 1501 is in the second state 4620 in the portrait mode, the first sub-region 1711 may extend in the first direction D1.

In an embodiment, when the display 1610 of the electronic device 1501 is in the second state 4620 in the portrait mode, the processor 1520 may magnify, adjust, and display the execution screen of the payment application on the main region 1701 and the first sub-region 1711 of the display 1610. The processor 1520 may magnify, adjust, and display the execution screen of the payment application according to the size and ratio of a screen changed while the main region 1701 and the first sub-region 1711 are exposed to the outside. For example, the processor 1520 may simultaneously display two menus or windows to simultaneously display products belonging to two groups on the execution screen of the payment application.

In an embodiment, when the display 1610 of the electronic device 1501 is in a third state 4630 in the portrait mode, the main region 1701 and the second sub-region 1712 may be exposed to the outside, and the first sub-region 1711 may be inserted into the electronic device 1501. When the display 1610 of the electronic device 1501 is in the third state 4630 in the portrait mode, the second sub-region 1712 may extend in the second direction D2.

In an embodiment, when the display 1610 of the electronic device 1501 is in the third state 4630 in the portrait mode, the processor 1520 may control the display driver IC 1630 to display the execution screen of the payment application on the main region 1701 of the display 1610 and display an auxiliary screen on the second sub-region 1712. For example, the auxiliary screen may be a reduced screen of a message application.

In an embodiment, when the display 1610 of the electronic device 1501 is in an inverted third state 4640 in the portrait mode, the orientation in which the electronic device 1501 is placed may be turned upside down, compared to that in the third state 4630. When the display 1610 of the electronic device 1501 is in the inverted third state 4640 in the portrait mode, the main region 1701 and the second sub-region 1712 may be exposed to the outside, and the first sub-region 1711 may be inserted into the electronic device 1501. When the display 1610 of the electronic device 1501 is in the inverted third state 4640, the second sub-region 1712 may extend in the direction opposite to the second direction D2.

In an embodiment, when the display 1610 of the electronic device 1501 is in the inverted third state 4640, the processor 1520 may control the display driver IC 1630 to display the execution screen of the payment application on the main region 1701 of the display 1610 and display a payment method screen on the second sub-region 1712. For example, when the display 1610 of the electronic device 1501 is in the inverted third state 4640, the processor 1520 may control the display driver IC 1630 to display a card for payment on the second sub-region 1712.

In an embodiment, when the display 1610 of the electronic device 1501 is in a fourth state 4650 in the portrait mode, the main region 1701, the first sub-region 1711, and the second sub-region 1712 may be exposed to the outside. When the display 1610 of the electronic device 1501 is in the fourth state 4650 in the portrait mode, the first sub-region 1711 may extend in the first direction D1, and the second sub-region 1712 may extend in the second direction D2.

In an embodiment, when the display 1610 of the electronic device 1501 is in the fourth state 4650, the processor 1520 may control the display driver IC 1630 to magnify, adjust, and display the execution screen of the payment application on the main region 1701 and the first sub-region 1711 of the display 1610 and display the auxiliary screen on the second sub-region 1712.

In an embodiment, when the display 1610 of the electronic device 1501 is in an inverted fourth state 4660 in the portrait mode, the orientation in which the electronic device 1501 is placed may be turned upside down, compared to that in the fourth state 4650. When the display 1610 of the electronic device 1501 is in the inverted fourth state 4660, the main region 1701, the first sub-region 1711, and the second sub-region 1712 may be exposed to the outside. When the display 1610 of the electronic device 1501 is in the inverted fourth state 4660 in the portrait mode, the first sub-region 1711 may extend in the first direction D1, and the second sub-region 1712 may extend in the direction opposite to the second direction D2.

In an embodiment, when the display 1610 of the electronic device 1501 is in the inverted fourth state 4660, the processor 1520 may control the display driver IC 1630 to magnify, adjust, and display the execution screen of the payment application on the main region 1701 and the first sub-region 1711 of the display 1610 and display the payment method screen on the second sub-region 1712.

Figure 47:
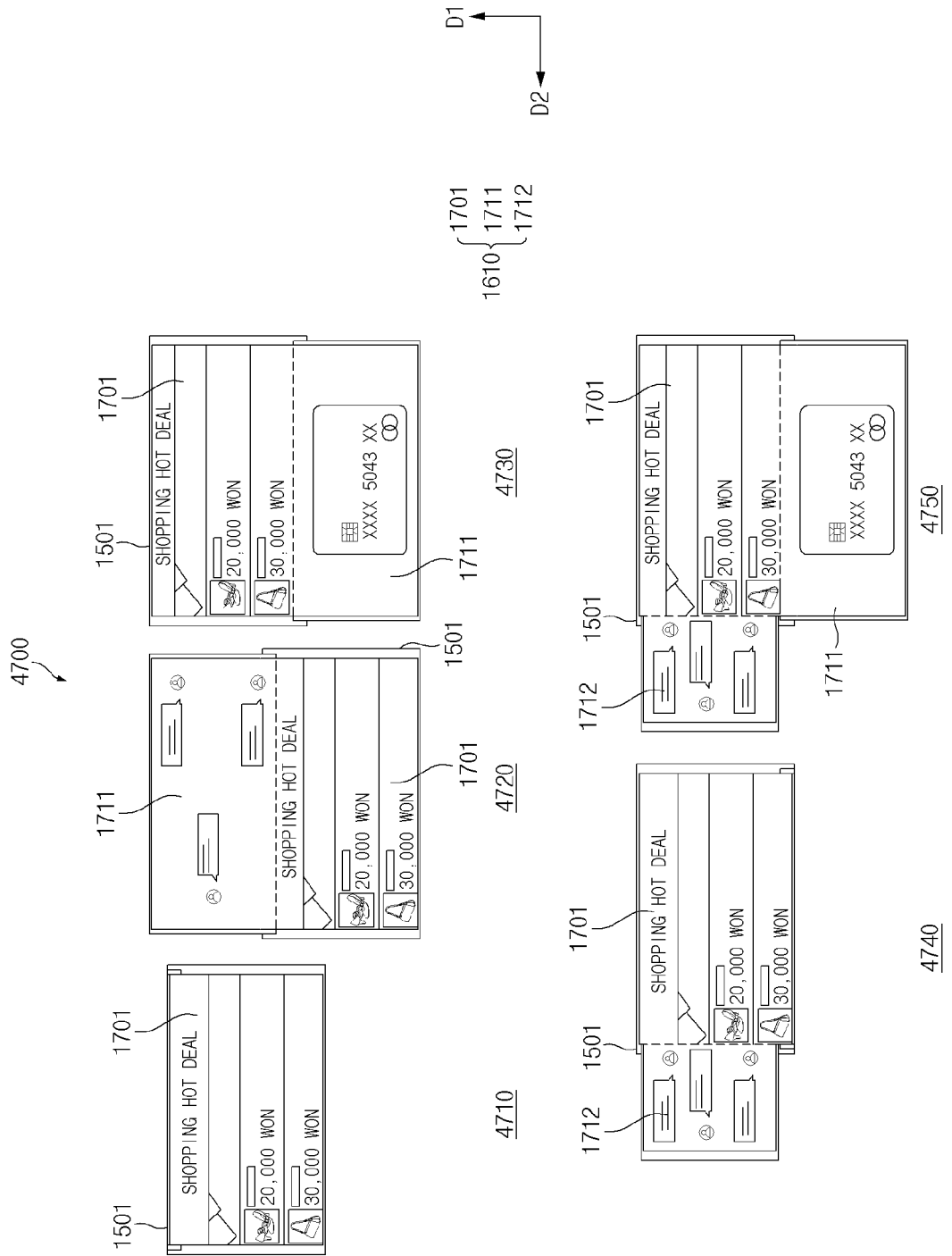
FIG. 47 is a view illustrating an operation of extending a first sub-region and/or a second sub-region of the display and displaying a screen on the display when executing a payment application in the electronic device according to an embodiment of the disclosure.

FIG. 47 is a view illustrating an operation of extending a first sub-region and/or the second sub-region of a display and displaying a screen on the display when executing a payment application in an electronic device according to an embodiment of the disclosure.

Referring to FIG. 47, in a view 4700, the electronic device 1501 may execute the payment application. The processor (e.g., the processor 1520 of FIG. 17) may control the display driver IC (e.g., the display driver IC 1630 of FIG. 17) to display an execution screen of the payment application on the display 1610, based on a state of the display 1610 of the electronic device 1501.

In an embodiment, when the display 1610 of the electronic device 1501 is in a first state 4710 in the landscape mode, the processor 1520 may control the display driver IC 1630 to display the execution screen of the payment application on the main region 1701 of the display 1610.

In an embodiment, when the display 1610 of the electronic device 1501 is in a second state 4720 in the landscape mode, the main region 1701 and the first sub-region 1711 may be exposed to the outside, and the second sub-region 1712 may be inserted into the electronic device 1501. When the display 1610 of the electronic device 1501 is in the second state 4720, the first sub-region 1711 may extend in the first direction D1.

In an embodiment, when the display 1610 of the electronic device 1501 is in the second state 4720 in the landscape mode, the processor 1520 may display the execution screen of the payment application on the main region 1701 of the display 1610 and may display an auxiliary screen on the first sub-region 1711. For example, the processor 1520 may display a reduced screen of a message application on the first sub-region 1711.

In an embodiment, when the display 1610 of the electronic device 1501 is in an inverted second state 4730 in the landscape mode, the main region 1701 and the first sub-region 1711 may be exposed to the outside, and the second sub-region 1712 may be inserted into the electronic device 1501. When the display 1610 of the electronic device 1501 is in the inverted second state 4730 in the landscape mode, the first sub-region 1711 may extend in the direction opposite to the first direction D1.

In an embodiment, when the display 1610 of the electronic device 1501 is in the inverted second state 4730 in the landscape mode, the processor 1520 may control the display driver IC 1630 to display the execution screen of the payment application on the main region 1701 of the display 1610 and display a payment method screen on the first sub-region 1711.

In an embodiment, when the display 1610 of the electronic device 1501 is in a third state 4740 in the landscape mode, the main region 1701 and the second sub-region 1712 may be exposed to the outside, and the first sub-region 1711 may be inserted into the electronic device 1501. When the display 1610 of the electronic device 1501 is in the third state 4740, the second sub-region 1712 may extend in the second direction D2.

In an embodiment, when the display 1610 of the electronic device 1501 is in the third state 4740, the processor 1520 may control the display driver IC 1630 to display the execution screen of the payment application on the main region 1701 of the display 1610 and display the auxiliary screen on the second sub-region 1712.

In an embodiment, when the display 1610 of the electronic device 1501 is in a fourth state 4750 in the landscape mode, the main region 1701, the first sub-region 1711, and the second sub-region 1712 may be exposed to the outside. When the display 1610 of the electronic device 1501 is in the fourth state 4750 in the landscape mode, the first sub-region 1711 may extend in the direction opposite to the first direction D1, and the second sub-region 1712 may extend in the second direction D2.

In an embodiment, when the display 1610 of the electronic device 1501 is in the fourth state 4750 in the landscape mode, the processor 1520 may control the display driver IC 1630 to display the execution screen of the payment application on the main region 1701 of the display 1610, display the payment method screen on the first sub-region 1711, and display the auxiliary screen on the second sub-region 1712.

Figure 48:
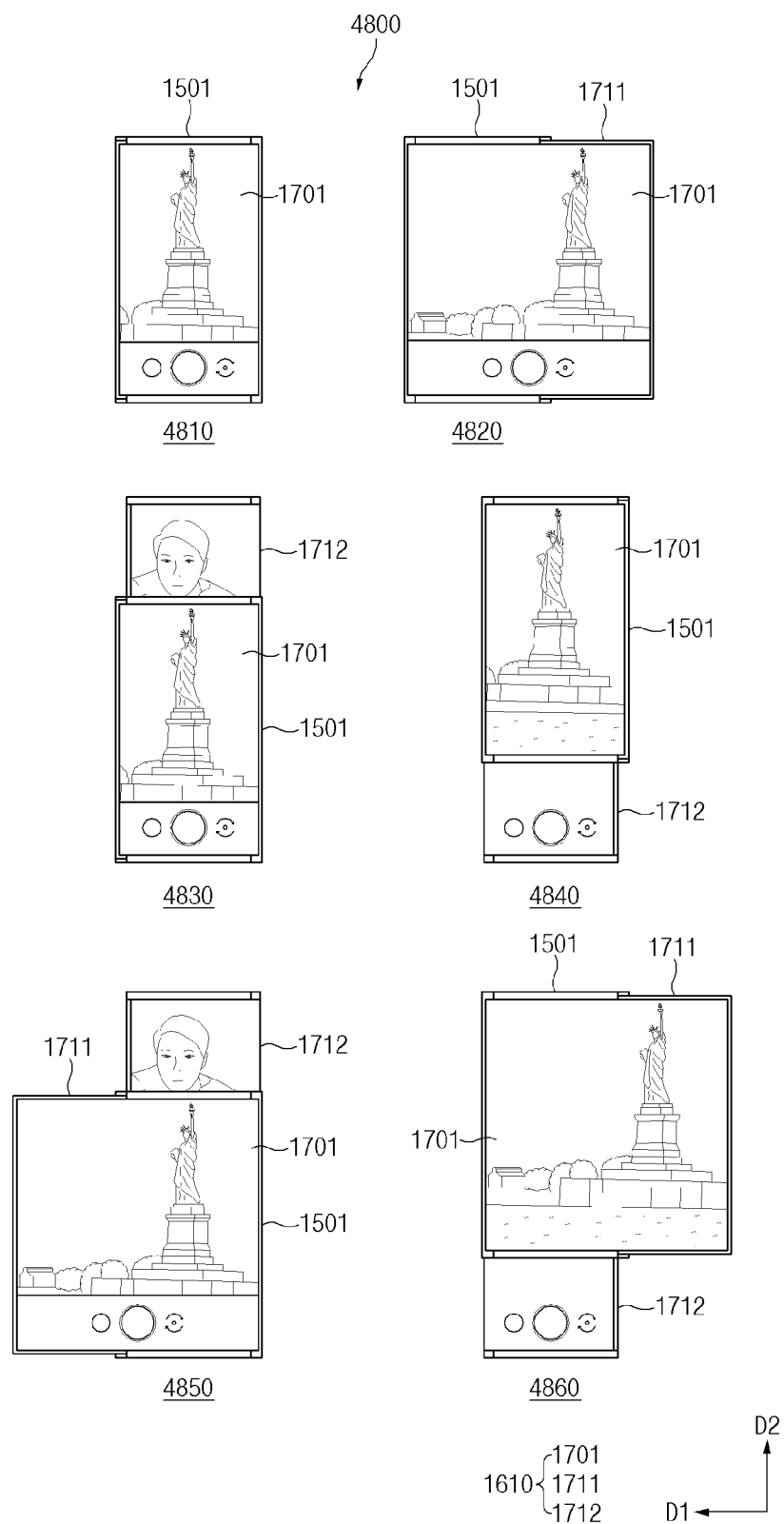
FIG. 48 is a view illustrating an operation of extending a first sub-region and/or a second sub-region of a display and displaying a screen on the display when executing a camera application in an electronic device according to an embodiment of the disclosure.

FIG. 48 is a view illustrating an operation of extending a first sub-region and/or a second sub-region of a display and displaying a screen on the display when executing a camera application in an electronic device according to an embodiment of the disclosure.

Referring to FIG. 48, in a view 4800, the electronic device 1501 may execute the camera application. The processor (e.g., the processor 1520 of FIG. 17) may control the display driver IC (e.g., the display driver IC 1630 of FIG. 17) to display an execution screen of the camera application on the display 1610, based on a state of the display 1610 of the electronic device 1501.

In an embodiment, when the display 1610 of the electronic device 1501 is in a first state 4810 in the portrait mode, the processor 1520 may control the display driver IC 1630 to display the execution screen of the camera application on the main region 1701 of the display 1610. The execution screen of the camera application may include a preview screen taken with a front camera or a rear camera currently in use and a user interface portion. The user interface portion may include a capture button, a gallery application execution icon showing captured photos and videos, and a front/rear switch icon.

In an embodiment, when the display 1610 of the electronic device 1501 is in a second state 4820 in the portrait mode, the main region 1701 and the first sub-region 1711 may be exposed to the outside, and the second sub-region 1712 may be inserted into the electronic device 1501. When the display 1610 of the electronic device 1501 is in the second state 4820 in the portrait mode, the first sub-region 1711 may extend in the first direction D1.

In an embodiment, when the display 1610 of the electronic device 1501 is in the second state 4820 in the portrait mode, the processor 1520 may uniformly magnify and display the execution screen of the camera application on the main region 1701 and the first sub-region 1711 of the display 1610. The processor 1520 may magnify, adjust, and display the execution screen of the camera application according to the size and ratio of a screen changed while the main region 1701 and the first sub-region 1711 are exposed to the outside. For example, the processor 1520 may extend the execution screen of the camera application in the first direction D1 and may display a preview screen showing a wider range in the first direction D1.

In an embodiment, when the display 1610 of the electronic device 1501 is in a third state 4830 in the portrait mode, the main region 1701 and the second sub-region 1712 may be exposed to the outside, and the first sub-region 1711 may be inserted into the electronic device 1501. When the display 1610 of the electronic device 1501 is in the third state 4830 in the portrait mode, the second sub-region 1712 may extend in the second direction D2.

In an embodiment, when the display 1610 of the electronic device 1501 is in the third state 4830 in the portrait mode, the processor 1520 may control the display driver IC 1630 to display the execution screen of the camera application on the main region 1701 of the display 1610 and display, on the second sub-region 1712, an auxiliary preview screen taken with the remaining camera different from the camera that displays the preview screen on the execution screen of the camera application.

In an embodiment, when the display 1610 of the electronic device 1501 is in an inverted third state 4840 in the portrait mode, the orientation in which the electronic device 1501 is placed may be turned upside down, compared to that in the third state 4830. When the display 1610 of the electronic device 1501 is in the inverted third state 4840 in the portrait mode, the main region 1701 and the second sub-region 1712 may be exposed to the outside, and the first sub-region 1711 may be inserted into the electronic device 1501. When the display 1610 of the electronic device 1501 is in the inverted third state 4840, the second sub-region 1712 may extend in the direction opposite to the second direction D2.

In an embodiment, when the display 1610 of the electronic device 1501 is in the inverted third state 4840, the processor 1520 may control the display driver IC 1630 to display the preview screen on the main region 1701 of the display 1610 and display the user interface portion on the second sub-region 1712. For example, when the display 1610 of the electronic device 1501 is in the inverted third state 4840, the processor 1520 may control the display driver IC 1630 to move the user interface portion to the second sub-region 1712 and display the user interface portion on the second sub-region 1712.

In an embodiment, when the display 1610 of the electronic device 1501 is in a fourth state 4850 in the portrait mode, the main region 1701, the first sub-region 1711, and the second sub-region 1712 may be exposed to the outside. When the display 1610 of the electronic device 1501 is in the fourth state 4850 in the portrait mode, the first sub-region 1711 may extend in the first direction D1, and the second sub-region 1712 may extend in the second direction D2.

In an embodiment, when the display 1610 of the electronic device 1501 is in the fourth state 4850, the processor 1520 may control the display driver IC 1630 to magnify and display the execution screen of the camera application on the main region 1701 and the first sub-region 1711 of the display 1610 and display the auxiliary preview screen on the second sub-region 1712.

In an embodiment, when the display 1610 of the electronic device 1501 is in an inverted fourth state 4860 in the portrait mode, the orientation in which the electronic device 1501 is placed may be turned upside down, compared to that in the fourth state 4850. When the display 1610 of the electronic device 1501 is in the inverted fourth state 4860, the main region 1701, the first sub-region 1711, and the second sub-region 1712 may be exposed to the outside. When the display 1610 of the electronic device 1501 is in the inverted fourth state 4860 in the portrait mode, the first sub-region 1711 may extend in the first direction D1, and the second sub-region 1712 may extend in the direction opposite to the second direction D2.

In an embodiment, when the display 1610 of the electronic device 1501 is in the inverted fourth state 4860, the processor 1520 may control the display driver IC 1630 to magnify and display the preview screen on the main region 1701 and the first sub-region 1711 of the display 1610 and display the user interface portion on the second sub-region 1712.

Figure 49:
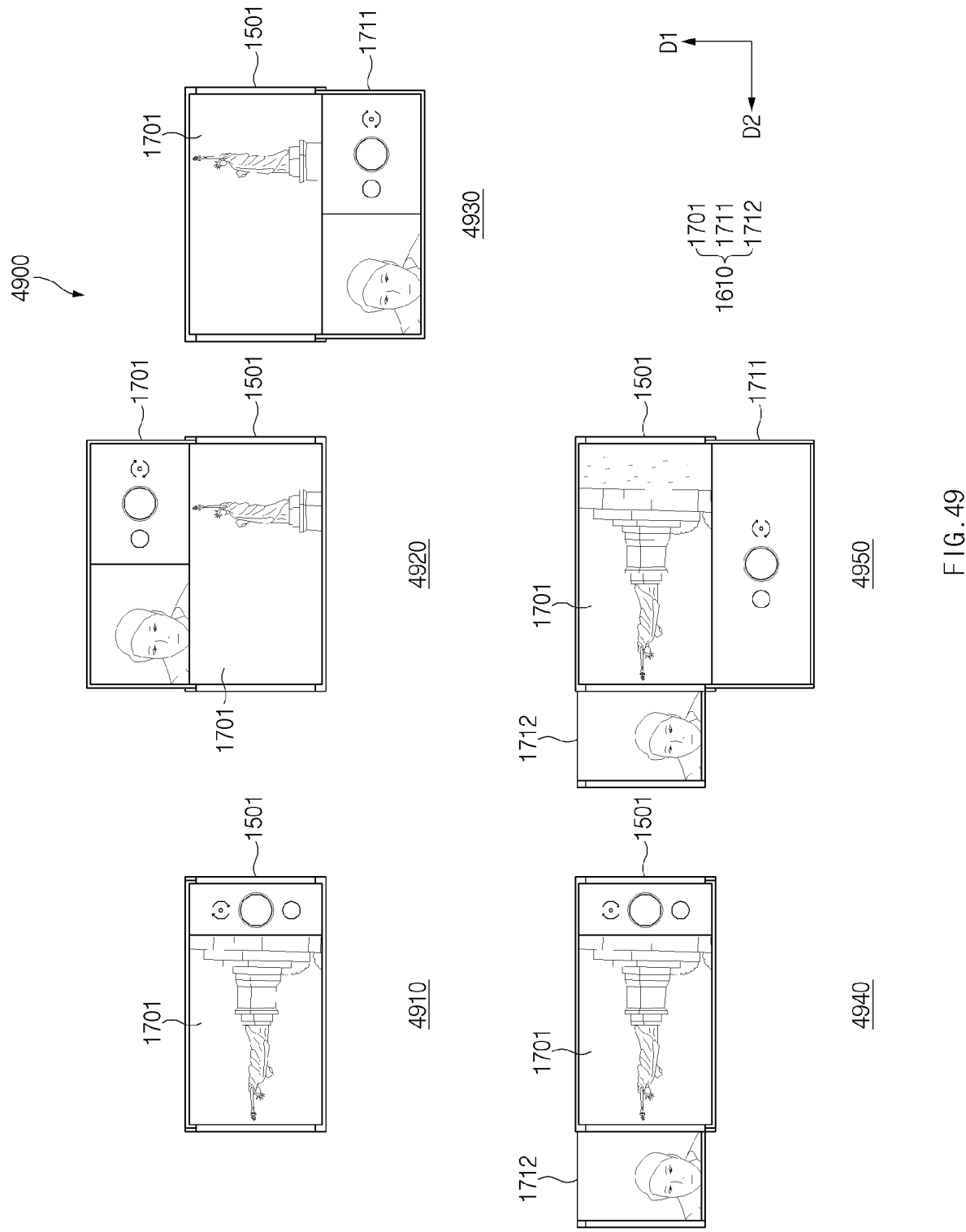
FIG. 49 is a view illustrating an operation of extending a first sub-region and/or a second sub-region of a display and displaying a screen on the display when executing a camera application in an electronic device according to an embodiment of the disclosure.

FIG. 49 is a view illustrating an operation of extending a first sub-region and/or a second sub-region of a display and displaying a screen on the display when executing a camera application in an electronic device according to an embodiment of the disclosure.

Referring to FIG. 49, in a view of 4900, the electronic device 1501 may execute the camera application. The processor (e.g., the processor 1520 of FIG. 17) may control the display driver IC (e.g., the display driver IC 1630 of FIG. 17) to display an execution screen of the camera application on the display 1610, based on a state of the display 1610 of the electronic device 1501.

In an embodiment, when the display 1610 of the electronic device 1501 is in a first state 4910 in the landscape mode, the processor 1520 may control the display driver IC 1630 to display the execution screen of the camera application on the main region 1701 of the display 1610.

In an embodiment, when the display 1610 of the electronic device 1501 is in a second state 4920 in the landscape mode, the main region 1701 and the first sub-region 1711 may be exposed to the outside, and the second sub-region 1712 may be inserted into the electronic device 1501. When the display 1610 of the electronic device 1501 is in the second state 4920, the first sub-region 1711 may extend in the first direction D1.

In an embodiment, when the display 1610 of the electronic device 1501 is in the second state 4920 in the landscape mode, the processor 1520 may display a preview screen on the main region 1701 of the display 1610 and may display an auxiliary preview screen and a user interface portion on the first sub-region 1711.

In an embodiment, when the display 1610 of the electronic device 1501 is in an inverted second state 4930 in the landscape mode, the main region 1701 and the first sub-region 1711 may be exposed to the outside, and the second sub-region 1712 may be inserted into the electronic device 1501. When the display 1610 of the electronic device 1501 is in the inverted second state 4930 in the landscape mode, the first sub-region 1711 may extend in the direction opposite to the first direction D1.

In an embodiment, when the display 1610 of the electronic device 1501 is in the inverted second state 4930 in the landscape mode, the processor 1520 may display the preview screen on the main region 1701 of the display 1610 and may display the auxiliary preview screen and the user interface portion on the first sub-region 1711.

In an embodiment, when the display 1610 of the electronic device 1501 is in a third state 4940 in the landscape mode, the main region 1701 and the second sub-region 1712 may be exposed to the outside, and the first sub-region 1711 may be inserted into the electronic device 1501. When the display 1610 of the electronic device 1501 is in the third state 4940, the second sub-region 1712 may extend in the second direction D2.

In an embodiment, when the display 1610 of the electronic device 1501 is in the third state 4940, the processor 1520 may control the display driver IC 1630 to display the execution screen of the camera application on the main region 1701 of the display 1610 and display the auxiliary screen on the second sub-region 1712.

In an embodiment, when the display 1610 of the electronic device 1501 is in a fourth state 4950 in the landscape mode, the main region 1701, the first sub-region 1711, and the second sub-region 1712 may be exposed to the outside. When the display 1610 of the electronic device 1501 is in the fourth state 4950 in the landscape mode, the first sub-region 1711 may extend in the direction opposite to the first direction D1, and the second sub-region 1712 may extend in the second direction D2.

In an embodiment, when the display 1610 of the electronic device 1501 is in the fourth state 4950 in the landscape mode, the processor 1520 may control the display driver IC 1630 to uniformly magnify and display the execution screen of the camera application on the main region 1701 and the first sub-region 1711 of the display 1610 and display the auxiliary preview screen on the second sub-region 1712.

Figure 50:
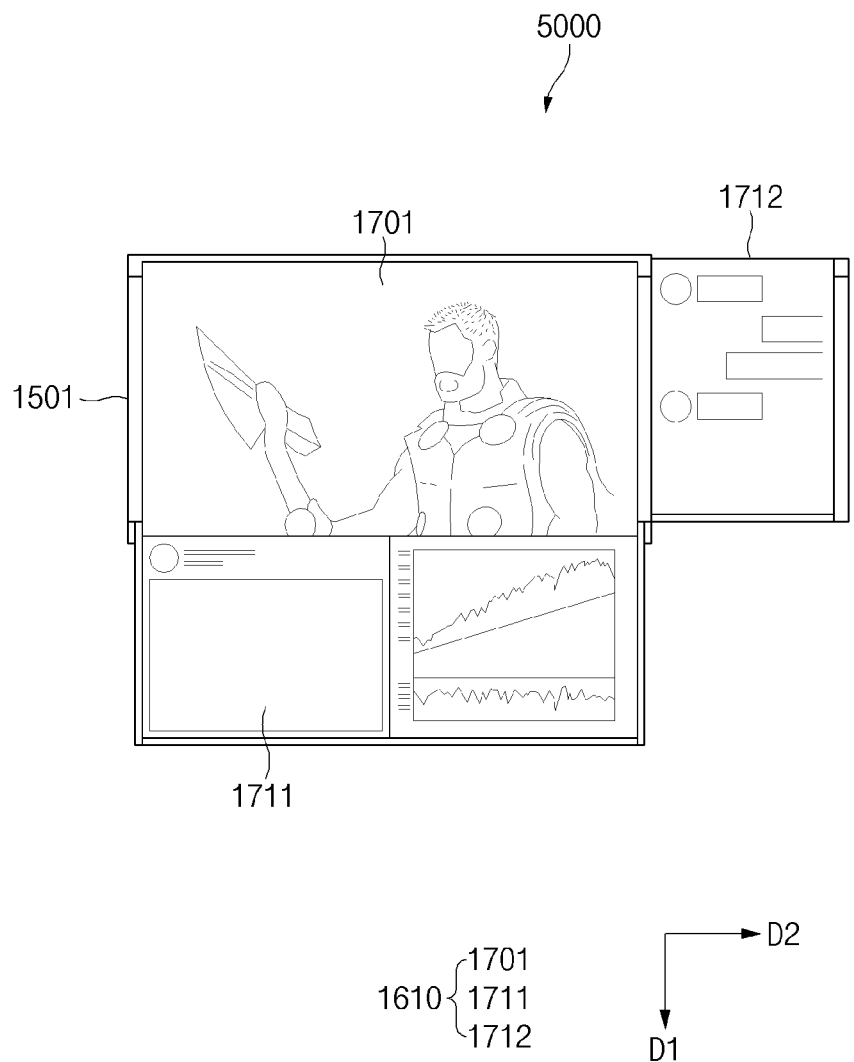
FIG. 50 is a view illustrating an operation of extending a first sub-region and/or a second sub-region of the display and displaying a screen on a display when executing three or more applications in an electronic device according to an embodiment of the disclosure.

FIG. 50 is a view illustrating an operation of extending a first sub-region and/or a second sub-region of a display and displaying a screen on the display when executing three or more applications in an electronic device according to an embodiment of the disclosure.

Referring to FIG. 50, in a view 4000, the electronic device 1501 may simultaneously execute the three or more applications. For example, the electronic device 1501 may simultaneously execute a video application, a message application, and an Internet application. The processor (e.g., the processor 1520 of FIG. 17) may control the display driver IC (e.g., the display driver IC 1630 of FIG. 17) to display an execution screen of the video application, an execution application of the Internet application, and an execution screen of the message application on the display 1610, based on a state of the display 1610 of the electronic device 1501.

In an embodiment, when the display 1610 of the electronic device 1501 is in a fourth state, the main region 1701, the first sub-region 1711, and the second sub-region 1712 may be exposed to the outside. When the display 1610 of the electronic device 1501 is in the fourth state, the first sub-region 1711 may extend in the first direction D1, and the second sub-region 1712 may extend in the second direction D2.

In an embodiment, when the display 1610 of the electronic device 1501 is in the fourth state, the processor 1520 may display execution screens of different applications on the main region 1701, the first sub-region 1711, and the second sub-region 1712. The processor 1520 may independently display execution screens of applications on the main region 1701, the first sub-region 1711, and the second sub-region 1712. The processor 1520 may display an execution screen of a first application on the main region 1701 of the display 1610, may display an execution screen of a second application on the first sub-region 1711, and may display an execution screen of a third application on the second sub-region 1712. For example, the processor 1520 may display the execution screen of the video application on the main region 1701 of the display 1610, may display the execution screen of the Internet application on the first sub-region 1711, and may display the execution screen of the message application on the second sub-region 1712.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display comprising:
     a main region,
     a first sub-region configured to extend in a first direction, and
     a second sub-region configured to extend in a second direction perpendicular to the first direction, a top surface of the first sub-region and the second sub-region is on a same plane as a top surface of the main region;
   a display driver integrated circuit (IC) configured to apply a data voltage to the display;
   a sub-display driver IC; and
   at least one processor operationally coupled with the display and the display driver IC,
   wherein the at least one processor is configured to:
     select a partial region to be displayed, among the main region, the first sub-region, and the second sub-region of the display,
     select, from the display driver IC and the sub-display driver IC, a driver IC configured to apply the data voltage, based on whether the first sub-region or the second sub-region of the display extends outside a housing,
     select, from the display driver IC and the sub-display driver IC, the driver IC configured to apply the data voltage in a direction in which distortion is less, when the first sub-region and the second sub-region extend outside the housing, and
     control the selected driver IC to apply the data voltage to the partial region,
   wherein the sub-display driver IC operates together with or separately from the display driver IC, and
   wherein the display driver IC and the sub-display driver IC are disposed perpendicular to each other.

2. The electronic device of claim 1, wherein the at least one processor is further configured to partially turn on or off each of the main region, the first sub-region, and the second sub-region of the display.

3. The electronic device of claim 1, wherein the at least one processor is further configured to control the display driver IC to supply a scan signal to a region exposed outside the housing among the main region, the first sub-region, and the second sub-region.

4. The electronic device of claim 1, wherein the at least one processor is further configured to control the display driver IC to apply the data voltage to the main region in a first state in which the main region is exposed outside the housing and the first sub-region and the second sub-region are inserted into the electronic device.

5. The electronic device of claim 1, wherein the at least one processor is further configured to control the display driver IC to apply the data voltage to the main region and the first sub-region in a second state in which the main region and the first sub-region are exposed outside the housing and the second sub-region is inserted into the electronic device.

6. The electronic device of claim 1, wherein the at least one processor is further configured to control the display driver IC to apply the data voltage to the main region and the second sub-region in a third state in which the main region and the second sub-region are exposed outside the housing and the first sub-region is inserted into the electronic device.

7. The electronic device of claim 1, wherein the at least one processor is further configured to control the display driver IC to apply the data voltage to the main region, the first sub-region, and the second sub-region in a fourth state in which the main region, the first sub-region, and the second sub-region are exposed outside the housing.

8. The electronic device of claim 1, wherein the display driver IC and the sub-display driver IC are disposed to make contact with each other.

9. The electronic device of claim 1, wherein the display driver IC and the sub-display driver IC are spaced apart from each other.

10. A method for controlling an electronic device, the method comprising:
   detecting movement of a sliding member;
   determining whether an externally exposed region of a display is changed, the display comprising a main region, a first sub-region configured to extend in a first direction, and a second sub-region configured to extend in a second direction perpendicular to the first direction, a top surface of the first sub-region and the second sub-region is on a same plane as a top surface of the main region;

updating the externally exposed region of the display in a processor;

turning-on a gate driver of the externally exposed region of the display;

determining whether at least one of the first sub-region or the second sub-region of the display is exposed outside of a housing;

selecting a partial region to be displayed, among the main region, the first sub-region, and the second sub-region of the display;

selecting, from a display driver integrated circuit (IC) and a sub-display driver IC, a driver IC configured to apply data voltage, based on whether the first sub-region or the second sub-region of the display extends outside the housing, selecting, from a display driver IC and a sub-display driver IC, the driver IC configured to apply the data voltage in a direction in which distortion is less, when the first sub-region and the second sub-region extend outside the housing; and applying the data voltage to the partial region, wherein the sub-display driver IC operates together with or separately from the display driver IC, and wherein the display driver IC and the sub-display driver IC are disposed perpendicular to each other.

11. The method of claim 10, wherein the detecting of the movement of the sliding member comprises:

detecting whether a magnetic force sensed by a Hall IC disposed on the sliding member is changed.

12. The method of claim 10, wherein the updating of the externally exposed region of the display in the processor comprises:

generating a control map in which state information of the display is stored; and updating a changed exposed region in the control map when the externally exposed region of the display is changed.

13. The method of claim 10, wherein the turning-on of the gate driver of the externally exposed region of the display comprises:

partially supplying a scan signal to pixels disposed in the externally exposed region among the pixels disposed in the display.

14. The method of claim 10, wherein the applying of the data voltage comprises:

applying the data voltage to the main region in a first state in which the main region is exposed outside the housing and the first sub-region and the second sub-region are inserted into the electronic device.

15. The method of claim 10, wherein the applying of the data voltage comprises:

applying the data voltage to the main region and the first sub-region in a second state in which the main region and the first sub-region are exposed outside the housing and the second sub-region is inserted into the electronic device.

16. The method of claim 10, wherein the applying of the data voltage comprises:

applying the data voltage to the main region and the second sub-region in a third state in which the main region and the second sub-region are exposed outside the housing and the first sub-region is inserted into the electronic device.

17. The method of claim 10, wherein the applying of the data voltage comprises:

applying the data voltage to the main region, the first sub-region, and the second sub-region in a fourth state in which the main region, the first sub-region, and the second sub-region are exposed outside the housing.

* * * * *